США005237563A

United States Patent [19]

McNulty

[11] Patent Number: 5,237,563
[45] Date of Patent: Aug. 17, 1993

[54] FOUR-WIRE LINE UNIT INTERFACE CIRCUIT

[75] Inventor: Timothy J. McNulty, Cary, N.C.

[73] Assignee: Alcatel Network Systems, Inc., Richardson, Tex.

[21] Appl. No.: 576,691

[22] Filed: Aug. 31, 1990

[51] Int. Cl.[5] ............................................. H04Q 11/04
[52] U.S. Cl. ...................................... 370/58.1; 370/67; 370/68.1; 370/85.1; 370/110.1
[58] Field of Search ..................... 370/58.1, 58.2, 58.3, 370/60, 60.1, 67, 68, 68.1, 84, 85.1, 92, 94.1, 94.2, 100.1, 110.1, 111; 375/12, 14

[56] References Cited

U.S. PATENT DOCUMENTS

| 4,059,729 | 11/1977 | Eddy et al. | 370/55 |
| 4,849,972 | 7/1989 | Hackett et al. | 370/110.1 |
| 4,993,019 | 2/1991 | Cole et al. | 370/85.1 |

Primary Examiner—Douglas W. Olms
Assistant Examiner—Alpus H. Hsu
Attorney, Agent, or Firm—Ware, Fressola, Van Der Sluys & Adolphson

[57] ABSTRACT

A four-wire line unit interface circuit used on four-wire line units in a line shelf of a digital loop carrier provides all of the logic necessary to access a subscriber line to a line unit interface bus connected to common equipment within the line shelf. Information received from the common equipment includes signaling data, configuration data and provisioning data which is reconfigured and processed by the line unit interface circuit for controlling the subscriber line. Configuration data from the common equipment is decoded to assign time slots on a line unit interface bus to the various channels serviced by the line shelf and to further provide for a timing offset between the transmit and receive strobes provided to each subscriber line circuit. An asynchronously operating microprocessor is provided on the four-wire line unit, and a microprocessor interface is provided to interface the asynchronously operating microprocessor with the data provided on the line unit interface bus. CODEC and Equalizer devices provided on the four-wire line unit are provisioned and audited through the interface circuit.

20 Claims, 50 Drawing Sheets

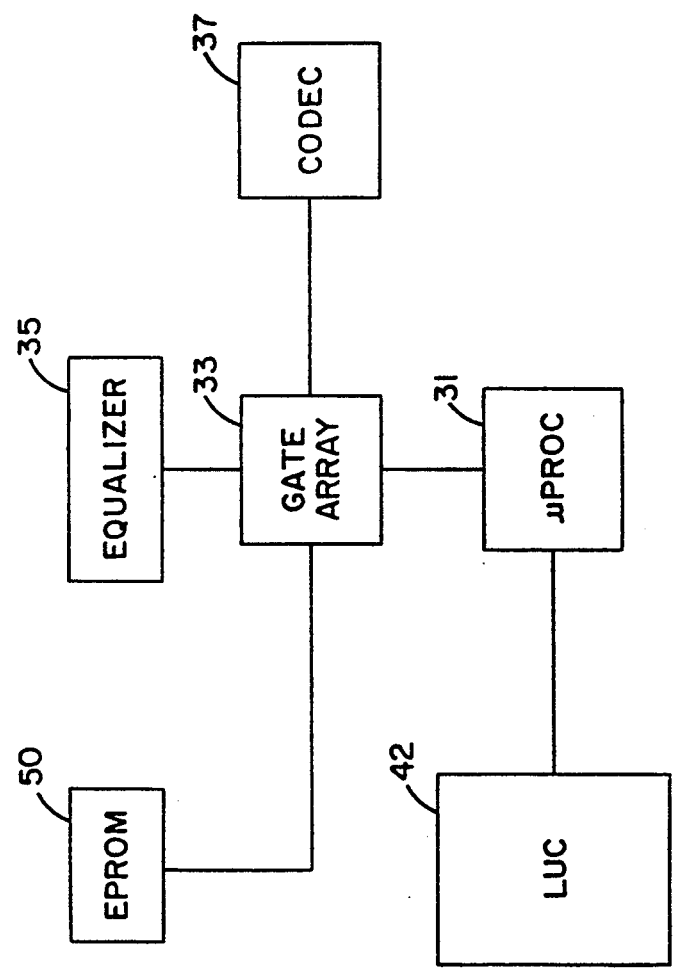

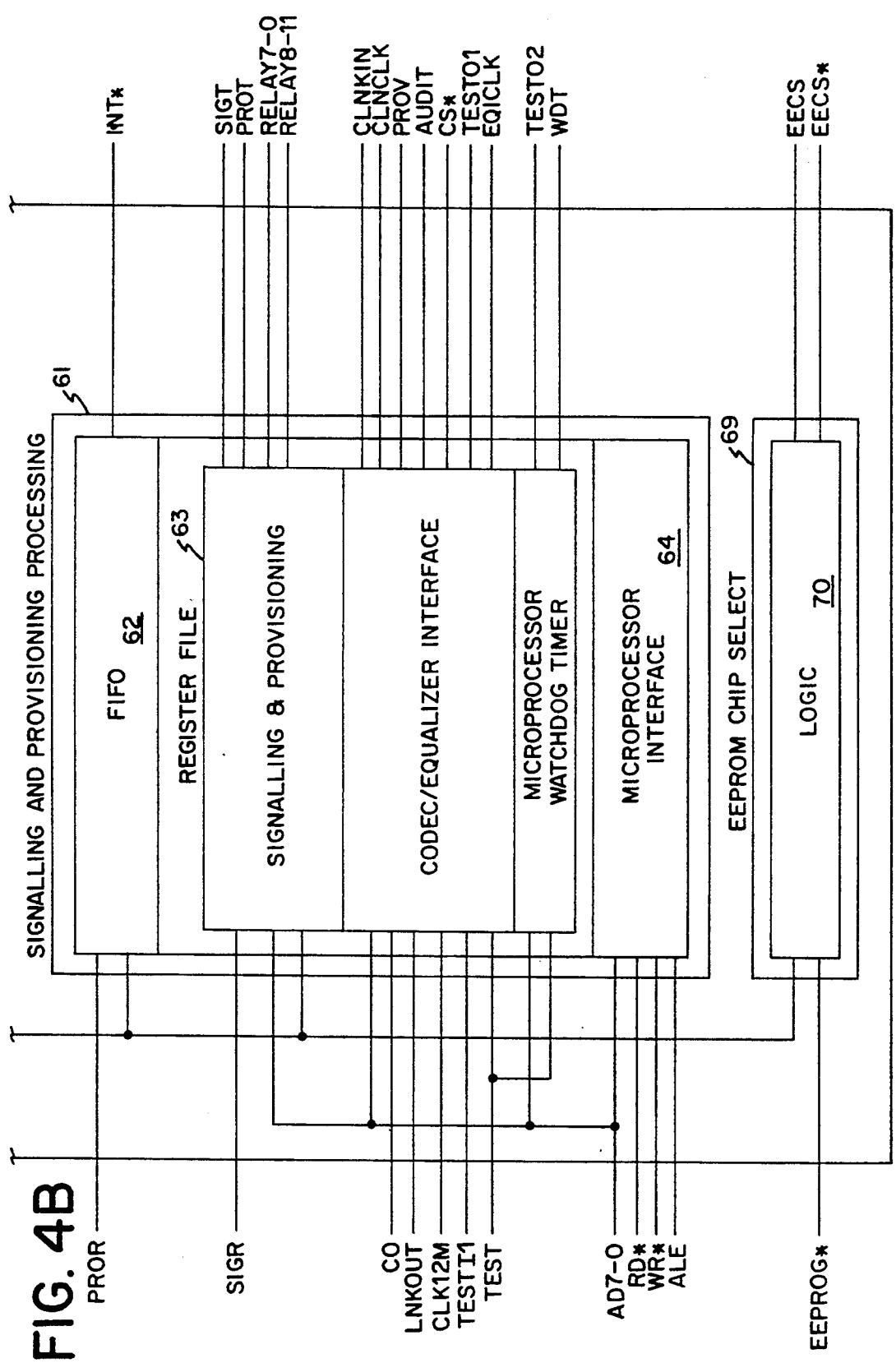

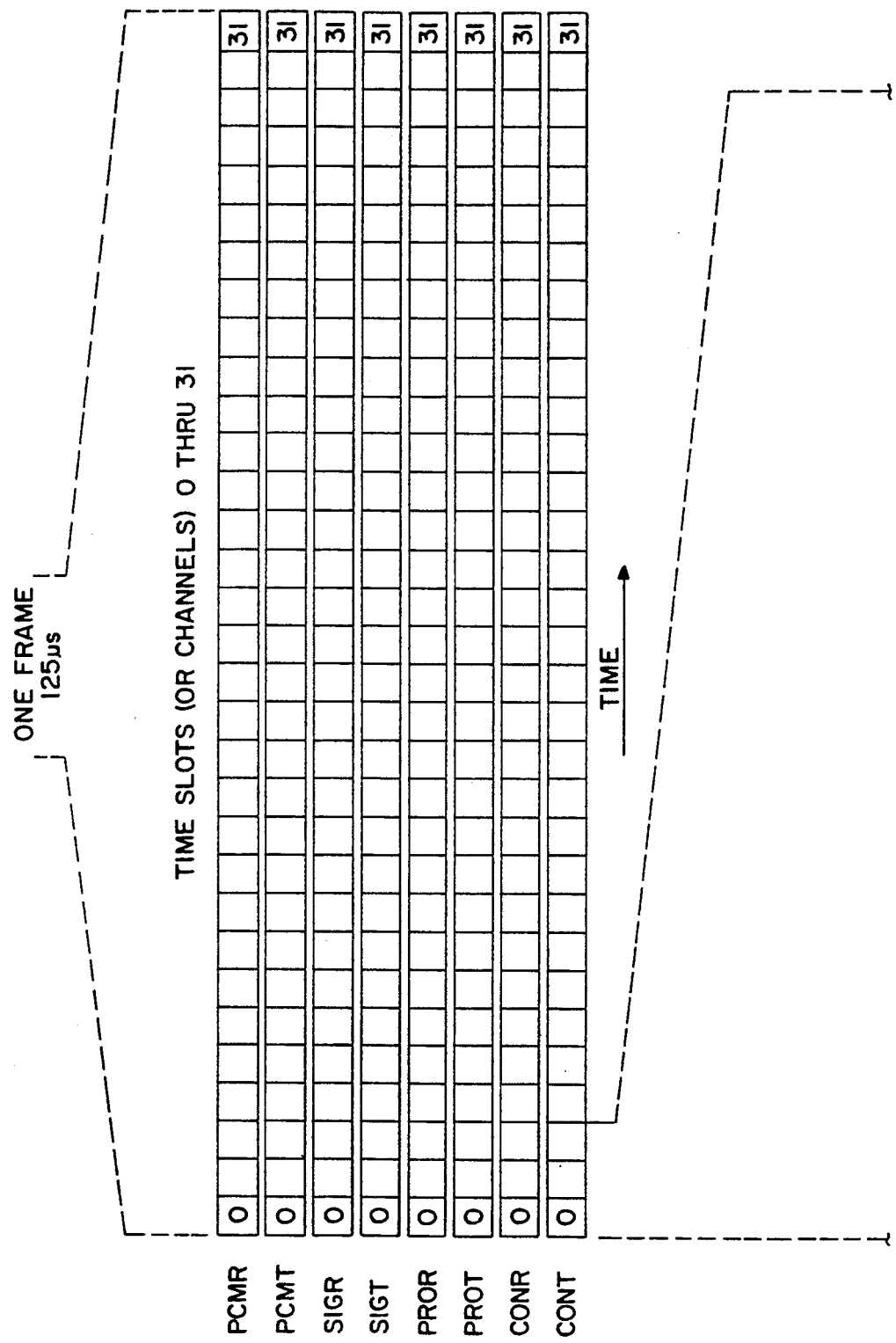
FIG. 5A1

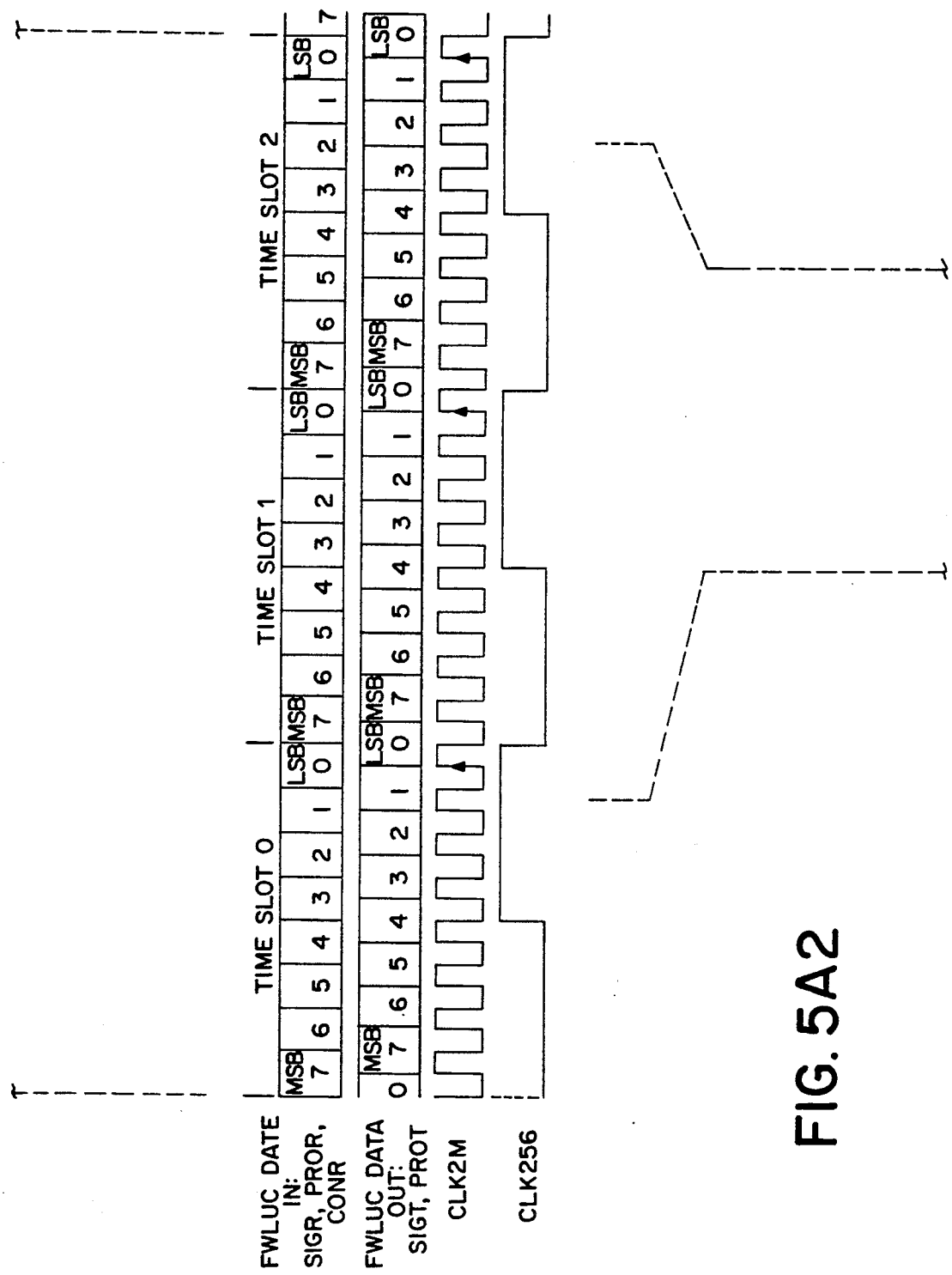
FIG. 5A2

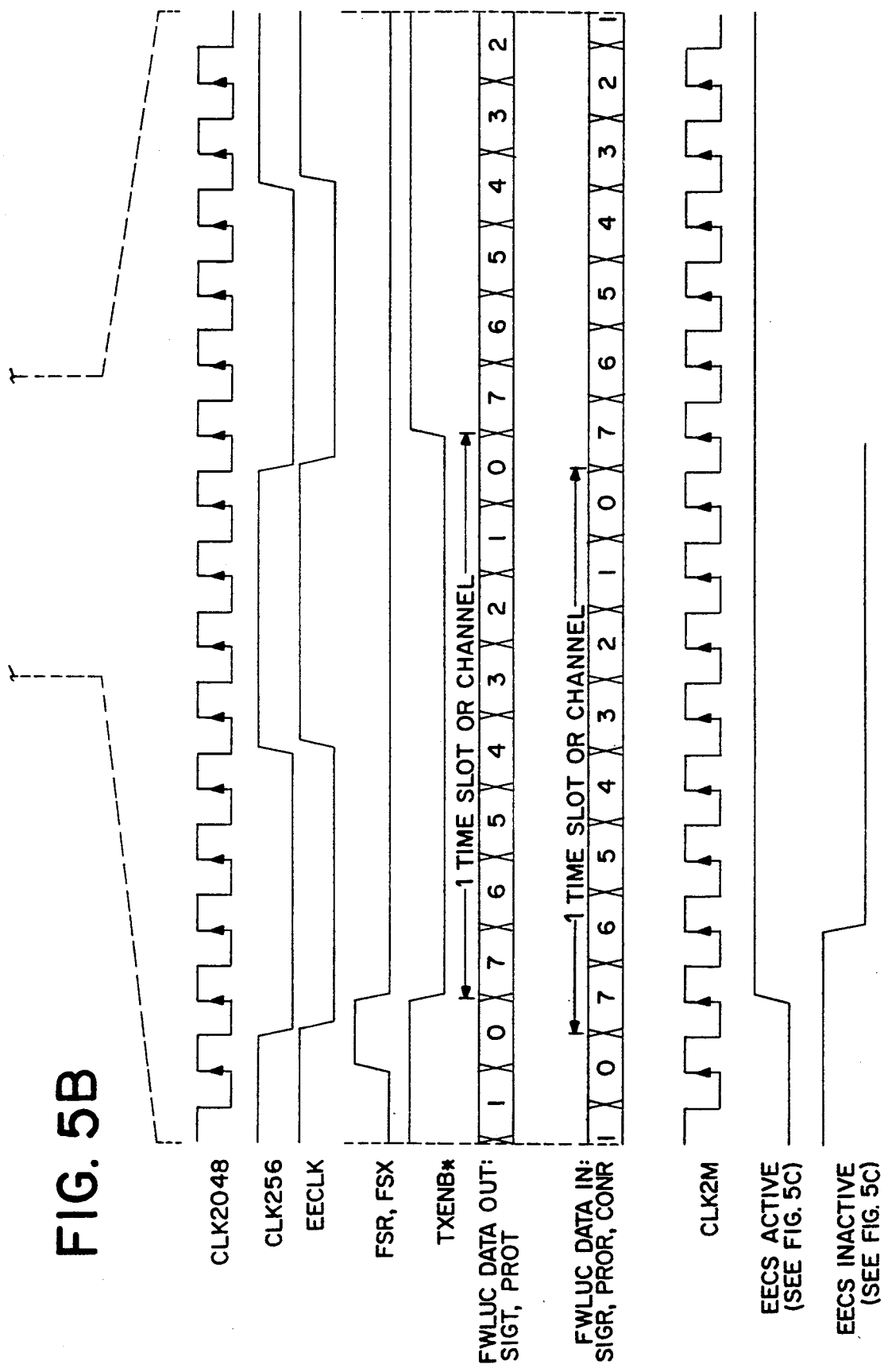

| FIG. 20A | FIG. 20B |
|---|---|
| FIG. 20C | FIG. 20D |

FIG. 20

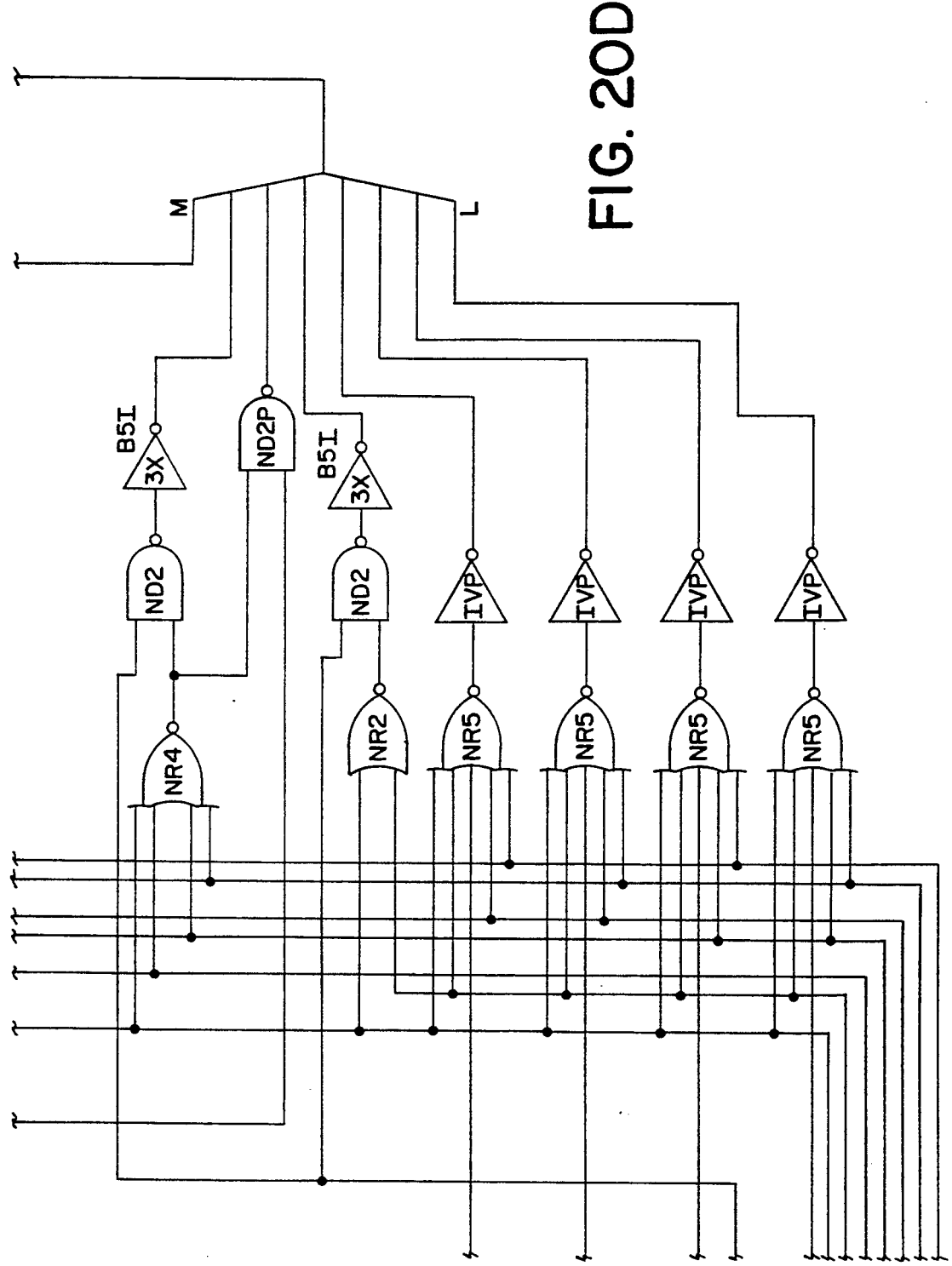

FOUR-WIRE LINE UNIT INTERFACE CIRCUIT

BACKGROUND OF THE INVENTION

1. Field of the Invention

The present invention relates to digital loop carrier (DLC) systems and, more particularly, to a four-wire line unit interface circuit for interfacing four-wire line units with common equipment in a digital loop carrier line shelf.

2. Description of the Prior Art

The Synchronous Optical Network (SONET) standard (American National Standards Institute Standard T1.105-1988 entitled "Digital Hierarchy Optical Interface Rates and Formats Specification") which is being adopted within the United States and elsewhere defines the standard for the transfer of information by means of optical fiber. According to the SONET standard, an optical carrier level (such as OC1, OC3, OC12 and OC48) signal is a signal that results from an optical conversion of a synchronous transport signal (STS) operating at the same transfer rate. An STS1 level signal is defined as the basic building block signal, with a high-speed transfer rate of 51.840 Mb/s, and is equated to an OC1 level optical signal. With high-speed transfer rates there is a need for multiplexing and demultiplexing information associated with lower-speed telephony standards to and from the high-speed transmission lines. Examples of such lower-speed standards include the digital signal standard, or DSX standard (where 'X' is an integer, such as 0, 1, 2 and 3). The DSX standard is commonly used in telephony with DS0 directed to subscriber level signals that operate at 64 Kb/s, DS1 directed to lines operating a 1.544 Mb/s, DS2 operating at 6.312 Mb/s, and DS3 operating at 44.736 Mb/s.

In order to access the high-speed transmission lines, network elements are required for transferring and grooming, i.e., segregating, subscriber information channels between the lower-speed transmission lines and the higher-speed transmission lines. These network elements may take on several different forms for providing transfer of information between various standard transmission rates. In order to take advantage of the wider bandwidth available on the high-speed lines for various applications such as data transfer, a means was required to combine DS0 channels to provide wider band facilities.

A family of access products has been developed by the Assignee of the present invention. These access products allow slower transmission lines to access the higher-speed optical transmission systems. These access products use an internal multi-link serial bus (SBI) operating at a rate of 4.096 Mb/s to transport information, signalling and processor commands. U.S. Pat. No. 5,060,229 entitled "Serial Transport Frame Format Method", which is commonly assigned with this application, describes this unique serial bus and is incorporated herein by reference. Two access products are also described in the aforementioned patent application, said access products being a Terminal Multiplexer, adapted to interface a high-speed carrier with DS1 level transmission lines for reception and transmission of high-speed signals in one direction only. An Add/Drop Multiplexer (ADM) is also described in the aforementioned patent application and is designed to interface a high-speed carrier to DS1 level transmission lines for reception and transmission in each of two directions.

FIG. 1 illustrates the use of access products in a telephone transmission system. Two high-speed feeder lines 10 and 12 are shown as being at the optical OC1 level and the electrical STS1 level respectively. Both of these feeder lines operate at 51.84 Mb/s. An add/drop multiplexer 14, as described in the aforementioned copending patent application, connects either feeder line 10 or 12 to a DS1 level transmission line 16 operating at 1.544 Mb/s. In order to extract individual DS0 channels from the DS1 line, a separate network element 15 usually referred to as a DLC was required as an interface between the DS0 level and the DS1 level. In a commercial installation several DLCs would be used with each add/drop multiplexer. Thus, two separate network elements 14 and 15 were required in order for individual lines at the DS0 level to access an optical OC1 level transmission line, and in most cases several DLCs were used with one multiplexer.

The need for a DS1 level transmission line between the ADM 14 and the DLC 15 severely limited the control communications that could take place between the two network elements. The use of two separate network elements inherently reduced reliability, since all control information had to be conveyed over a single DS1 line. Control information in the form of signaling could be conveyed only to a limited extent using the robbed bit signaling technique and clear channel communication was not available. A means did not exist for the microprocessors in each element to communicate with each other unless a separate DS0 channel was dedicated to this purpose, removing this particular DS0 channel from the pool of DS0 channels available to carry subscriber traffic.

The DLCs are generally adapted to accept a plurality of line units servicing one or more DS0 channels each. The line units are connected to a TDM bus with the line signals being multiplexed onto the bus at specified time slots, each line unit having predetermined time slots for inserting and extracting data to and from the bus for each of its channels. The line unit would be strobed to be activated during the time slots to which it is assigned. A plurality of back plane connections were required to provide a strobe signal to each line card. Thus, the system was limited to a pre-set number of line cards that could be handled by the system, and the assignment of the time slots to the line cards was fixed.

Control of the system was limited, since the system controller did not have access to the data contained within each time slot, including signaling information pertaining to the time slots.

With the advent of many different types of telecommunications service, various signaling schemes have been devised which are not compatible with each other. Signaling translation between equipment using one signaling scheme and equipment using another signaling scheme was required and the use of special signaling translation circuits for each different type of service had to be developed. Thus, the free interchange of line units was restricted, due to the need to first provide for the required signaling translation.

Four-wire line units provide special service capabilities such as Foreign Exchange Office (FXO) and Foreign Exchange Subscriber (FXS) service. In an FXO application, a line unit can be configured for the following types of service:

4-wire Foreign Exchange Office with ground or loop start

4-Wire Tandem (TDM), 2-state, 4-state, office or station

4-Wire Transmission Only (TO)

4Wire Equalized Transmission Only (ETO)

In the FXS application, the line unit can be configured for the following types of service:

4-Wire Foreign Exchange Subscriber with ground or loop start

4-Wire E&M (Type I, II, or III)

4-Wire Pulse Link Repeater (Type I, II, or III)

4-Wire Transmission Only (TO)

4-Wire Equalized Transmission Only (ETO)

Provisioning and control of such a four-wire line unit is complex due to the many services that can be provided by one unit. Significant amounts of provisioning and control data must be provided to a microprocessor located on the line unit; therefore an interface for this data was required.

The four-wire line unit also has an equalizer with filters for adjusting frequency response which is programmable by serial input data which must be interfaced. A CODEC on a four-wire line unit is also programmable, and data for the programming must be interfaced to the CODEC.

There also is a requirement that the microprocessor be able to audit both the equalizer and the CODEC, and a means to perform this audit function was required.

Thus, multi-function line units present specific problems that must be addressed.

Modern telecommunications systems must provide for high-speed wide bandwidth data communications facilities which cannot be serviced by individual DS0 level lines. Thus, higher speed DS1 lines had to be provided to handle individual customer requirements when they exceeded the capability of a DS0 line.

Thus, it was apparent that the flexibility demanded by modern telephone communications systems was not being efficiently handled by the prior art interfaces between high-speed feeder lines and DS0 level subscriber lines. There was clearly a need for a more efficient way of providing access to high-speed transmission lines by individual DS0 subscriber lines.

SUMMARY OF THE INVENTION

The present invention specifically contemplates a circuit for interfacing a four-wire line unit with common equipment in a line shelf of a DLC access product and, more particularly, to a circuit for interfacing DS0 subscriber line circuits with a time slot access device (TSA) as described in U.S. Pat. No. 5,088,089, entitled "Apparatus For Programmably Accessing and Assigning Time Slots In A Time Division Multiplexed Communication System", filed on Dec. 15, 1989, and assigned to the Assignee hereof, which application is incorporated herein by reference.

U.S. patent application Ser. No. 452,291, entitled "High-Speed Synchronous Transmission Line Access Terminal", filed on Dec. 15, 1989, and assigned to the Assignee hereof, is incorporated herein by reference. Said patent application describes a single network element which will interface a high-speed feeder transmission line 10 or 12, with a lower speed DS1 line 16 and DS0 subscriber lines 20, as shown in FIG. 1. The network element is an access terminal 22 having a core module 24 connected to either feeder line 10 or 12 and having ports connected to DS1 line 16 and to an access module 26 having ports connected to DS0 lines 20.

The access module 26 may comprise a plurality of individual line shelves, each of which may further accommodate a plurality of line units for connection to individual subscriber lines. Each line shelf may accommodate up to 96 two-wire subscriber lines, with the core module 24 accommodating up to seven line shelves, for a total of 672 two-wire subscriber lines, each having access to an optical fiber carrier OC1 or an STS1 metallic feeder line. If only four-wire line units are used, the number of subscriber lines accommodated would be reduced by half.

The core module 24 is connected to the line shelves of the access module 26 by a plurality of SBIs, as disclosed in the aforementioned U.S. Pat. No. 5,060,229. The SBIs facilitate an embedded control technique for communicating control messages over channel 31, called the VI channel. This embedded control technique is described in U.S. Pat. No. 5,027,349, entitled "Embedded Control Technique for Distributed Control Systems", which is commonly assigned with this application and is incorporated herein by reference. The SBI using the VI channel allows the DS0 level signals to be tightly coupled to the high-speed OC1 or STS1 feeder lines. The technique allows for clear channel transmission by eliminating the need for the robbed bit technique and also provides for processor-to-processor communication between modules. The flexibility of the SBI arrangement facilitates signaling processing, provisioning and maintenance functions.

A pair of processors are used in both the core and in the line shelves to provide a host of advantages which will become apparent. One advantage is the unique flexibility provided in grooming DS0 channels and the ability to combine them to provide wider bandwidth capability to service future communications needs such as ISDN. Another advantage of using a line shelf processor (LSP) lies in its adaptability to future enhancements and reconfigurations by merely effecting a software change.

The heart of the line shelf is a line shelf access unit (LSA) which interfaces the line units (LUs) and the SBIs. Each LSA includes a pair of time slot access devices (TSAs) which function to collect and distribute pulse code modulated (PCM) signals, signaling, provisioning and configuration data between the SBIs, the LUs and the LSPs. The TSA provides the LSPs with direct access to the data contained within a particular time slot. This data may contain speech information, signaling and other control information, thereby providing the LSPs with heretofore unavailable control capabilities.

The TSA also facilitates a time slot assignment feature which is controlled by the LSP to provide assignment of any particular time slot to any subscriber line on any LU, or a plurality of time slots to a single subscriber line to provide broad band capability.

The TSA also provides for signaling translation between the signaling scheme used in the particular LUs and the signaling scheme used for signals received on the SBI. The signaling translation function is accomplished via a downloadable translation table, which is written into RAM contained in the TSA unit by the LSP.

The TSA, as previously mentioned, provides a plurality of signals on a line unit interface bus which is connected to the various line units. The line unit interface bus carries two clock lines; eight serial data lines for the transmission and reception of PCM data, signaling, configuration data and provisioning data; and two data lines for transmitting and receiving inventory data stored on the line units.

A line unit interface circuit (LUC) is disclosed in U.S. Pat. No. 4,993,019, entitled "Line Unit Interface Circuit", which is commonly assigned with this application and is incorporated herein by reference. The LUC performs all of the functions necessary to interface a two-wire LU to the common equipment (TSA) via the line unit interface bus. These functions include generation of the necessary framing and timing signals for the line units from two clock signals received from the TSA, the receipt and transmission of signaling and provisioning data, and access to inventory data stored on the line units. A major function of the LUC is to decode configuration data received from the TSA, including offset information, to ascertain the time slots on a TDM transmission line assigned to the subscriber channels serviced by the line units, and to further decode the offset information when a difference between the receive and transmit time slots is required.

When a configuration code received on the line unit interface bus matches a fixed code provided to the LUC by back plane straps connected to identification pins, access to an RX and a TX time slot on the TDM bus is provided. A chip select signal and clock for the inventory storage is also generated.

The decoding circuitry for decoding the configuration data includes a unique flywheel circuit for preventing the erroneous assignment of time slots resulting from noise or false signals received on the line unit interface bus from the TSA.

The four-wire line unit interface circuit (FWLUC) of the present invention performs functions similar to the previously-described functions of the LUC and additional functions necessary to interface a multi-function four-wire line unit to the common equipment (TSA) via the line unit interface bus.

As previously mentioned, the four-wire line unit includes a microprocessor for performing multiple functions depending upon the particular use to which the four-wire line unit is applied. The microprocessor handles a significant amount of provisioning and control data and thus the FWLUC provides a plurality of registers for storing data directed to and from the microprocessor and further provides interfaces between these registers and the microprocessor.

Multiple bytes of provisioning data are required to configure the line unit for the previously-mentioned line unit applications. The FWLUC will store provisioning data received from the LUIB every frame. After six frames of data have been counted, an interrupt pulse is sent to the microprocessor and a 'packet' of data is sent to the microprocessor for its use. The microprocessor can recognize the start and end of the 'packet' by the use of a special code.

Transmit signaling and provisioning data to be sent out on the LUIB every frame is sent by the microprocessor to two sets of registers. The microprocessor can write data asynchronously and the FWLUC contains circuitry for handling the asynchronous data transfer. Depending upon when the microprocessor attempts to write to the LUIB, the FWLUC makes the decision to either allow the operation or to store the data and the fact that a write occurred and allow the transfer in the following frame.

On a line unit the CODEC is programmable. The FWLUC contains registers that allow the microprocessor to program the CODEC or to audit the current state of the device. This is achieved through a state machine that gates data to the CODEC, when instructed by the microprocessor. The line unit also has an equalizer which includes filters that adjust the slope, height and bandwidth of the frequency response. The frequency response is programmable by a serial input data stream. The FWLUC contains registers that allow the microprocessor to program and audit the equalizer through a state machine when instructed to do so by the microprocessor.

A primary objective of the present invention is to provide an interface between four-wire line units of a line shelf and common equipment of the line shelf.

Another objective of the present invention is to provide storage for data provided to a microprocessor on a four-wire line unit.

Another objective of the present invention is to provide an interface between the data storage and the microprocessor.

Another objective of the present invention is to facilitate the programming of a line unit CODEC.

Another objective of the present invention is to provide for the programming of a line unit equalizer.

Another objective of the present invention is to facilitate the auditing of a line unit CODEC.

Another objective of the present invention is to facilitate the auditing of a line unit equalizer.

DESCRIPTION OF THE DRAWINGS

FIG. 2, comprising

FIG. 2C is a block diagram of the line unit 30 shown in FIG. 2B.

FIG. 4, comprising FIGS. 4A and 4B, is a block diagram of the present invention.

FIG. 5, comprising FIGS. 5A1 and 5A2, and FIG. 5B show some of the signal timing relationships used in the present invention.

FIG. 6, comprising

FIG. 7, comprising

FIG. 8, comprising

FIG. 9, comprising

FIG. 10, comprising

FIG. 11, comprising

FIG. 12, comprising

FIG. 20, comprising FIGS. 20A, 20B, 20C and 20D, is a schematic diagram of the microprocessor interface 64 of FIG. 7.

DETAILED DESCRIPTION OF THE PRESENT INVENTION

Figure 1:
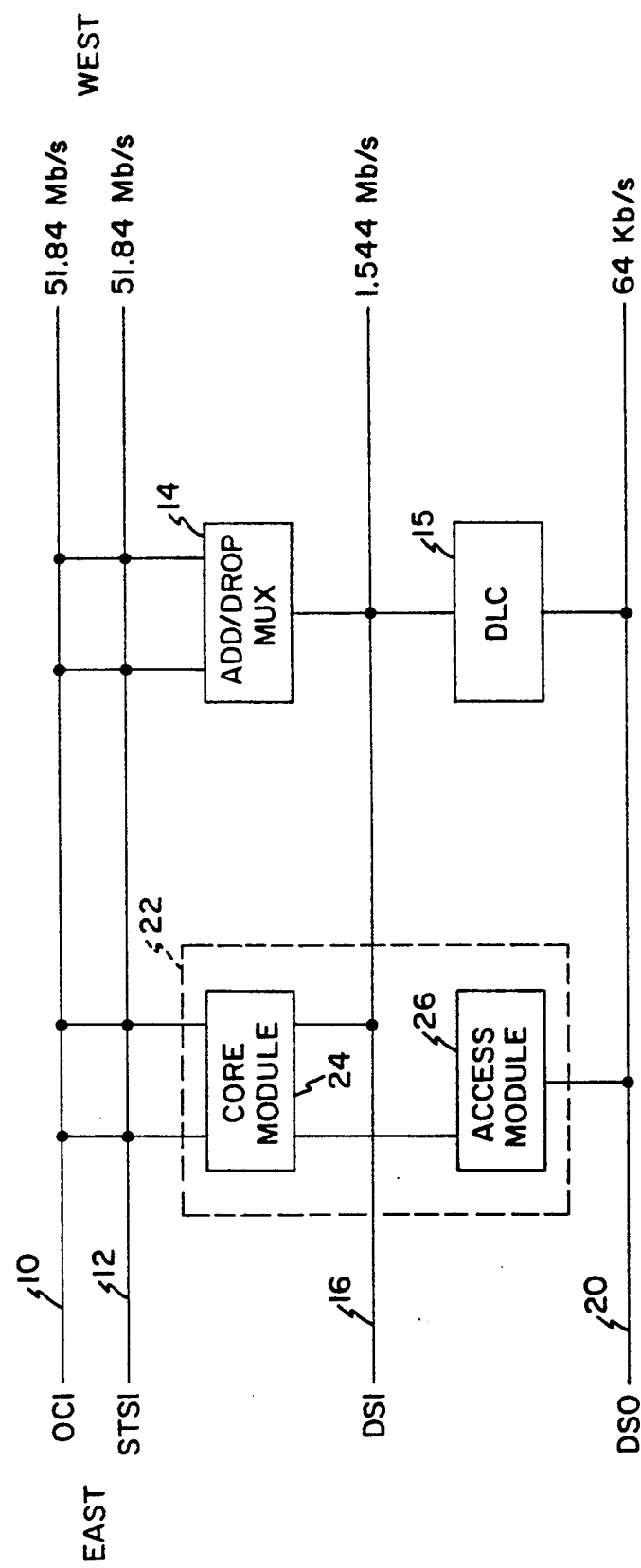
FIG. 1 is a block diagram illustrating the environment in which the present invention is used as compared to that of the prior art.
Figure 2A:
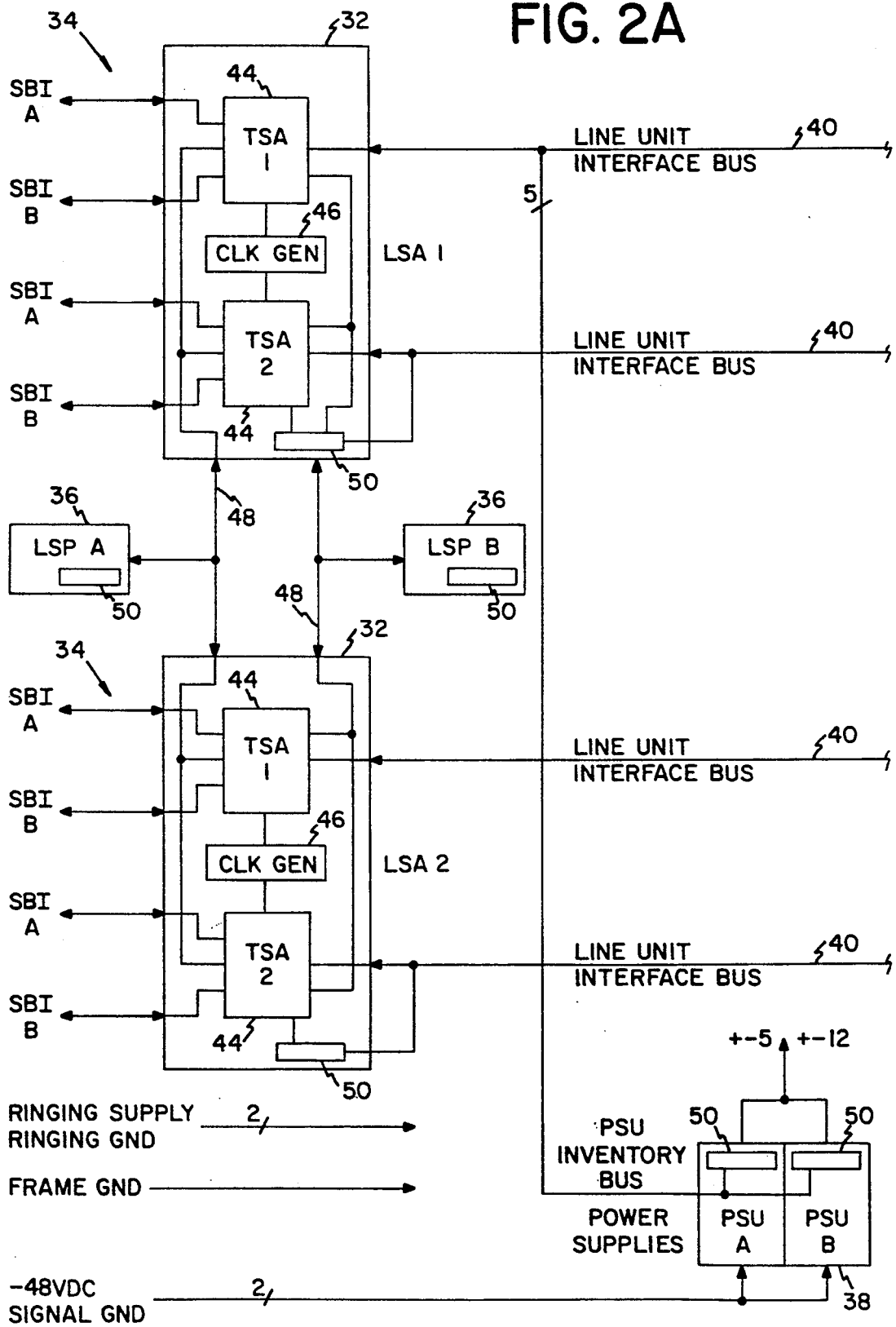
FIGS. 2A and 2B, is an overall block diagram of a line shelf in which the present invention is used.
Figure 2B:
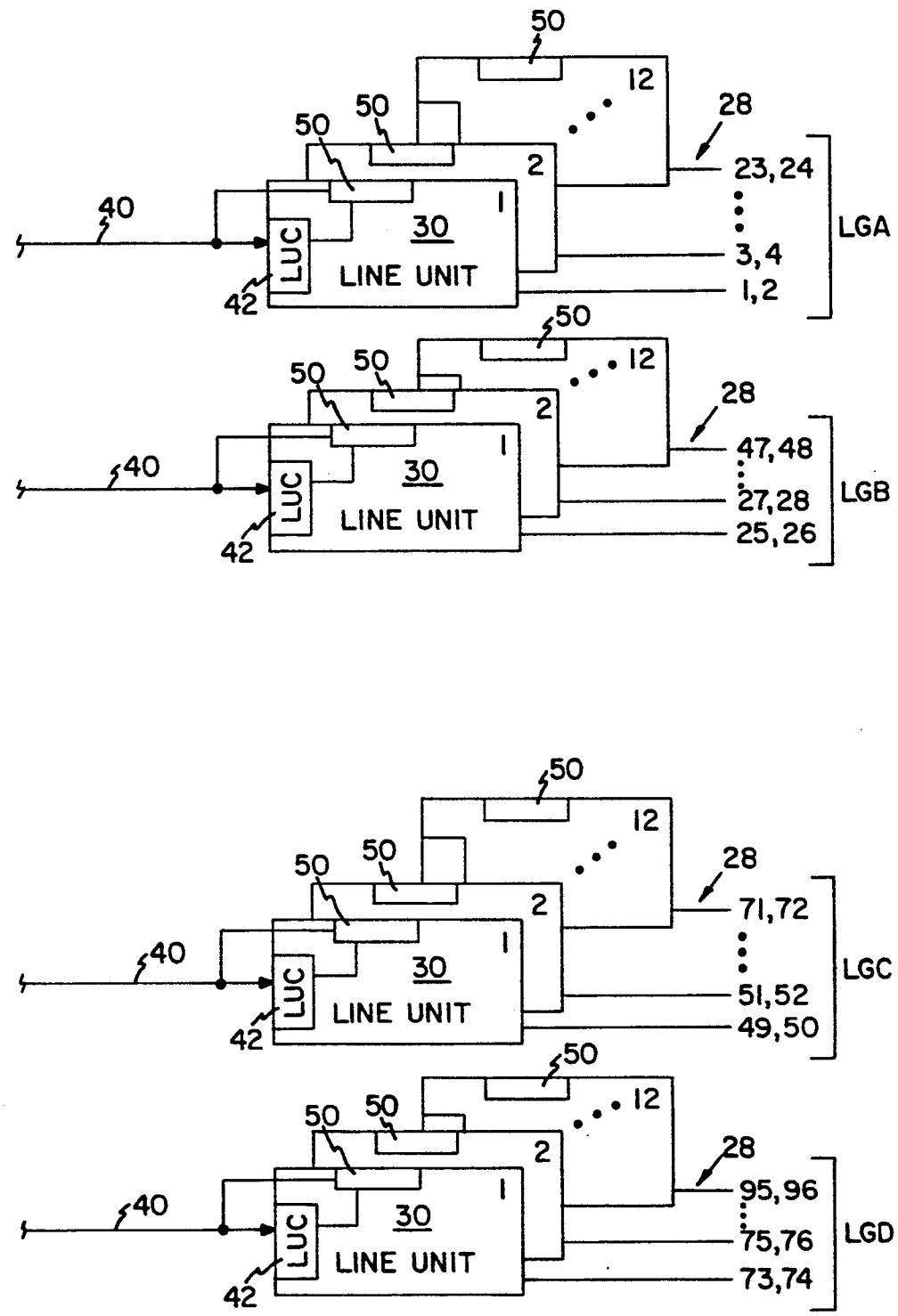

Referring to FIG. 2, there is shown a block diagram of a line shelf used in the access module 26. Each line shelf is arranged with four groups 28 of subscriber lines at the DS0 level. Each of the groups includes 12 line units (LUs) 30, most LUs are capable of handling two subscriber lines so that a total of 96 subscriber lines may be handled by a line shelf. The LUs 30 include four-wire line units which handle only one subscriber line. A pair of line shelf access units (LSAs) 32 are arranged to each service two of the groups 28 of subscriber lines and function to multiplex the DS0 channels of these groups to a pair of serial interface buses (SBIs) 34, one of which is redundant. Two line shelf processors (LSPs) 36 are provided to control the LSAs 32, with each processor having sufficient capacity to control the entire line shelf in the event of failure of the other processor. Thus, in normal operation both processors work at less than full capacity. In the event of a failure, one processor can service the line shelf with only slightly degraded service. Two power supplies 38 are also provided, with one being redundant.

The LSAs 32 are connected to the various LUs 30 via line unit interface buses 40. The line unit interface buses (LUIB) 40 interface with a line unit interface circuit (LUC) 42 provided in each of the LUs 30. The LUCs 42 perform all the functions necessary to access the line unit interface buses 40 with the LUs 30. For purposes of the present invention, the LUs 30 will be considered to be four-wire line units (FWLUs) and the LUCs 42 will be four-wire line unit interfaces (FWLUCs).

The FWLUs 30 are plugged into slots in the line shelf, which includes connectors to the line unit interface bus 40. The connectors have five pins that are selectively strapped to provide a five-digit identification code for the slot and the subscriber line on the plugged-in FWLU. The LSP periodically scans the various card positions and can detect when a card is plugged into an identified slot.

EEPROMs 50 are provided on each of the pluggable card units, such as the FWLUs, LSAs, LSPs and power supplies. The EEPROMs 50 provide storage for identification and inventory information about each card and other programmable data relating to the circuitry on each card.

The LSAs 32 each include two time slot access circuits (TSAs) 44 and a clock generator 46. The TSAs 44 are connected to each LSP 36 via LSP buses 48 and perform most of the functions of the LSAs 32.

The TSAs 44 perform the following functions in the access terminal 22: reception and transmission of SBI signals; detection and generation of UNICODE and performance of required tasks associated with UNICODE; collection of PCM-formatted information from the FWLUs and the LSPs; distribution of PCM information to FWLUs and the LSPs; generation of configuration codes to indicate to the FWLUs which time slot is available on the various line unit interface buses 40; generation of a coded signal provided in channel 30 of each frame indicating an offset delay between the receive time slot for a subscriber line and the transmit time slot for a subscriber line, which delay is dependent upon delays encountered during initialization of the system; translation of signaling information between the SBIs and the FWLUs by utilization of RAM-based translation tables provisioned by the LSP; LSP access in both read and write modes to all memory and control registers on the TSA, including access to the time slots of the line unit interface bus and the SBI; reception and transmission of inter-module messages on the VI channel; control of EEPROMs on each plug-in unit; and the provision of storage for information to be transmitted to and received from the various elements connected to the TSA.

Figure 3:
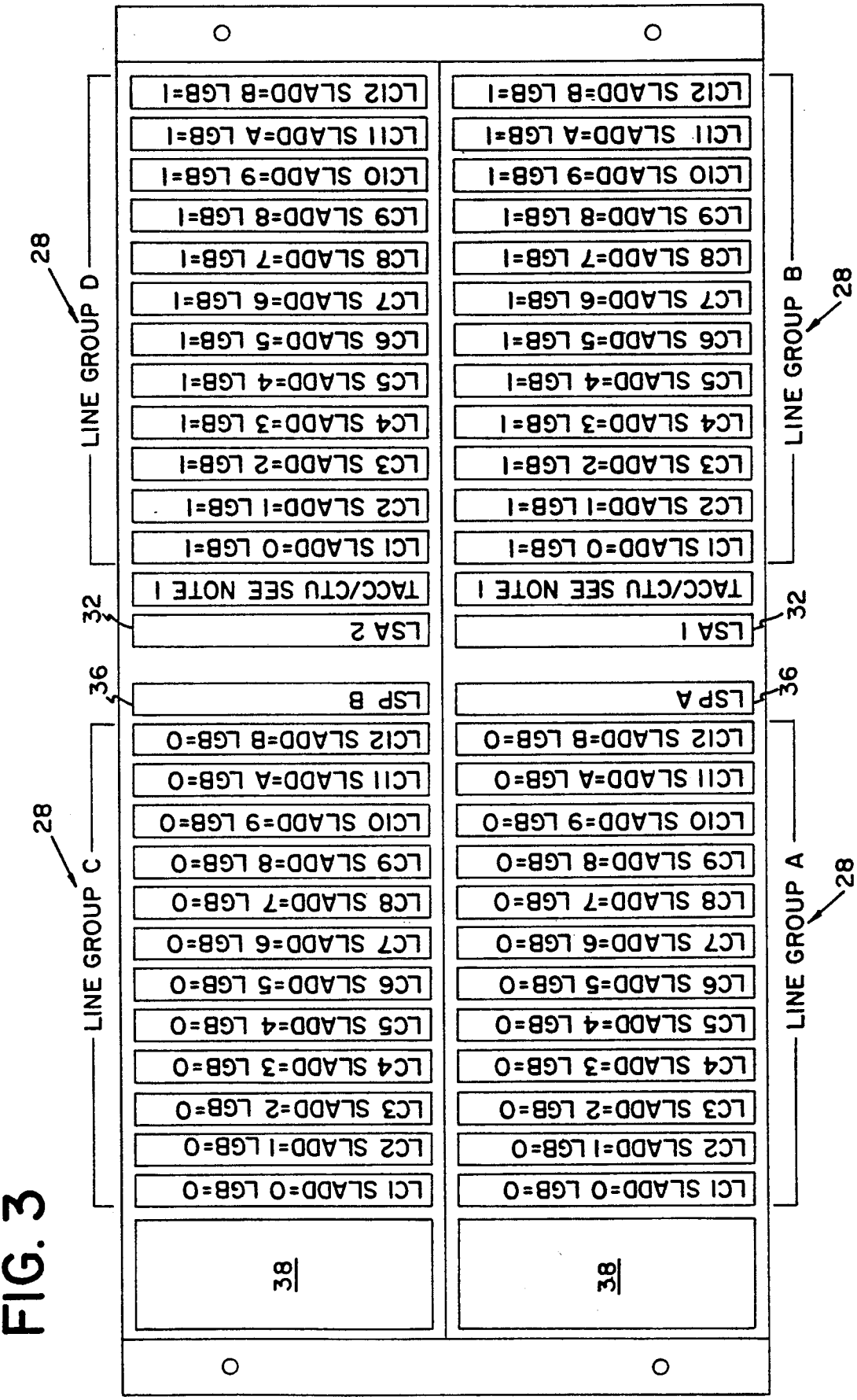
FIG. 3 is an elevational view showing the structural configuration of a line shelf in which the present invention is utilized.

Referring to FIG. 3, there is shown the arrangement of a line shelf having four groups of line units 28, each group consisting of 12 line units serving up to 24 separate subscriber lines or 12 subscriber lines if only FWLUs are used. Each line unit is inserted in a designated slot and is connected to back plane wiring. Line groups A and C on the left side of the line shelf are identified as being associated with a line group 0, while the line units of line groups B and D are on the right side of the shelf and are associated with a line group 1.

For the LSA 32 of FIG. 2 to assign a time slot on a line unit interface bus (LUIB) 40 to a subscriber line, a slot address including the slot number of the line unit 28 serving the subscriber line, the line group bit (LGB) for the slot and the channel A or B bit for the line unit, if a two-wire line unit, is sent over an RX configuration bus (CONR), a line of the LUIB 40, as a coded configuration word two time slots before the actual time slot to be assigned. This timing allows the FWLUC 42 enough time to decode the configuration word.

Figure 4A:
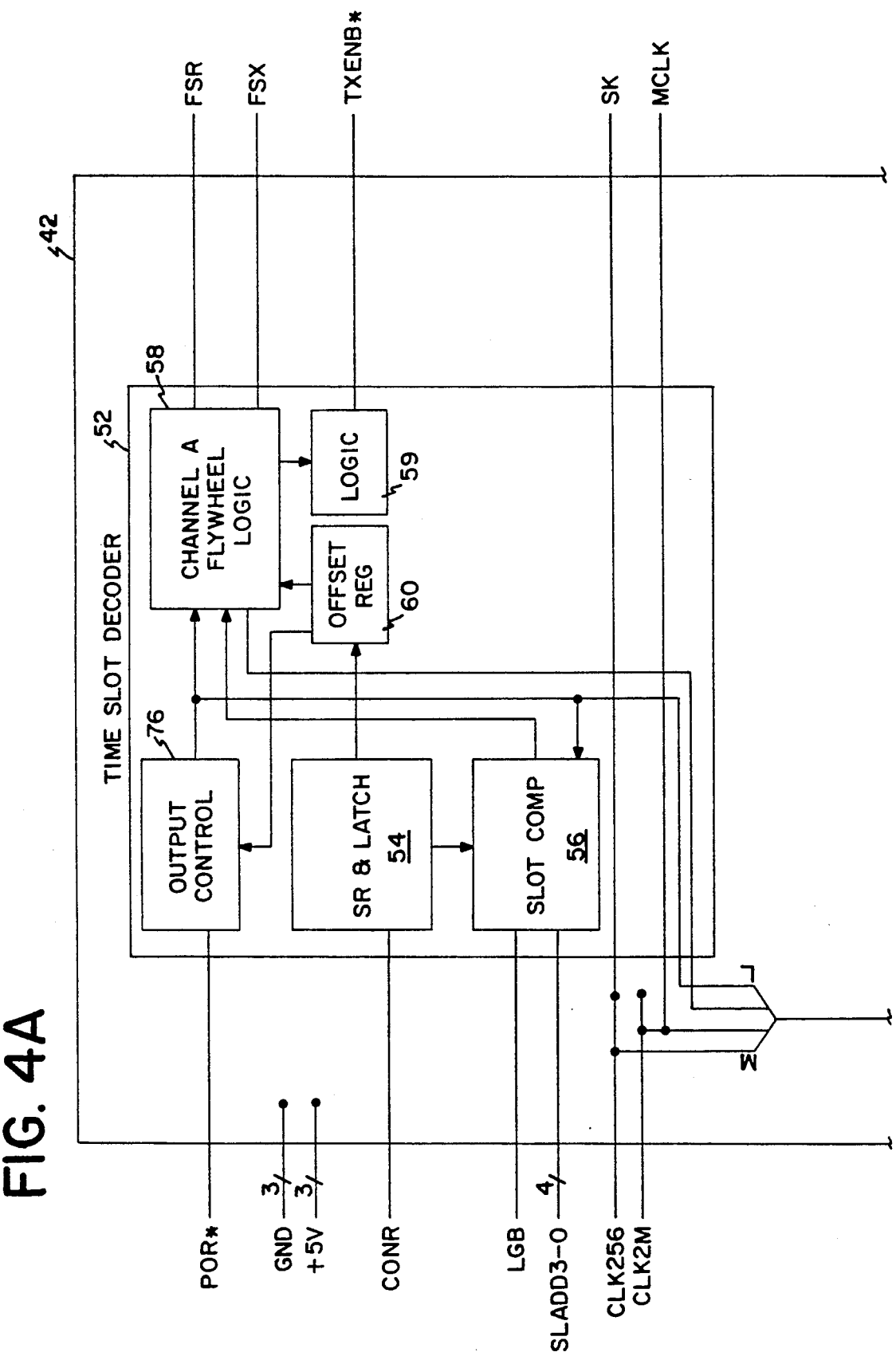

Referring to FIG. 4, there is shown a block diagram of the FWLUC 42. The configuration word from the CONR bus is received and latched in a shift register and latch 54 that is part of a time slot decoder 52. The FWLUC 42 compares this received slot address to hard-wired slot address pins (SLADD0-3) from the backplane and compares the received LGB bit to the LGB bit from the backplane in a slot comparator 56. Then the FWLUC determines if the LU is being assigned to a time slot and generates an appropriate timing strobe.

After the CONR data is decoded, the timing strobe is sent to a flywheel circuit 58. This circuit reduces the chance of an intermittent error in the CONR data producing an incorrect activation strobe to activate an inappropriate line unit channel. The flywheel circuit is centered around a 5-bit counter that counts from 0-31, the number of time slots in a frame. It takes two frames of a new strobe address to re-sync the 5-bit counter to a new time slot position. When the counter is in sync, the output will be zero one time slot before the strobes are produced.

The receive and transmit time slots in the TSA chip can have an offset of from 0-31 time slots. This offset is sent as an offset number by the TSA over the CONR line of LUIB 40 in time slot 30. The offset number does not change after it is set by the TSA, unless the TSA re-syncs. An offset register circuit 60 latches the offset number and must receive two offset numbers of equal value for the register to be updated.

Signaling and provisioning data is processed in signaling and provisioning circuit 61 which includes sub-blocks for handling received signaling, transmitted signaling, received provisioning data and transmitted provisioning data. Signaling data (SIGR) is received from the LUIB 40 in serial format and is converted to eight parallel output bits once per frame for the appropriate time slot. This data is latched into a receive signaling register, which is part of a register file 63, to be read by the a microprocessor 31 of the line unit 30 as shown in FIG. 2C.

Transmit signaling (SIGT) is provided from the microprocessor 31 and is written to a transmit signaling register, which data is latched and converted to serial data and gated onto the LUIB with the transmit strobe from the time slot decoder 52.

Received provisioning data (PROR) is received from the LUIB in serial format and converted to parallel outputs. Once per frame, data is gated into a six-byte FIFO 62 with the receive strobe from the time slot decoder 52. After storing six bytes of provisioning data, an interrupt signal INT is sent to the microprocessor. The microprocessor then reads the data and provisions the FWLU.

Transmit provisioning data (PROT) is written by the microprocessor into a transmit provision register in register file 63. This data is latched, converted to serial data and gated onto the LUIB every frame with a transmit strobe from the time slot decoder 52.

For CODEC provisioning, the microprocessor writes 16 bits representing transmit and receive gain to two CODEC registers contained in register file 63. The FWLUC then serially clocks the bits to the CODEC 35 with a clock generated by a 12 MHz crystal of the microprocessor. In a similar manner for EQUALIZER 37 provisioning, the microprocessor selects 14 bits from the provisioning bytes to provision the EQUALIZER 37. The FWLUC serially clocks the data to the EQUALIZER 37.

The data to the CODEC 35 and the EQUALIZER 37 share a common pin (CLNKIN). The clock used to clock the data to both devices is also provided on a common pin (CLNCLK). A chip select (CS*) output selects which device is being written to. If chip select is low, the CODEC is selected, if high, the EQUALIZER 37 is selected.

The FWLUC has the capability to audit both the CODEC 35 and the EQUALIZER 39 control data. To audit the CODEC 35, an instruction byte is strobed to the CODEC when chip select is active low, and CLNCLK is generated. During the last eight clock pulses of CLNCLK, data is shifted into the FWLUC on the CODEC 35 data in signal (CO). The microprocessor 31 then latches the appropriate microprocessor memory address and selects the proper internal tristate buffer to read this data. To audit the equalizer the instruction bit is written to a control register in the FWLUC. This generates an audit pulse, followed by 14 clock pulses on CLNCLK. Data from the EQUALIZER 37 is clocked out of the EQUALIZER 37 with this clock and is stored in registers in the FWLUC. The microprocessor then latches the microprocessor memory addresses for EQ0 and EQ1, enables an internal tri-state buffer with the memory address signal, and reads the data.

The EEPROM chip select 69 is controlled by bit 6 of a configuration word received on CONR from the TSA. Bit 6 is used in logic 70 to generate an EECS output which is used to activate EEPROM 50 used in storing inventory control information and provisioning information.

The FWLUC receives and transmits a plurality of signals that are identified in Table 1. The signals marked * are active when low.

TABLE 1

| Signal Name | Signal Description | Interface In/Out | Type |
| --- | --- | --- | --- |
| CLNCLK | EQUALIZER/CODEC Clock | Output | Tri-State |
| CO | CODEC Data In | Input | CMOS |
| CS* | CODEC Ship Select | Output | Tri-State |
| MCLK | CODEC Master Clock | Output | |
| TXENB* | Transmit Enable | Output | Tri-State |
| TEST | Test | Input | CMOS |
| TESTI1 | Test In 1 | Input | CMOS |
| FSR | Frame Sync Receive | Output | Tri-State |
| FSX | Frame Sync Transmit | Output | Tri-State |
| AD0 | Processor Addr/Data 0 | In/Out | TTL BIDIR! |
| AD1 | Processor Addr/Data 1 | In/Out | TTL BIDIR! |
| AD2 | Processor Addr/Data 2 | In/Out | TTL BIDIR! |
| AD3 | Processor Addr/Data 3 | In/Out | TTL BIDIR! |
| GROUND | Supply Reference | | |
| +5 V | Supply | | |
| AD4 | Processor Addr/Data 4 | In/Out | TTL BIDIR! |
| AD5 | Processor ADDR/Data 5 | In/Out | TTL BIDIR! |
| AD6 | Processor Addr/Data 6 | In/Out | TTL BIDIR! |
| AD7 | Processor Addr/Data 7 | In/Out | TTL BIDIR! |
| WR* | Processor Write | Input | TTL! |
| RD* | Processor Read | Input | TTL! |
| ALE | Processor ALE | Input | TTL! |
| INT* | Processor Interrupt | Output | Tri-State |
| CLK12M | 12 MHz Clock | Input | SCHM CMOS |
| REL0 | Relay Output 0 | Output | Tri-State |
| REL1 | Relay Output 1 | Output | Tri-State |
| REL2 | Relay Output 2 | Output | Tri-State |
| REL3 | Relay Output 3 | Output | Tri-State |
| REL4 | Relay Output 4 | Output | Tri-State |
| REL5 | Relay Output 5 | Output | Tri-State |
| REL6 | Relay Output 6 | Output | Tri-State |
| REL7 | Relay Output 7 | Output | Tri-State |
| REL8 | Relay Output 8 | Output | Tri-state |
| REL9 | Relay Output 9 | Output | Tri-State |
| EEPROG* | EEProgram Low | Input | CMOS |
| SK | EEPROM Clock | Output | |
| EECS | EEPROM Chip Select | Output | Tri-State |
| TEST01 | Test Out 1 | Output | |
| TEST02 | Test Out 2 | Output | |
| CLK2M | 2.048 MHz Clock | Input | CMOS |
| CLK256 | 256 KHz Clock | Input | CMOS |
| NDOUT | NAND Out | Output | |
| EECS* | EEPROM Chip Select Low | Output | Tri-State |
| CONR | Configuration Receive | Input | CMOS |
| PROT | Provision Transmit | Output | |
| PROR | Provision Receive | Input | CMOS |
| SIGT | Signaling Transmit | Output | |
| SIGR | Signaling Receive | Input | CMOS |
| LGB | Line Group Bit | Input | CMOS |
| SLADD3-0 | Slot Address 3-0 | Input | CMOS |
| POR* | Power On Reset | Input | SCHM CMOS |
| WDT | Processor Watchdog Timer | Output | Tri-State |
| EQICLK | EQUALIZER Clock | Output | Tri-State |
| BP (REL 10) | EQUALIZER Bypass | Output | Tri-State |
| BP* (REL 11) | EQUALIZER Bypass Low | Output | Tri-State |
| AUDIT | EQUALIZER Audit | Output | Tri-State |

TABLE 1-continued

| Signal Name | Signal Description | Interface In/Out | Type |
|---|---|---|---|
| PROV | EQUALIZER Provision | Output | Tri-State |
| LNKOUT | EQUALIZER Data In | Input | CMOS |
| CLNKIN | EQUALIZER/CODEC Data | Output | Tri-State |

The following is a brief functional description of the signals listed in Table 1:

| | |
|---|---|
| POR* | Power On Reset low. This input inhibits strobes to the line unit and resets part of the circuits in the FWLUC. |
| SLADD3-0 | SLot ADDress 3-0. Bits 3-0 of the slot address. |
| LGB | Line Group Bit. This bit indicates which line group the line unit is installed in. LGB = 0 indicates the left side of the line shelf; LBB = 1 indicates the right side. |
| CLK256 | CLocK 256 KHz. A 256 KHz clock from the TSA 44 on the LSA 32. Low for the first 4 bits and high for the second 4 bits, and corresponding in frequency to the time slot rate. |
| CLK2M | CLocK 2.048 MHz. A 2.048 MHz clock from the TSA 44 on the LSA 32. |
| SIGR | SIGnaling Receive. Signaling data from the TSA 44 on the LSA 32 at a data rate of 2.048 MHz, 32 time divisions multiplexed, 8 bits per sample, 8 KHz sample rate. |
| SIGT | SIGnaling Transmit. Signaling data to the TSA 44 on the LSA 32 at a data rate of 2.048 MHz, 32 time divisions multiplexed, 8 bits per sample, 8 KHz sample rate. |
| CONR | CONfiguration Receive. Configuration data from the TSA 44 on the LSA 32 at a data rate of 2.048 MHz, 32 time divisions multiplexed, 8 bits per sample, 8 KHz sample rate. |
| FSX | Frame Sync Transmit. High active output strobes to the CODEC to indicate the beginning of transmit time slots. |
| FSR | Frame Sync Receive. Active high strobes to the CODEC to indicate the beginning of receive time slots. |
| EECS | EEprom Chip Select. An EEPROM chip select signal to activate EEPROM 50 on the line unit. Output, Tri-state. |
| EECS* | EEPROM Chip Select Low. Active low output used to enable a tri-state buffer for the EEPROM data when the EEPROM chip select is active. Output, Tri-state. |
| SK | EEprom CLocK. A 256 KHz EEPROM clock the same as CLK256. |
| EEPROG* | EEprom PROGram LOW. This signal tri-states selected FWLUC outputs for test purposes. This signal is only provided during factory testing and does not come from the LUIB. |
| REL9-2 | RELay 9-2. These outputs are normally used to drive relay drivers. |
| PROR | PROvisioning Receive data. Data from the TSA 44 on the LSA 32 at a data rate of 2.048 Mb/s, 32 time divisions multiplexed, 8 bits per sample, 8 Kb/s sample rate. Input, CMOS compatible. |
| PROT | PROvision Transmit. Data to the TSA 44 on the LSA 32 card. Data rate 2.048 MHz, 32 time divisions multiplexed bits per sample, 8 KHz sample rate. Output, CMOS compatible. |
| CS* | Chip Select Low. Active low strobe to the CODEC used with CLK2048 to clock control words in and out of the control interface. Output, Tri-state. |
| CO | Control Out. Data from the CODEC. Serial information is shifted out of the CODEC with CLNCLK when CS is low. Input, CMOS compatible. |
| MCLK | Master CLocK. 2.048 MHz clock to the CODEC. Output, Tri-state. |
| CLNKIN | CODEC/EQUALIZER Input. Multiplexed data to the CODEC and EQUALIZER. Serial control information is shifted to these devices with CLNCLK. Output, Tri-state. |

-continued

| | |
|---|---|
| CLNCLK | CODEC/EQUALIZER Clock. Multiplexed clocks to the CODEC and EQUALIZER. 1.544 MHz rate. Output, Tri-state. |
| AUDIT | AUDIT. Data to the EQUALIZER. This active high data enables serial control information to be shifted out of the EQUALIZER. Output, Tri-state. |
| PROV | PROVISION. Data to the EQUALIZER. This active high data enables a latch to provision the EQUALIZER according to the control information. Output, Tri-State. |
| LNKOUT | LINK OUTput. Data from the EQUALIZER. Serial control information from the EQUALIZER is shifted out with CLKCLK. Input, CMOS compatible. |
| EQICLK | EQUALIZER CLock. Clock to the EQUALIZER. This 1.544 MHz clock to the EQUALIZER form which any filter clocks may be derived. Output, Tri-state. |
| BP (REL10) | BYPASS. This active high signal sets the EQUALIZER in a bypass mode. Output, Tri-state. |
| BP* (REL11) | Bypass low. This active low signal sets the EQUALIZER in the normal mode. Output, Tri-state. |
| AD (7-0) | Address/Data Bus. Address and Data interface to the microprocessor. Input/Output, pseudo TTL compatible/Tri-state, respectively. |
| WR* | Microprocessor Write Control Line. Active low Input, pseudo TTL compatible. |
| RD* | Microprocessor Read Control Line. Active low Input, pseudo TTL compatible. |
| ALE | Microprocessor Address Latch Enable Control Line. Active high input, pseudo TTL compatible. |
| INT* | Microprocessor Interrupt Control Line. Active low output signal to the Microprocessor. Tri-state. |
| WDT | Microprocessor Watchdog Timer. Timer output to the microprocessor goes active high to reset the processor. Output, Tri-state. |
| CLK12M | 12.352 MHz Input Clock. Input, CMOS compatible. |
| TXENB* | Transmit ENaBle. Strobe used to enable tri-state backplane drivers (located outside the FWLUC chip) during the transmit time slot. Output, CMOS and TTL compatible. |
| TEST | TEST PIN. Active high. Puts the ASIC in test mode. Input, CMOS compatible. |
| TESTI1 | Test Input 1. Input pin for testing purposes. Input, CMOS compatible. |
| TESTO1 | Test Output 1. Provides visibility of 3 MHz clock output for testing purposes. Output, CMOS compatible. |
| TESTO2 | Test Output 2. Provides visibility of timer output for testing purposes. Output, CMOS compatible. |
| NDOUT | Nand out. Parametric output. CMOS compatible. |

Figure 5C:
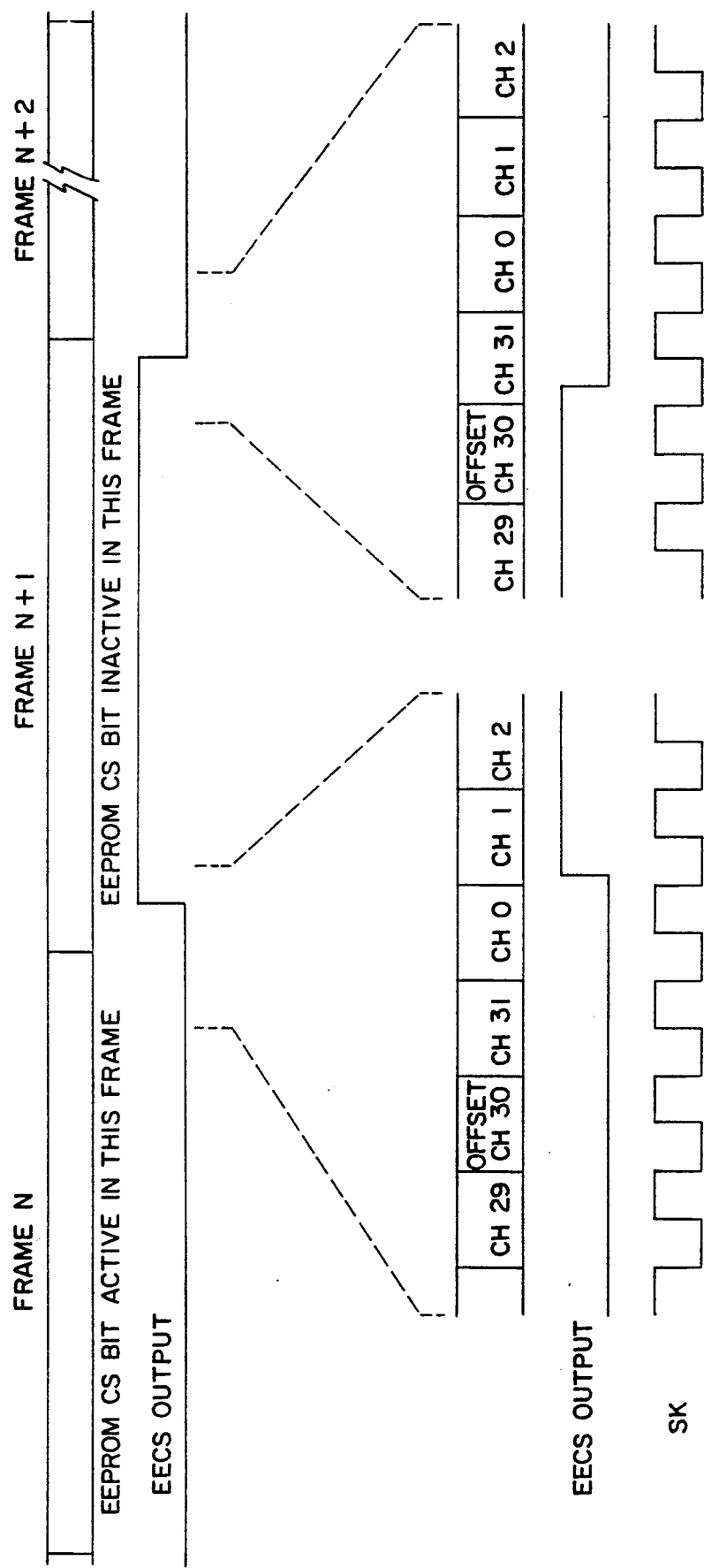
FIG. 5C shows additional original timing relationships used in the present invention.

The input and output timing for the FWLUC is shown in FIGS. 5A to 5C. The data is transmitted on the LUIB 40 in 125 us frames, each having 32 time slots. Eight data lines are illustrated in FIG. 5A, representing the receive and transmit lines for PCM data (this data is connected directly to the line units and not through the FWLUC), signaling data, provisioning data and configuration data. Each time slot is further subdivided into eight bits, with the input FWLUC data that is received being ½ bit time prior to the output FWLUC data that is transmitted. The 2.048 MHz clock is shown having a rate equal to the bit rate and the 256 KHz clock having a rate corresponding to the time slot rate. FIG. 5B shows various timing signals in greater detail, while FIG. 5C shows the timing of the EEPROM chip select, EECS, output, particularly in relation to the beginning and ending of the frames.

Referring again to FIG. 4, an output control 76 receives the Power On Reset (POR*) signal which, when low, will force low level outputs on the FSR, FSX and on TXENB*. After POR* goes high, these signals will stay in this state until the FWLUC decodes a valid offset number from the CONR input. If a valid offset number is loaded in during the time POR* is low, then it will take a maximum of three frames (125 us each) to start producing the strobes listed above. POR* should be held low a minimum of six cycles of the 2.048 MHz clock. A typical value for the POR* input low time is 200ms to 500 ms. This will allow time for the line unit to be plugged in and the power supply voltages to stabilize.

CLK2M is used to clock eight serial data bits from the CONR line into an 8-bit shift register and latch 54. Table 2 shows the format of the 8-bit byte. The Line Shelf Process (LSP) programs the TSA chip to send this information to the FWLUC. This byte is sent two time slots before the receive data. For example, if a valid CONR byte were to be sent in time slot 5, the receive PCM, SIGR and PROR data would be in time slot 7.

TABLE 2

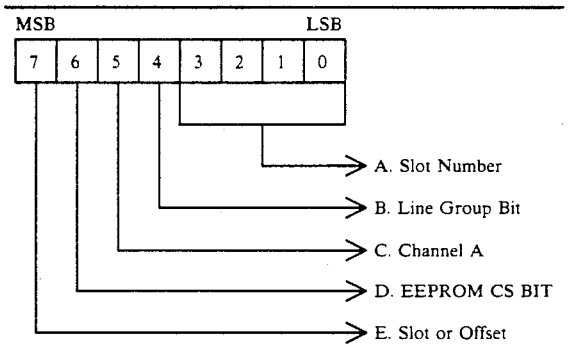

A. Slot Number: This number (0 thru F) is compared in slot comparator 56 to the slot address (SLADD3-0) from the backplane. If they are equal, the LUIB data is assigned to the line unit in this slot address.
B. Line Group Bit (LGB): The LGB is used in mode 2 operation (mode 2 without a time slot interchanger). In mode 2 operation, the LSA has one TSA that drives two line groups (one on the left and one on the right of the line shelf). This bit will indicate which line group the time slot is assigned to. Looking at the front of the line shelf in FIG. 3, line group "0" is on the left side and line group "1" is on the right side. If mode 2 is not used, then there are two TSAs on the LSA. In this case, the LGB must be set equal to the line group that the TSA is connected to. The LGB should be set to 0 if the TSA is connected to the left line group, and 1 if connected to the right.
C. Channel A = 0: After the slot number and LGB have been received from the CONR data line, the channel bit indicates channel A should be enabled. In a four-wire line unit there usually is only one channel, as opposed to channels A and B in a normal two-wire line unit.
D. EEPROM Chip Select BIT: If this bit is high, the FWLUC will produce starting in the next frame a high output on pin "EECS" starting two time slots after the offset channel through the next offset channel, as shown in FIG. 5C.
E. Slot = 0, Offset = 1: This bit indicates to the FWLUC if the received CONR data byte is a slot number or an offset number. Offset numbers only appear in time slot 30.

The line group bit (LGB) and slot address (SLADD-3-0) are supplied by the backplane to the slot comparator 56. These numbers are compared to the LGB and slot address from the received CONR data from latch 54 to determine when the receive strobes should be generated.

The flywheel circuit 58 is used to prevent intermittent errors in the CONR data from causing the FWLUC to generate RX and TX strobes in the incorrect time slots. This flywheel is made up of a 5-bit counter, 2-bit shift register, and miscellaneous logic. The circuit is centered around the 5-bit counter that counts from 0 to 31 to count 32 time slots and is synchronized to the presently-assigned time slot. After two frames of a new slot address, the 5-bit counter is synchronized to a new time slot. When the counter is in sync, the output will be equal to zero one time slot before the strobes are produced. The outputs of the flywheel circuit include the strobes FSR and FSX.

The flywheel circuit 58 provides an output to logic 59 which outputs TXENB*, a strobe used to enable tri-state backplane drivers, not part of the FWLUC, during the TX time slots of the FWLU.

The flywheel circuit also detects when a valid slot address and LGB have not been received in any time slot of a frame and if there have been more than two time slots with a valid slot address and LGB being received in one frame. If either case is detected, the RX and TX strobes for the appropriate channel will be disabled.

The details of the flywheel circuit may be found in the previously-mentioned U.S. patent application Ser. No. 451,436.

The TSA may generate an offset between the receive and transmit channels due to delays created in the system during initialization. This offset does not change once the system is powered up, unless the TSA re-syncs. The TSA sends an offset number, representing time slots, to the FWLUC over the CONR data line once each frame in time slot 30. The offset register 60 stores the offset number and must receive two offset numbers of equal value before the register is updated. The RX strobe is delayed the number of time slots equal to the offset number. This delayed RX strobe is then used as the TX strobe. For example, if the offset number is equal to zero, then the RX and TX strobes will be in the same time slot. If the offset is equal to 15, then the TX strobe will occur 15 time slots after the RX strobe.

The TSA sends the offset number on the CONR line in time slot 30. The byte configuration for conveying offset is shown in Table 3.

TABLE 3

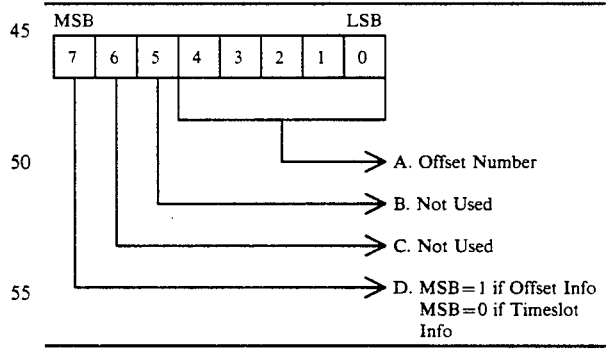

Referring again to FIG. 4, the interface for signaling and provisioning is found within circuit 61, which includes a FIFO 62, a register file 63 and a microprocessor 31 interface 64.

Data and microprocessor memory addresses are transferred between a microprocessor 31 on a FWLU and the FWLUC on a bidirectional bus AD7-0. To access a specific microprocessor memory address, the microprocessor outputs an ALE (address latch enable) signal to the FWLUC. On the falling edge of the ALE signal, the four least sgnficant bits (AD3-0), of the bus, which specify the microprocessor memory address are latched. To read from any of the FWLUC registers, the microprocessor 31 sends an active low read pulse, and the selected address is decoded when the read pulse is received, and the appropriate internal tristate buffer in the FWLUC is enabled. The read pulse is also used to enable the AD7-0 bidirectional bus.

To write to any of the FWLUC registers, the microprocessor 31 sends an active low write pulse. The selected address is decoded when the write pulse is received and the appropriate enable is generated. The rising edge of this active low enable signal is used as a clock input, and the data on the address/data bus is written to the selected address.

The FWLUC contains gate array registers which are memory mapped at addresses 0-15HEX, as shown in Table 4.

TABLE 4

| Address | Name | Description | Type |
|---|---|---|---|
| 00HEX | PROR0 | Provision Read Register 0 | READ |
| 01 | PROR1 | Provision Read Register 1 | READ |
| 02 | PROR2 | Provision Read Register 2 | READ |
| 03 | PROR3 | Provision Read Register 3 | READ |
| 04 | PROR4 | Provision Read Register 4 | READ |
| 05 | PROR5 | Provision Read Register 5 | READ |
| 06 | SIGR | Signaling Receive | READ |
| 07 | SIGT | Signaling Transmit | WRITE |
| 08 | PROT | Provision Transmit | WRITE |
| 09 | CONTROL | Control Watchdog and EQ Aud | WRITE |
| 0A | CODEC0 | CODEC First Byte | WRITE |
| 0B | CODEC1 | CODEC Second Byte | RD/WR |
| 0C | EQ0 | EQUALIZER First Byte | RD/WR |
| 0D | EQ1 | EQUALIZER Second Byte | RD/WR |
| 0E | LATCH0 | Relay Latch0 Byte | RD/WR |
| 0F | LATCH1 | Relay Latch1 Nibble | RD/WR |

The CONTROL (Control Watchdog and EQ Aud) register is defined as follows:

| | MSB | | | | | | | LSB |
|---|---|---|---|---|---|---|---|---|
| Bit Position | X | X | X | X | X | X | 1 | 0 |

Bit 1: WDRST (Watchdog Reset)
 0 = Gate Array will automatically clear this bit.
 1 = Reset Watchdog.
 Watchdog timer will reset microprocessor if WDRST is not set within 10.88 ms.
Bit 0: AUDEQ (Audit Equalizer)
 0 = Gate Array will automatically clear this bit.
 1 = Audit EQUALIZER.
 Audit data will be available in EQ0 and EQ1 no earlier than 21 us after setting AUDEQ.

The FIFO 62 receives provisioning data from the LUIB in serial format and converts the data to parallel outputs. Once per frame data is gated into a 6-byte FIFO with the receive strobe from the time slot decoder 52. After storing six bytes of provisioning data, an active low interrupt pulse, INT*, 40 us long is sent to the microprocessor 31. This data is then available to be read by the microprocessor 31 in the manner previously described.

The register file 63 contains registers that the microprocessor 31 can access, said registers storing receive signaling, transmit signaling, provision receive and provision transmit data. The register file also contains registers to provision and audit the CODEC and EQUALIZER and the watchdog timer.

The signaling data SIGR is clocked into a shift register with strobes from the flywheel circuit. The data is then stored and is available to be read by the microprocessor 31. The format of the data is shown in Table 5.

TABLE 5

| | MSB | | | | | | | LSB |
|---|---|---|---|---|---|---|---|---|
| Time Slot Bit Position | 7 | 6 | 5 | 4 | 3 | 2 | 1 | 0 |
| TSA Bit Name | A | B | C | D | 3 | 2 | 1 | 0 |

Parallel transmit signaling data from the microprocessor 31 is latched. This data is then converted to serial data and gated onto the transmit signaling bus with the transmit strobe from the time slot decoder 52. The format for the data is similar to that shown in Table 5 for the receive signaling data.

Parallel provisioning transmit data from the microprocessor 31 is latched. This data is then converted to serial data and gated onto the provisioning transmit bus with the transmit strobe from the time slot decoder 52.

The timing relationships between the microprocessor 31 and the SIGT, SIGR, PROT and the PROR buses are important. Once per frame, provisioning data PROR is latched into registers with the frame sync strobe FSR. After storing six bytes of provisioning data, an active low 40 us interrupt signal is sent to the processor. After the interrupt is activated, the processor must access nine registers in the FWLUC before the next FSR strobe is generated. This includes seven read registers (PROR0, PROR1, PROR2, PROR3, PROR4, PROR5, SIGR) and two write registers (SIGT and PROT).

The microprocessor 31 can write data to the transmit signaling and provisioning registers asynchronously in relation to the time slot decoder transmit strobe outputs. If data is written to the register before the transmit strobe is generated, the data is latched and transmitted at that time slot. If the microprocessor 31 tries to write transmit signaling or provisioning data during the time when the transmit strobes are enabled, the new data is latched into a register but is not transmitted until the next transmit time slot.

The invention provides for CODEC provisioning wherein transmit and receive gain bytes are clocked into the CODEC to set the transmit and receive gain. The specific bit definitions for the gain bytes may be found in the National Semiconductor Telecommunications Databook Reb. 1, pp1-16, Tables 7 and 8 for the TP3070V COMBO II.

The microprocessor 31 provisions the CODEC by writing to the CODEC registers in the FWLUC. The microprocessor 31 selects the first of two registers used to provision the CODEC. Data is written to the first register by addressing and writing, as described previously in regard to the microprocessor interface. After the second register has been addressed, the FWLUC generates CS* and CLNCLK signals. The 12 MHz input clock is divided by four, to 3 MHz which is used to generate the CODEC clock which is at a 1.544 MHz rate, and 16 clock pulses in duration. The 16 bits of data are clocked out on the rising edge of the clock to the CODEC on the output pin CLNKIN. If CS* is low, CLNKIN provides the CODEC data.

To audit the CODEC, an instruction byte and a status byte are strobed in on the CODEC data line CO to an 8-bit register when chip select is active low and CLNCLK is generated. The status byte is strobed in during the last eight clock pulses of CLNCLK, and thus only the status byte is stored. Data from the CODEC is clocked in on the falling edge of the CLNCLK. The microprocessor reads only the status byte by addressing and enabling the appropriate tri-state buffer. The minimum time of the gate array between provisioning and auditing the CODEC is 21 us.

EQUALIZER provisioning is performed by the microprocessor 31 selecting the first of two registers used to provision the EQUALIZER. Data is written to the first register by addressing and writing to the register. After the second register has been addressed, the FWLUC generates a CLNCLK. The CS* signal is used to select the multiplexed output for CLKCLK. If CS* is high, the EQUALIZER output is selected. The format of the data is shown in Table 6, as follows:

TABLE 6

| | MSB | | | | | | | LSB |
|---|---|---|---|---|---|---|---|---|
| EQ 0 | BP | H0 | H1 | H2 | H3 | B0 | B1 | B2 |

| | MSB | | | | | | | LSB |
|---|---|---|---|---|---|---|---|---|
| EQ 1 | X | X | B3 | S0 | S1 | S2 | S3 | NL/L |

The 12 MHz input clock is divided by four to 3 MHz. From this 3 MHz input, the EQUALIZER clock is generated which is set at 1.544 MHz rate and 14 clock pulses in duration. The 14 bits of data are clocked out on the falling edge of the clock to the EQUALIZER on the output pin CLNKIN. After the 14 bits have been clocked, the PROV bit is generated and sent to the EQUALIZER to parallelly load the serial data into a latch on the EQUALIZER.

To audit the EQUALIZER, the microprocessor 31 writes a 1 to bit 0 of the CONTROL register. After the CONTROL register has been written to, an AUDIT pulse is sent to the EQUALIZER. This signal parallelly loads a shift register with the contents of a latch internal to the EQUALIZER. Following the AUDIT pulse, a 14-bit clock is generated at a 1.544 MHz rate. Data from the EQUALIZER is clocked in on the rising edge of CLNCLK to registers EQ0 and EQ1. The microprocessor 31 then latches the microprocessor memory addresses for registers EQ0 and EQ1, enables the internal tristate buffer with the read signal, and reads the data.

Data used for signaling can be written to or read from the FWLUC by selecting the proper registers and initiating a read or write command appropriately. A Relay Latch0 byte contains eight bits which are used to control relay drivers (REL7-0). Bits 7 (MSB) and 6 control one relay. In a similar fashion, bits 4 and 5, 3 and 2, 1 and 0 control three other relay drivers. The FWLUC will not allow the relay drivers to set and reset the relays simultaneously. This situation occurs if a 1 is written to bit 7 and bit 6 of Relay Latch0, for example. If this happens, the relay driver outputs are both set to 0. The data written to Relay Latch0 can be read by the microprocessor 31, as described previously in regard to the microprocessor interface.

The first bit read is bit 7. The Relay Latch1 nibble contains three bits (7-5). Bit 7 is used to put the EQUALIZER into a bypass mode (REL11, BP*). Bits 6 and 5 are used to control relay drivers. Bit 7 is inverted in the FWLUC and called BP*. The data written to Relay Latch1 can be read by the microprocessor. The first bit read is bit 7, BP*, followed by bits 6 and 5. The five least significant bits are tied low.

A watchdog timer is used to reset the microprocessor 31. An active high timer will reset the processor if WDRST (in the control register described previously) is not set within 10.88 ms. The FWLUC clears the timer if the WDRST bit is 0. The WDT output normally stays low; however, if a 1 is written to the watchdog reset bit, the WDT output will go active high 10.88 ms after the bit was set.

When a valid CONR byte as shown in Table 2 is detected, and bit 6 is high, then in the next frame an EEPROM chip select (output EECS) will be produced by logic circuit 70. This output will go active two time slots after the offset number is received in time slot 30 and will go inactive after the next offset number is received, as shown in FIG. 5C. The TSA activates bit 6 only for one frame per access, and the FWLUC produces an active EECS in the following frame. But if the FWLUC were to receive bit 6 active for consecutive frames, the EECS output will always go inactive the two channels after the offset number. This is because the EEPROM 50 (93C46) requires that the chip select go low between accesses. The EEPROG* input to logic circuit 70 tristates the EECS output so that an external device can program the EEPROM 50 with inventory information. However, EEPROG* is only input at the factory and not when the FWLUC is installed in an LU.

Figure 6A:
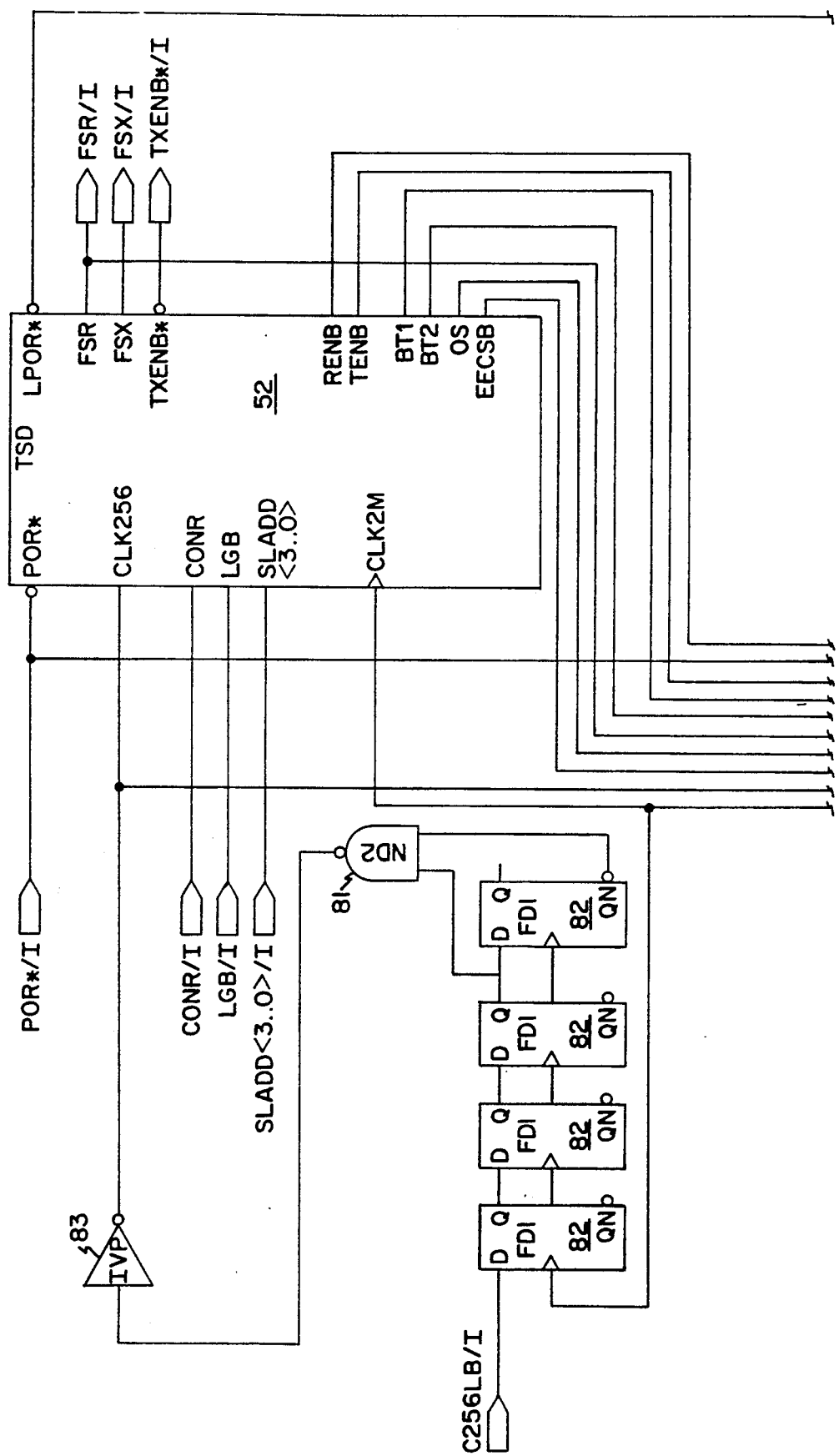
FIGS. 6A and 6B, is a high-level schematic diagram of the present invention.
Figure 6B:
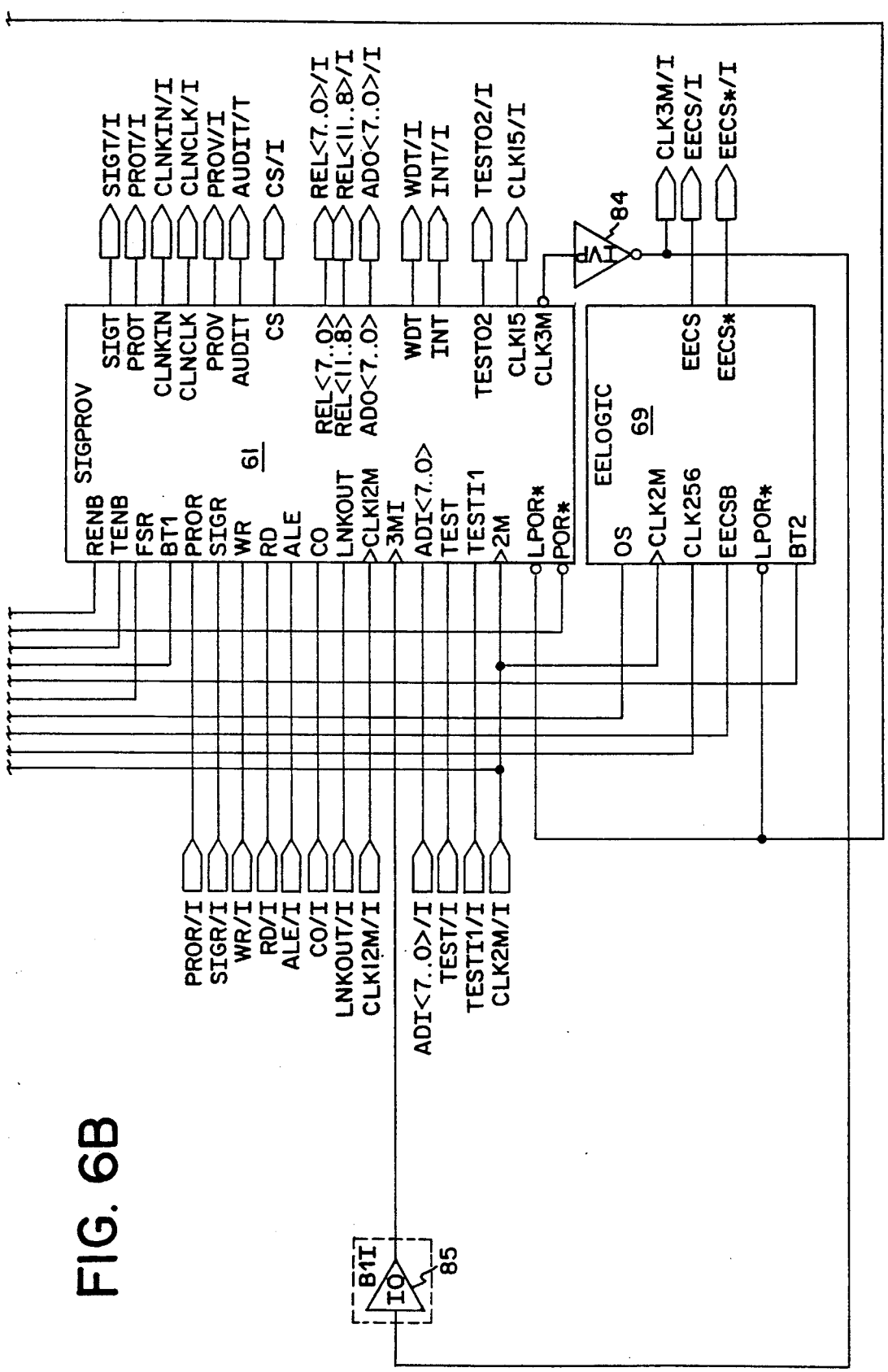

Referring to FIG. 6, there is shown a schematic diagram for the FWLUC 42 of the present invention. The time slot decoder 52 is shown with inputs and outputs as described in regard to FIG. 4, but with additional outputs connected to the signaling and provisioning circuit 61 and to the EEPROM chip select 69. The 256 KHz clock at input C256LB is passed through a series connection of four flip-flops 82 which effectively reduces the duty cycle of the clock signal from 50 percent to approximately one-eighth, so that the clock essentially becomes a strobe that occurs during the least significant bit of each 8-bit time slot. This strobe is useful to indicate that all eight bits of the information of 8-bit data bytes have arrived. The output of the fourth flip-flop 82 is inputted to a NAND gate 81, the output of which is provided to an inverter 83. Inverter 83 provides a 256 KHz clock to time slot decoder 52 and EEPROM chip select 69. The EEPROG* input is not shown in FIG. 6, as this input is used only for factory programming of the EEPROM and is not available when the FWLUC is used in a line shelf.

The time slot decoder 52 is constructed essentially similar to the time slot decoder shown in U.S. patent application Ser. No. 451,436 but is adapted for use with a FWLU which has only one subscriber line and not two channels, as a regular two-wire line unit. Thus, time slot decoder 52 has only one flywheel logic circuit 58.

The signaling and provisioning circuit 61 provides two clock outputs CLK15, which is a 1.544 MHz clock, and CLK3M, which is a 3.088 MHz clock. The CLK3M output is provided to an inverter 84, the output of which is connected to a 3MI input of circuit 61 through a driver 85.

Additional signals provided by the time slot decoder 52 not shown in FIG. 4 include receive and transmit enable signals RENB and TENB respectively, which signals are provided to the signaling and provisioning circuit 61. BT1 and BT2 signals are also provided during bit time 1 and bit time 2, respectively, of the 256 KHz clock. The BT1 signal is provided to the signaling and provisioning circuit 61, while the BT2 signal is provided to the EEPROM chip select circuit 69. An OS output is provided corresponding to the offset value and is provided to the EEPROM chip select circuit 69. The time slot decoder 52 also provides an EEPROM chip select signal at an output EECSB, which signal is also provided to the EEPROM chip select circuit 69.

Figure 7A:
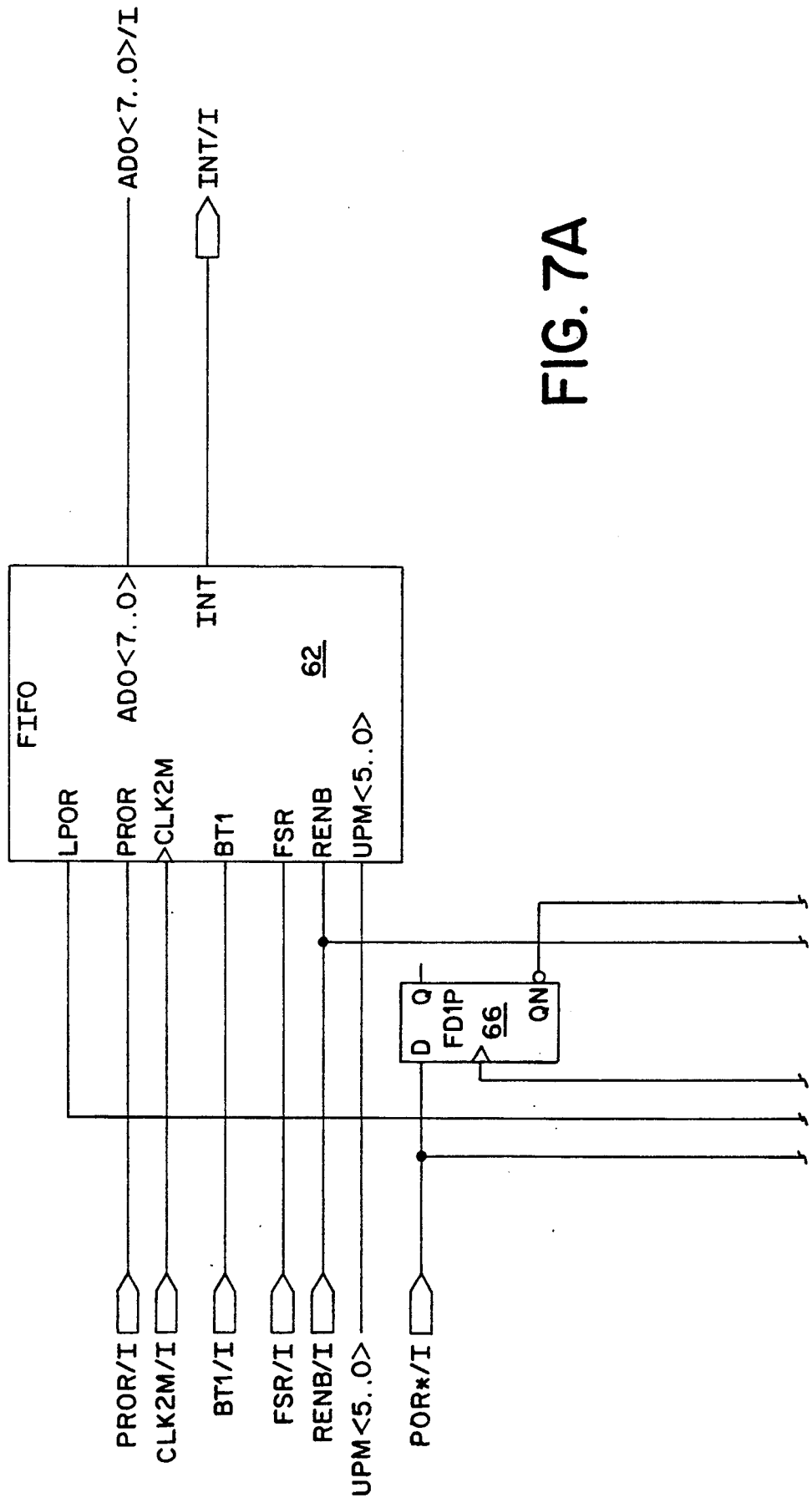
FIG. 7A and 7B, is a schematic diagram of the signaling and provisioning circuits shown in FIG. 4.
Figure 7B:
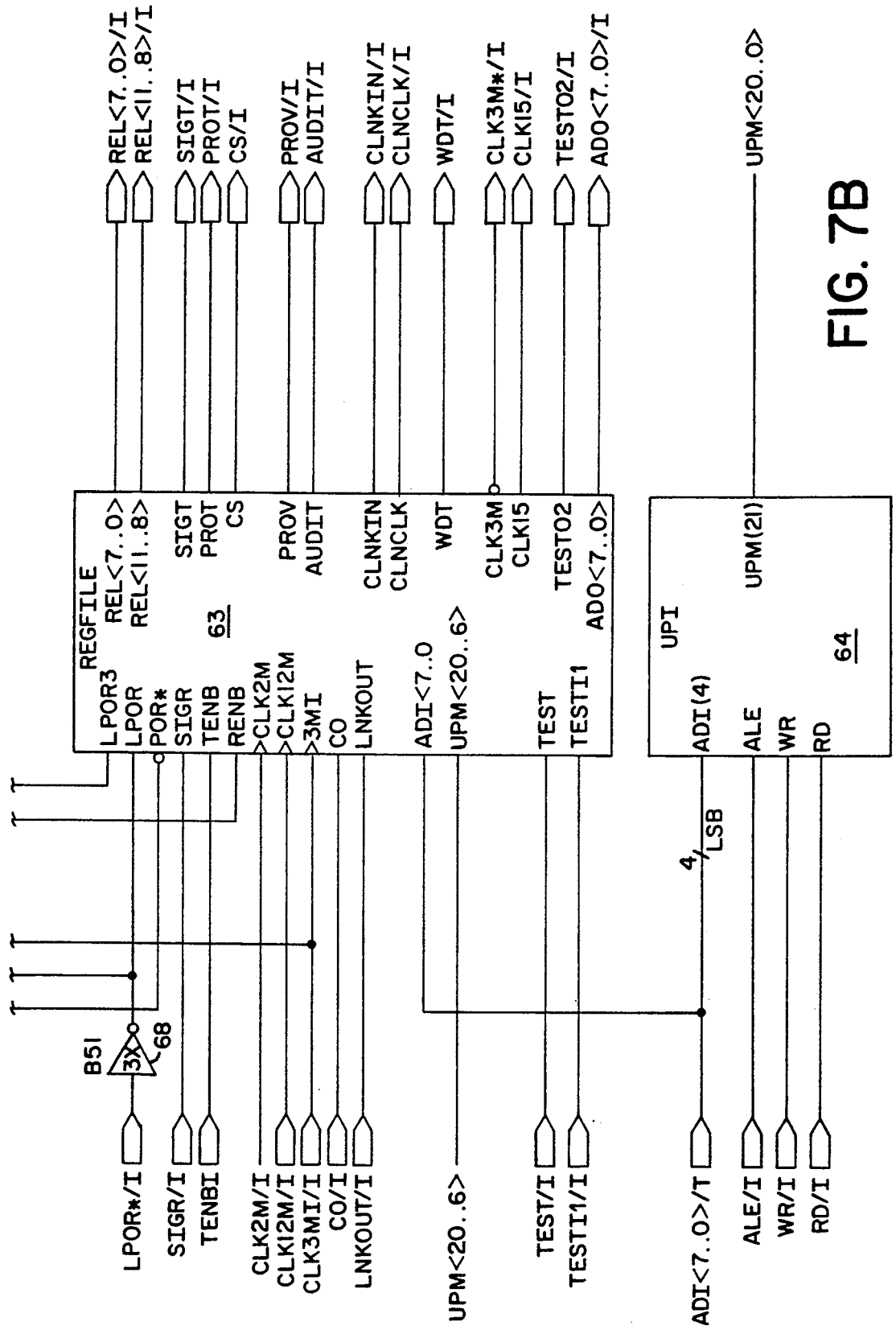

Referring to FIG. 7, there is shown a block diagram of the signaling and provisioning circuit 61 of FIGS. 4 and 6. The POR* signal is provided to a flip-flop 66 which is clocked by the CLK3MI clock and provides an output to the input LPOR3 of the register file 63. Thus, the LPOR3 input receives a latched POR signal at a 3.088 MHz rate and differs from the LPOR which receives a latched POR signal at a 2.048 MHz rate through an inverter 68 which receives the LPOR* signal. The FIFO 62, register file 63 and the microprocessor interface 64 all have terminals connected to timing signals, UPM, corresponding to decoded addresses in the microprocessor memory that are active to read or write data during the UPM signal for the address. There are 21 timing signals, identified as 0–20, which are generated in microprocessor interface 64.

Figure 8A:
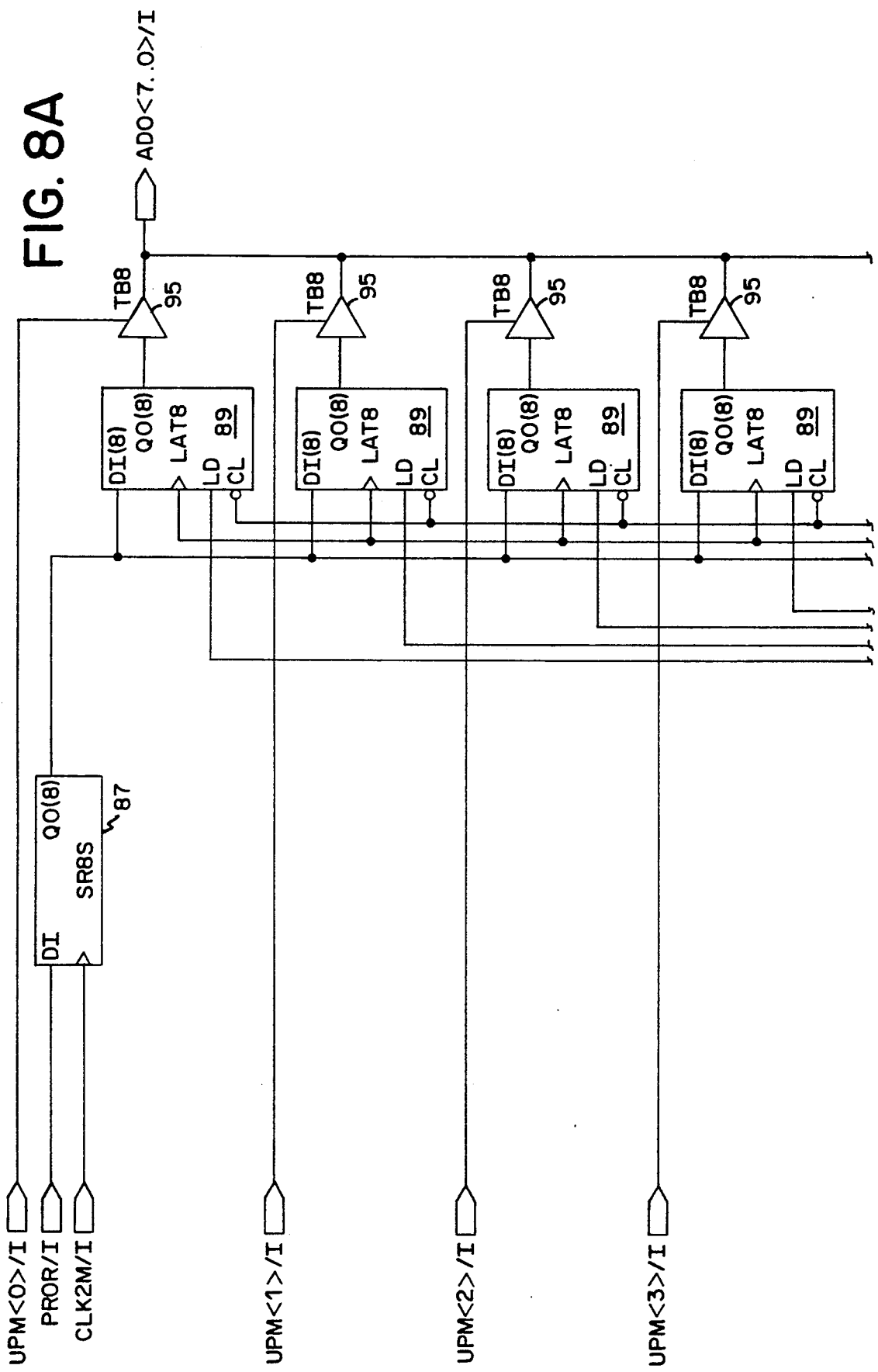
FIG. 8A and 8B, is a schematic diagram of the FIFO 62 of FIG. 7.
Figure 8B:
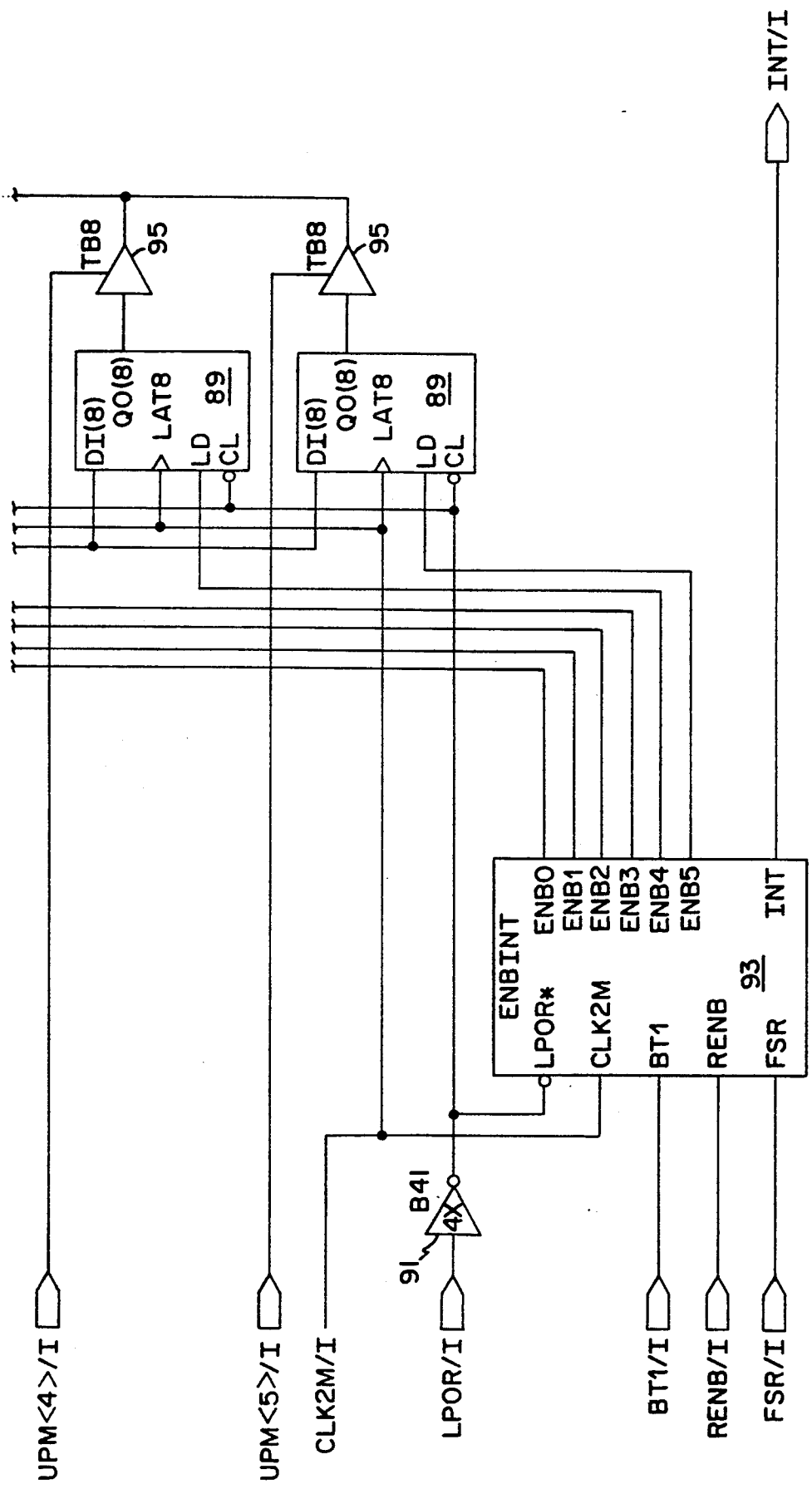

Referring to FIG. 8, there is shown a block diagram of the FIFO 62 of FIG. 7. The provisioning receive signals, PROR, are received serially from the LUIB and are provided to a shift register 87, which also receives the clock signal CLK2M and performs a serial-to-parallel conversion providing 8-bit parallel bytes at an output. The output is connected to six 8-bit latches 89 which function to store six sequentially received 8-bit bytes. Each of the latches 89 receives an inverted LPOR signal from an inverter 91, which signal functions to clear the latches in the event of a power on reset. The eight bits appearing sequentially at the inputs of the latches are selectively loaded into the latches through the provision of six load signals provided from an interrupt logic 93 which provides six sequential signals at outputs ENB0-5. The signals on ENB0-5 are provided sequentially, one for each of six sequentially received frames containing PROR data. The outputs of latches 89 are connected to 8-bit tri-state buffers 95 which provide signals to outputs ADO(7-0) which are connected to the microprocessor of the FWLU via bus AD(7-0). Each of the buffers 95 receives one of the timing signals UPM0-5 corresponding to microprocessor memory addresses. Thus, each buffer may write eight bits of provisioning data to the microprocessor when a predetermined microprocessor address is active to read incoming data.

The interrupt logic 93 receives the inverted LPOR signal from inverter 91, the, CLK2M, clock signal and from the time slot decoder 52 the BTI, RENB and FSR signals. In response to these signals, the interrupt logic 93 provides an interrupt signal, INT, to the microprocessor to interrupt the microprocessor's operation so that it may read the provisioning data from the latches 89 after six bytes of provisioning data are latched.

Figure 9A:
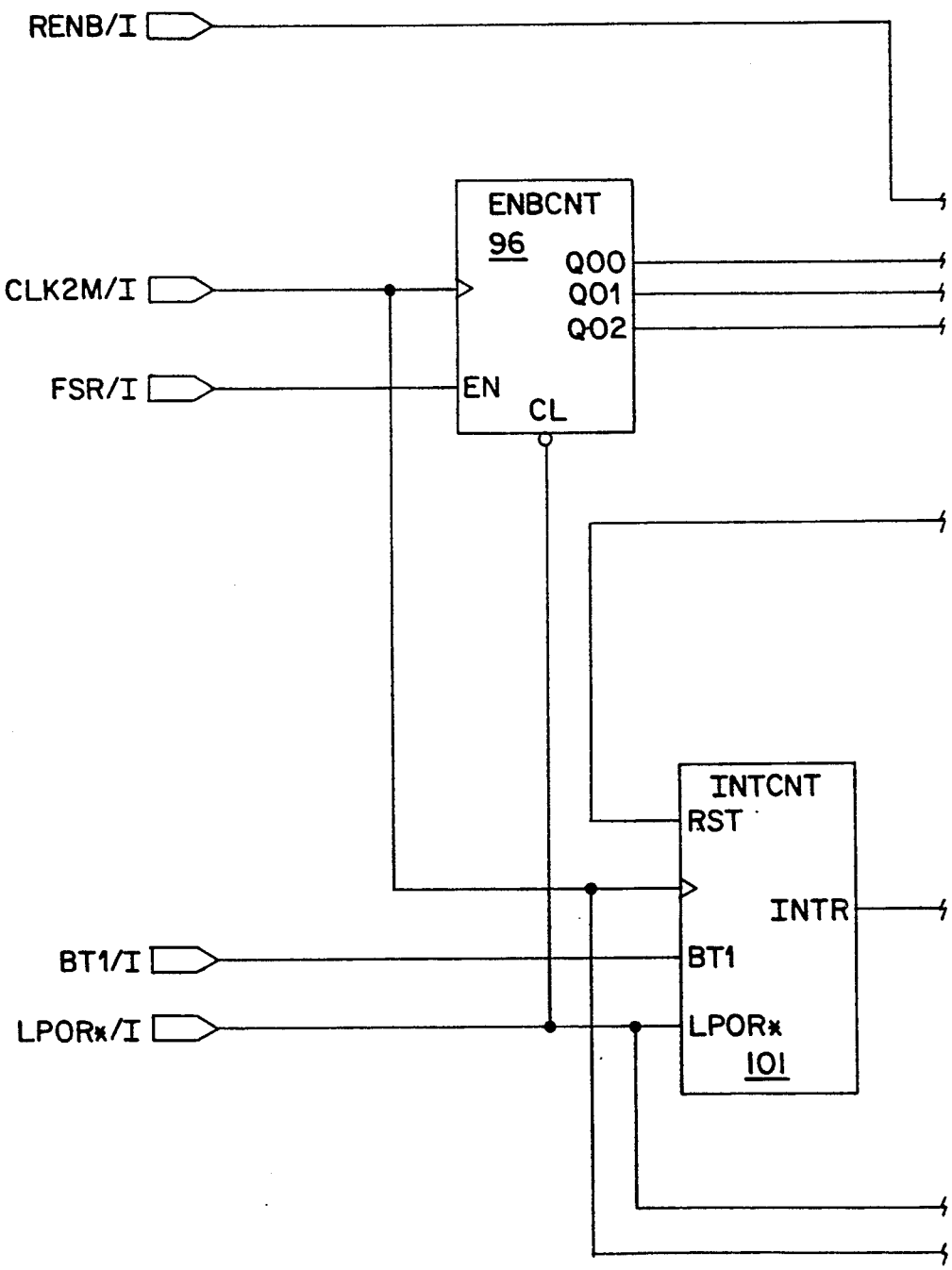
FIGS. 9A and 9B, is a schematic diagram of the interrupt logic 93 of FIG. 8.
Figure 9B:
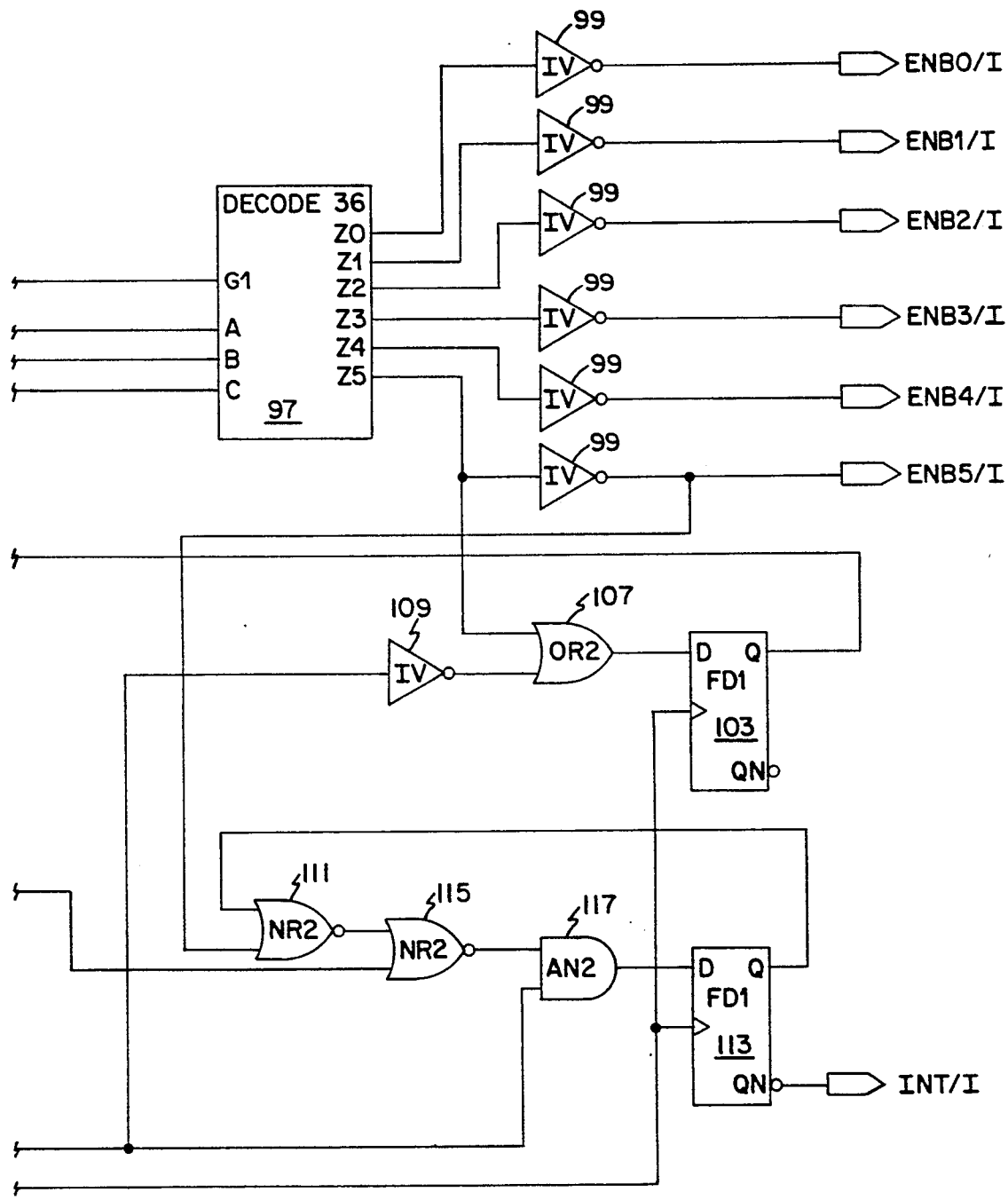

A block diagram of the interrupt logic 93 is shown in FIG. 9, where there is shown a 3-bit counter 96 which receives the CLK2M clock and an enable signal in the form of the frame sync signal FSR. While the counter is a 3-bit counter it is only used for counting six sequential frames, The outputs of the counter are provided to a 3-6 decoder 97, which also receives as an input the RENB signal from the time slot decoder 52. In response to these signals, the decoder provides the six sequential output signals ENB0-5, one for each sequentally-received frame, said signals being provided through inverters 99.

Figure 10A:
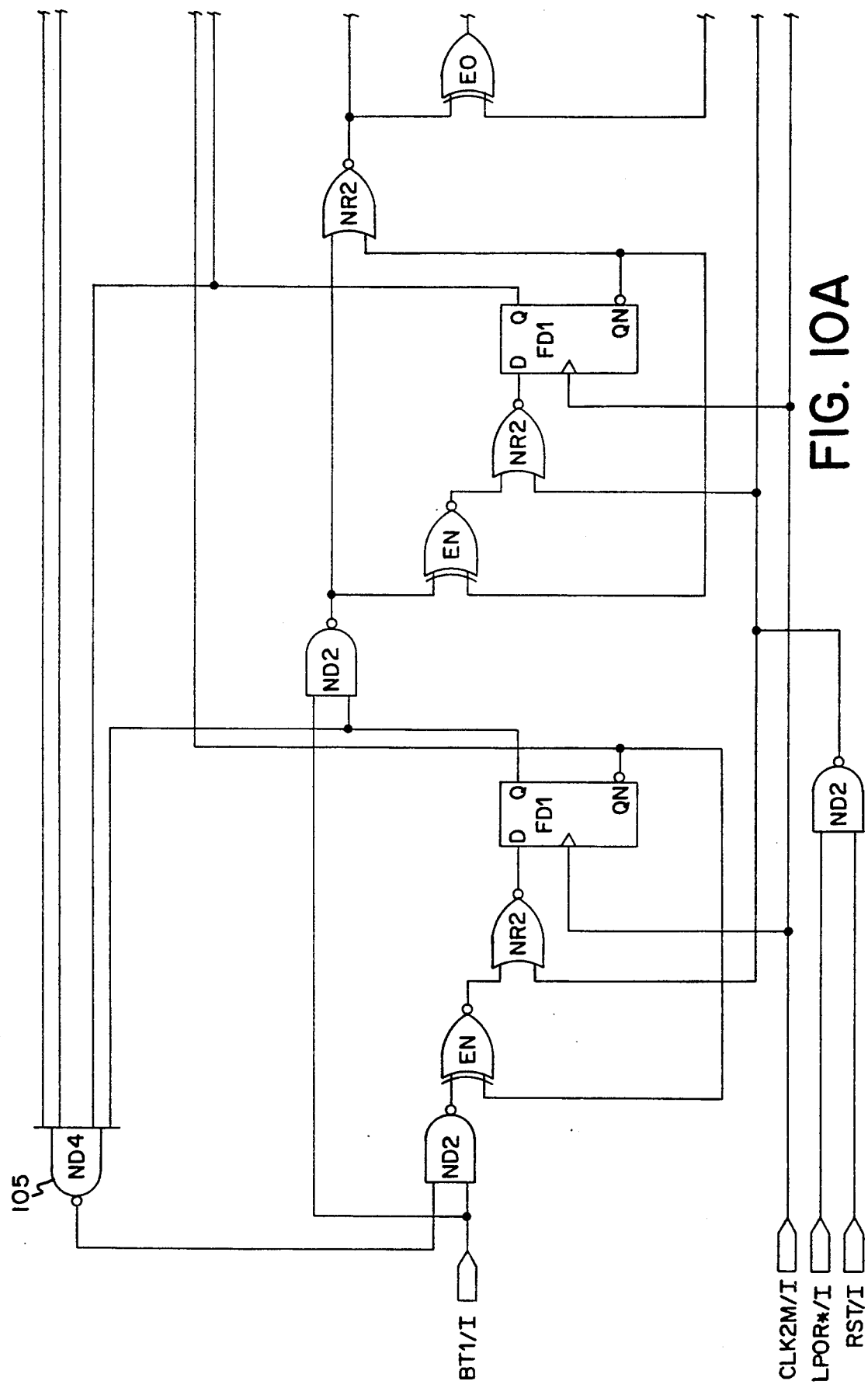
FIGS. 10A and 10B, is a schematic diagram of the interrupt counter of FIG. 9.
Figure 10B:
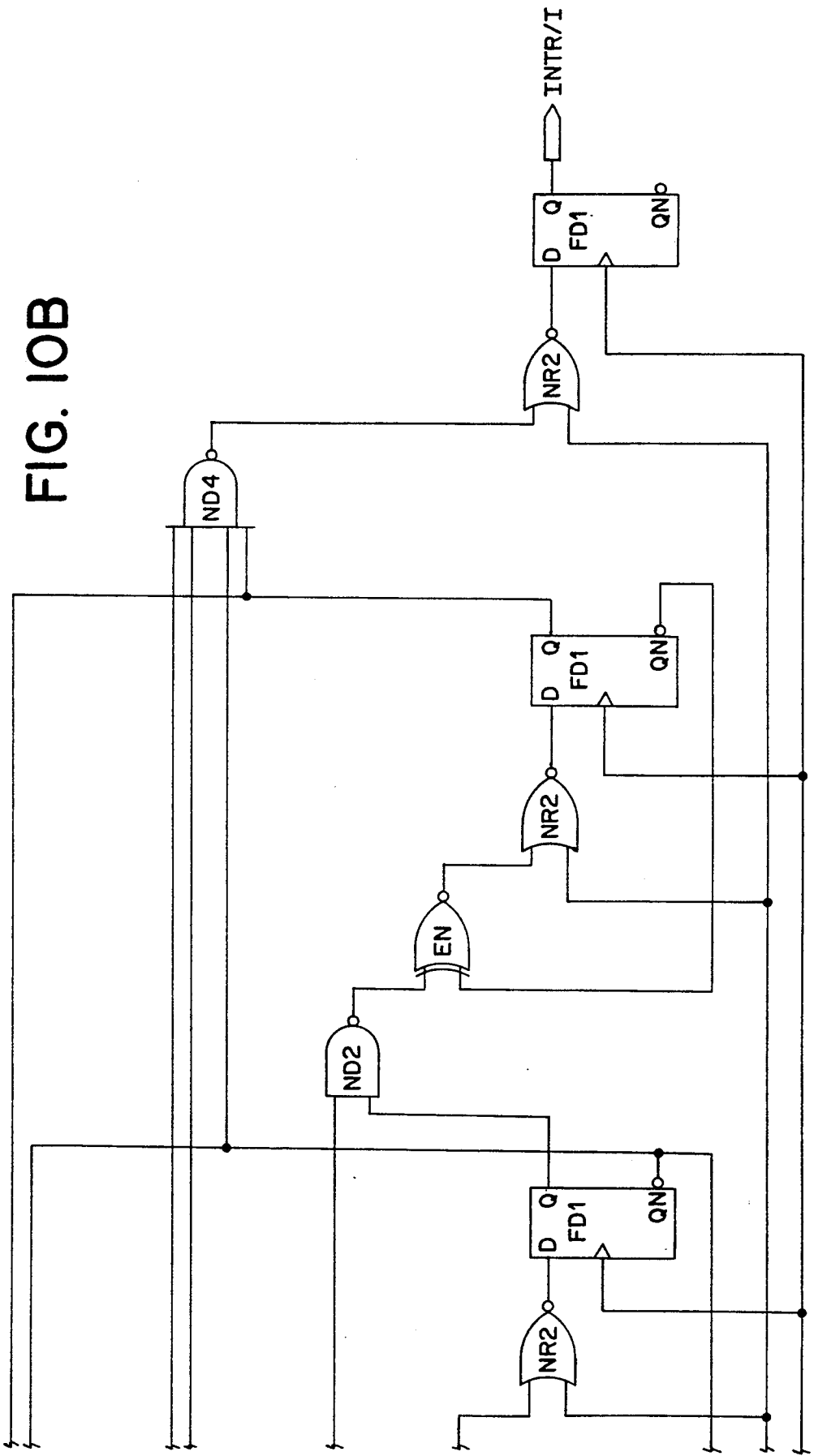

The interrupt logic function is performed using an interrupt counter 101, which is used primarily to count ten BTI inputs to essentially count a 40 us time period. The circuitry for the interrupt counter is found in FIG. 10, which shows essentially a four-stage counter capable of counting up to 16; however, the count is cut off at ten bits. The interrupt counter 101 receives a reset input RST from the output of a flip-flop 103, the CLK2M clock, the BT1 input and the LPOR* signal, which functions to clear the counter in the event of a power on reset. The interrupt counter 101 provides an INTR interrupt output which is used to terminate the interrupt signal INT after a 40 us period. The outputs of the four stages of interrupt counter 101 are fed back to through a NAND gate 105 to essentially reset the counter when a count of 10 has been sensed.

Referring again to FIG. 9, the output from decoder 97 corresponding to the receipt of the sixth frame is provided to an OR gate 107, which also receives the LPOR signal through an inverter 109 to provide an input to the flip-flop 103, which provides an output indicative of the fact that six frames of provisioning data have been received. The output of flip-flop 103 functions to reset the interrupt counter 101. The output of inverter 99 corresponding to the output ENB5 is provided to a NOR gate 111, which also receives an output from flip-flop 113. The NOR gate 111 is responsive to the signal from the inverter 99 to provide an output to a NOR gate 115, which is also responsive to the output from the interrupt counter 101 to provide an input to an AND gate 117, which controls the flip-flop 113, causing it to provide the interrupt output INT. After a count of ten BTI bits by the interrupt counter 101, the output INTR changes, causing the flip-flop 113 to be reset and terminating the INT interrupt signal.

Figure 11A:
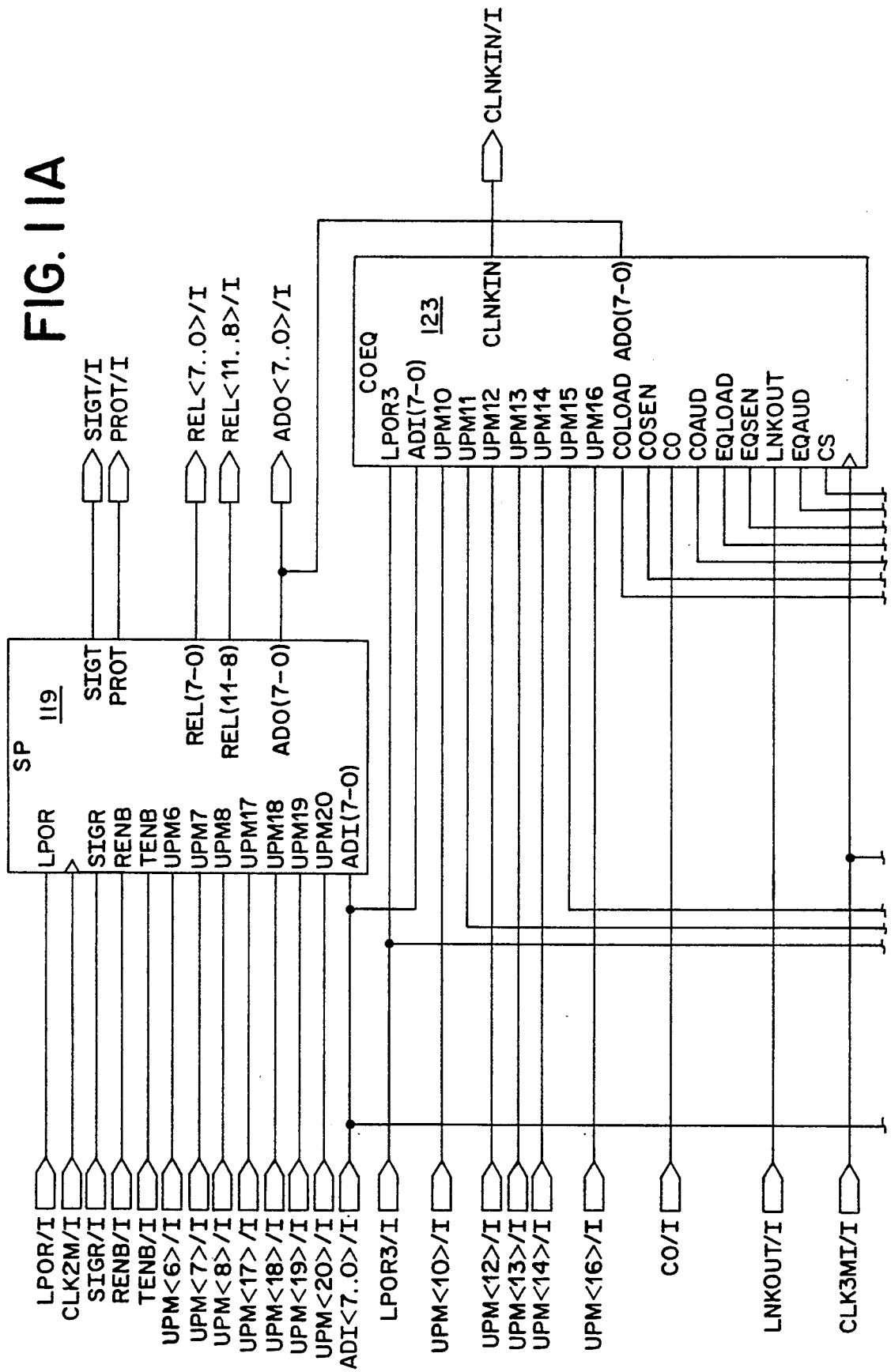
FIGS. 11A and 11B, is a block diagram of the register file 63 of FIG. 7.
Figure 11B:
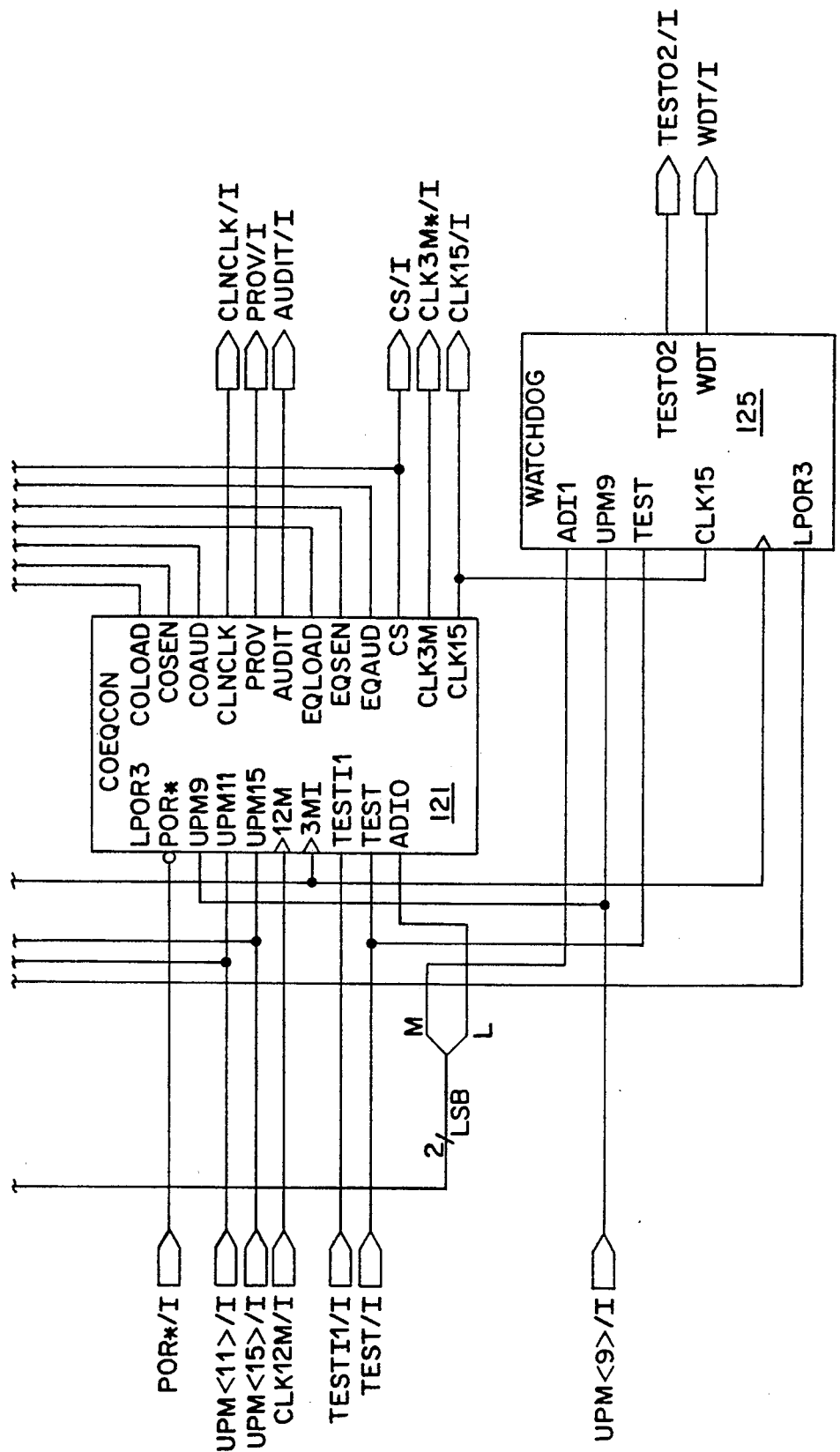

Referring to FIG. 11, there is shown a block diagram of the register file 63. The register file 63 includes a signaling and provisioning block 119, blocks 121 and 123 which function to provide the CODEC/EQUALIZER interface and a block 125 which provides the microprocessor watchdog timer.

The signaling and provisioning block 119 communicates with the microprocessor by way of inputs ADI(-7-0) and outputs ADO(7-0) connected to bus AD(7-0). The circuit also receives the LPOR input signal for power on reset and the CLK2M clock. The SIGR signal is provided from the LUIB, while the RENB and TENB signals are provided from the time slot decoder 52. Microprocessor timing signals UPM 6, 7, 8, 17, 18, 19 and 20 are also received. The signaling and provisioning block 119 provides outputs to relays REL0-11 and the signaling and provisioning transmit signals SIGT and PROT.

Figure 12A:
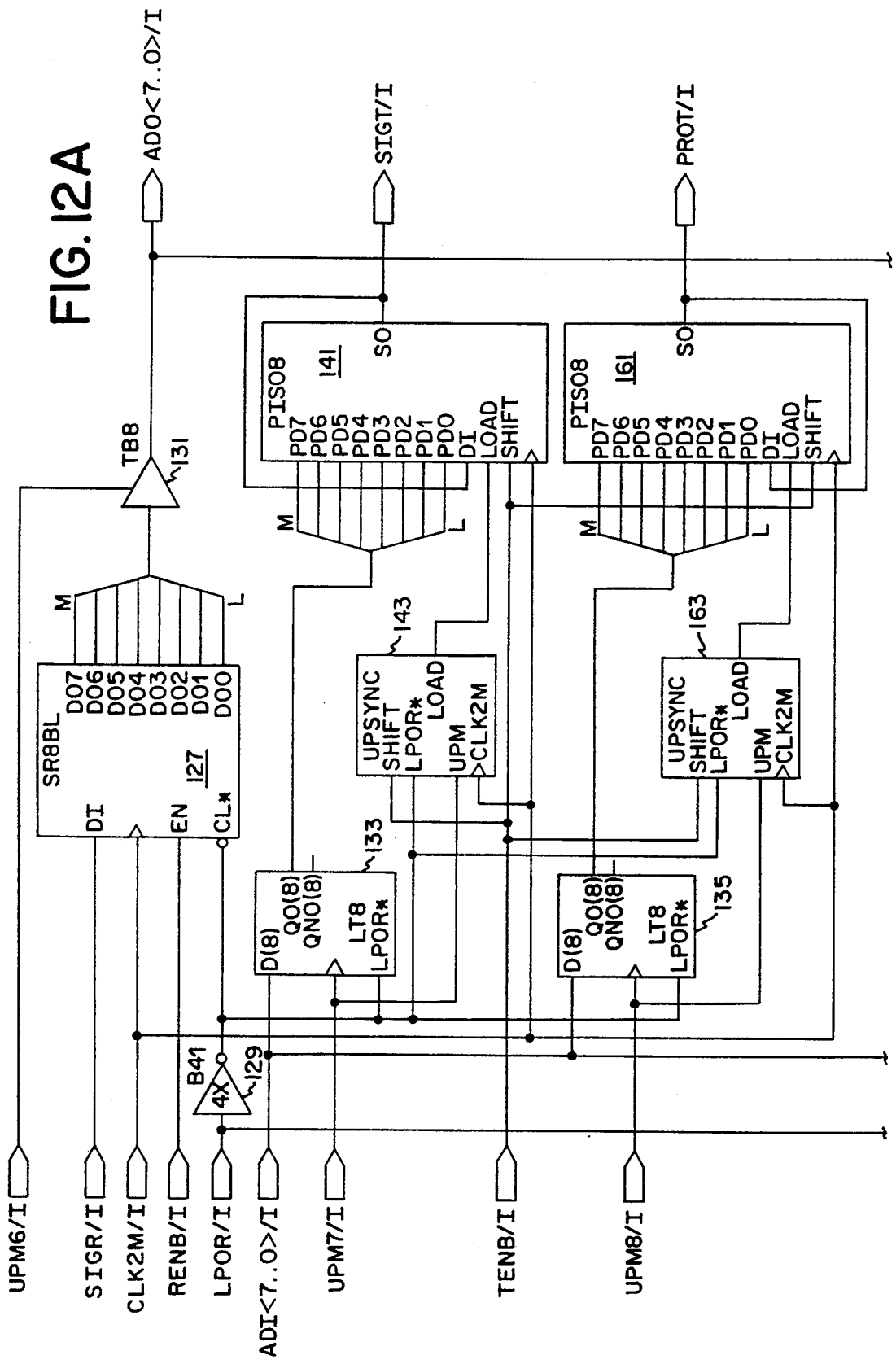
FIGS. 12A and 12B, is a schematic diagram of the signaling and provisioning block of FIG. 11.
Figure 12B:
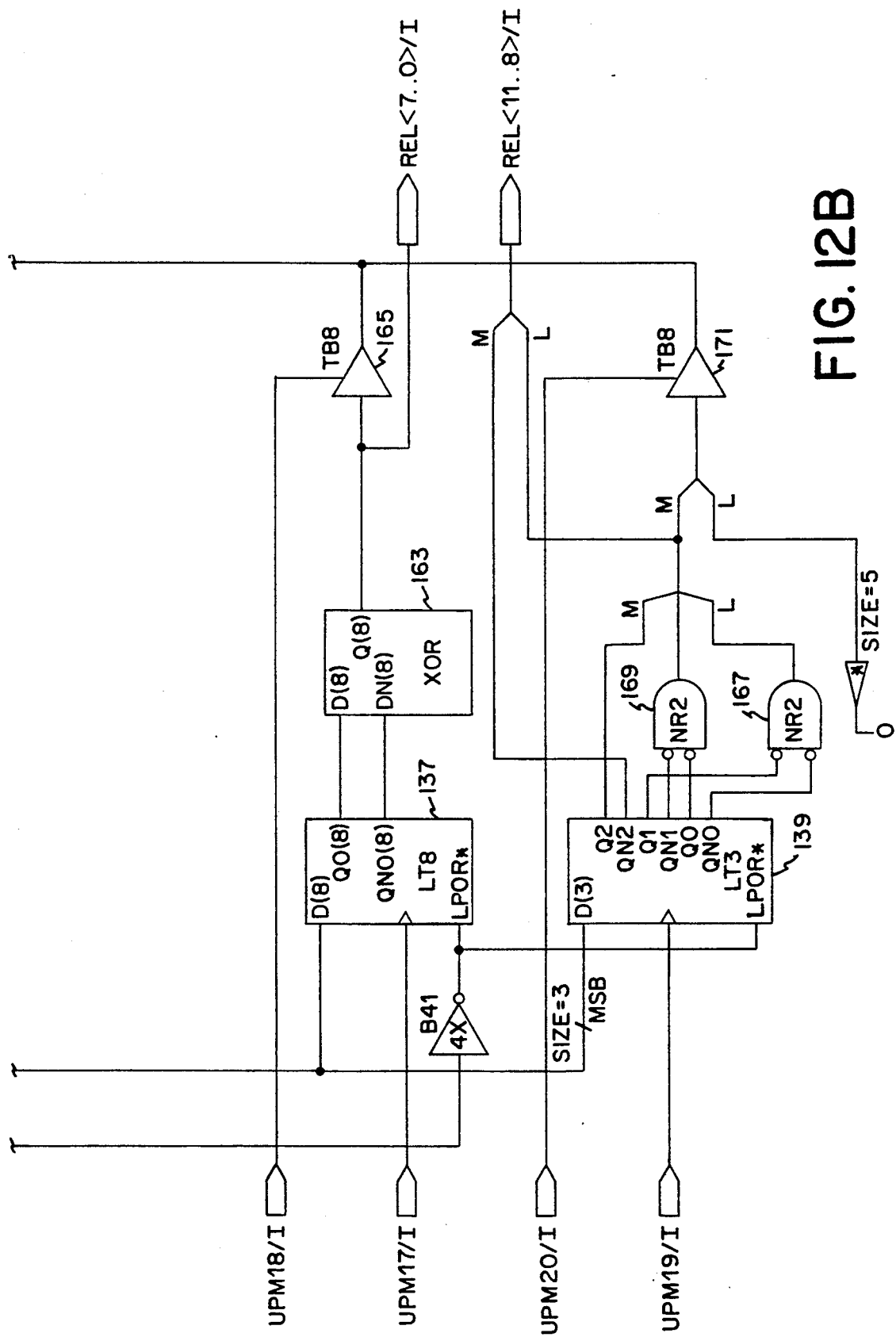

Referring to FIG. 12, there is shown a block diagram of the signaling and provisioning block 119. The signaling receive signal SIGR from the LUIB is provided to an input of an 8-bit shift register 127, which also receives the CLK2M clock, the receive enable signal RENB and the LPOR signal through an inverter 129. The shift register 127 has eight parallel outputs and functions as a serial-to-parallel converter for providing eight outputs to the ADO(7-0) output through an 8-bit tri-state buffer 131, which is enabled by the microprocessor memory timing signal UPM6.

The input data on ADI(7-0) is provided to inputs of a number of 8-bit latches 133, 135 and 137, and the three most significant bits of ADI(7-0) are also provided to inputs of a 3-bit latch 139. Eight bits of data are latched into latch 133 during the microprocessor timing signal UPM7, and the output of latch 133 is provided to eight parallel inputs of a parallel-to-serial shift register 141. Shift register 141 has a serial output for providing the signaling transmit signal, SIGT, to the LUIB. Data is shifted through the register 141 by the transmit enable signal TENB provided by the time slot decoder 52. Data is loaded into the shift register when a signal is received from the output of a microprocessor sync circuit 143. Circuit 143 is provided to correct for the asynchronous operation of the microprocessor in relation to the LUIB. The microprocessor can provide data and an address on ADI(7-0) before the proper transmit enable time indicated by input TENB. Thus, circuit 143 synchronizes the loading of data into the shift register 141 with the transmit enable signal provided by the time slot decoder 52. If the microprocessor provides the signaling data after the transmit enable signal TENB, circuit 143 delays the loading of the microprocessor data into shift register 141 until the next frame.

Figure 13:
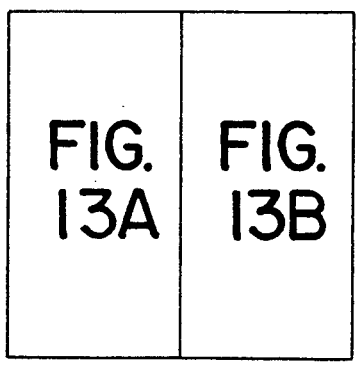
FIG. 13, comprising

The circuitry for the microprocessor sync circuit 143 is shown in detail in FIG. 13, where the UPM timing signal is first provided to a flip-flop 145, the output of which is provided to a flip-flop 147 through a NAND gate 149 and an inverter 151. The output of flip-flop 147 is provided to a flip-flop 153 through a NAND gate 155 and an inverter 157. Flip-flop 145 essentially holds the microprocessor timing signal until it is cleared by a signal on the CD input, which signal is received from the output of a flip-flop 159, which is ultimately responsive to a shift input which receives the TENB signal from the time slot decoder 52.

Thus, if the microprocessor timing signal arrives before the transmit enable signal, no difficulties will be encountered and the microprocessor sync circuit 143 will provide a load signal to the shift register 141. If the microprocessor timing signal should arrive during the transmit enable signal, the microprocessor sync circuit 143 will delay the loading of shift register 141 until the next frame.

Referring again to FIG. 12, the output of latch 135 is provided to a shift register 161 which receives a load signal from a microprocessor sync circuit 163, these components function in a manner identical to shift register 141 and microprocessor sync circuit 143, to provide a provisioning transmit signal PROT to the LUIB during microprocessor time signal UPM8.

During microprocessor time signal UPM17, eight bits of data from ADI(7-0) are loaded into latch 137, which provides 16 outputs representing the complementary states of each of the eight bits stored therein. The outputs of latch 137 are connected to inputs of an 8-bit exclusive OR gate array 163, which provides eight output bits for outputs REL(7-0). The eight bits are also provided to an 8-bit tri-state buffer 165 so that the bits are provided back to the microprocessor memory on outputs ADO(7-0) during microprocessor time signal UPM18. The connections between the outputs of latch 137 and the inputs of exclusive OR gate array 163 are arrayed such that the inputs of adjacent exclusive OR gates, such as gates 0 and 1, are connected to the opposite phased outputs of adjacent output bits of the latch 137, such as bits 0 and 1. For example, the first, 0, exclusive OR gate would receive inputs from the bit $\overline{0}$ output and the bit 1 output of the latch 137, while the second, 1, gate would receive inputs from the 0 output and the $\overline{1}$ output of the latch 137.

The outputs of the 3-bit latch 139 are connected such that the outputs for bits 0 and 1 are interconnected to the inputs of NOR gates 167 and 169. The QN2 output of latch 139 is combined as the most significant bit, with the output Q2 and the outputs of NOR gates 169 and 167, to provide four outputs for REL(11-8). The Q2 output and the outputs of NOR gates 169 and 167 are combined with five bits latched to 0 to provide eight bits to outputs ADO(7-0) through a tri-state buffer 171 enabled by microprocessor memory timing signal UPM20.

Referring again to FIG. 11, the CO/EQ interface includes a CO/EQ connection logic circuit 121 which is responsive to a plurality of input signals for determining whether the microprocessor is communicating with the CODEC or the Equalizer. The connection logic circuit 121 receives LPOR3 and POR* signals for reset purposes, the microprocessor timing signals UPM 9, 11 and 15, the CLK3MI and CLK12M clock signals, the test signal TEST and the TESTI1 signal. The circuit also receives the least significant input data bit on input ADI0. In response to the afore-mentioned signals, the connection logic circuit 121 outputs an inverted CLK3M signal and a CLK15 signal. A CODEC chip select signal CS is also outputted, along with a clock signal CLNCLK for the CODEC or Equalizer, a PROV signal for enabling Equalizer provisioning, and an AUDIT signal for enabling Equalizer auditing. Two sets of similar signals are provided for the CODEC and the Equalizer, said signals being a COLOAD or EQLOAD for controlling the timing of loading of data to either the CODEC or Equalizer. A COSEN or EQSEN signal is provided to enable the flow of serial data to either the CODEC or the Equalizer. A COAUD or a EQAUD signal is provided to initiate auditing of the CODEC or the Equalizer. These six signals, along with the chip select CS signal, are provided to a CO/EQ data interface circuit 123.

Figure 14:
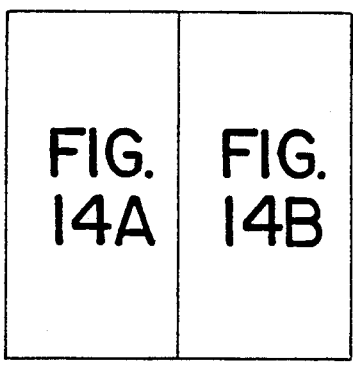
FIG. 14, comprising

Referring to FIG. 14, there is shown a block diagram of the CO/EQ connect logic circuit 121. The CLK12M clock signal is provided to a divider circuit 127, which divides the nominal 12 MHz clock into a 3 MHz clock identified as CLK3M. The CLK3M clock signal is provided to a first input of a multiplexer 129 which receives at a second input the TESTII signal which is merely an external clock which may be selected during a test procedure which is initiated by the TEST signal which is also provided to the multiplexer 129 as a control input. The output of multiplexer 129 is provided as the CLK3M* output. The TEST input and multiplexer 129 are provided to allow for the testing of the CODEC and Equalizer without requiring the use of the internal clock circuit. The CLK3M* signal is the signal provided at the CLK3M output of circuit 61 shown in FIG. 6, which is further inverted by inverter 84 and is provided through the driver 85 to the 3MI input of circuit 61 which corresponds to the CLK3MI input shown in FIG. 14. CLK3MI is provided to an input of a clock divider 131, which functions to divide the 3.088 MHz clock signal by 2 to provide the CLK15 clock signal which is at the rate of 1.544 MHz. The LPOR3 signal is provided to an input of an inverter 133 to provide an LPOR* signal.

Blocks 135 and 137 provide Equalizer connect logic and CODEC connect logic respectively. Each of said connect logic circuits 135 and 137 provide a clock output to a multiplexer 139 which is controlled by the chip select signal CS to selectively provide a clock output for either the equalizer or the CODEC, which output is provided to an inverter 141 which provides the CLNCLK signal.

Figure 15:
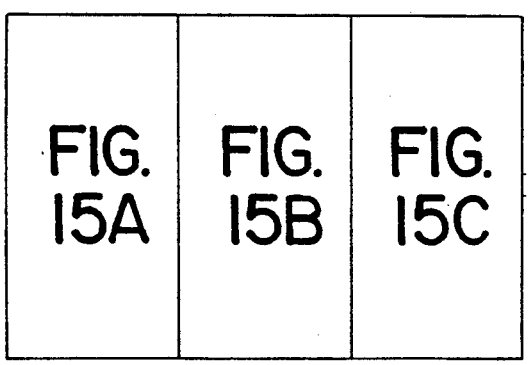
FIG. 15, comprising

FIG. 15 provides a circuit diagram for the Equalizer connect logic 135, which essentially functions as a state machine. The various states are determined by the microprocessor timing signals, such as UPM 9 and 15, which are processed by the state machine in conjunction with the ADI0 bit and the CLK15 and CLK3M clocks. The occurrence of the microprocessor memory time signal UPM 15 causes the Equalizer load signal EQLOAD to be generated through a series of flip-flops. The UPM15 time signal also causes the Equalizer provisioning signal PROV to be generated. The occurrence of the UPM9 time signal causes the Equalizer audit enable signal AUDIT to be generated. The EQSEN and EQAUD signals are generated in response to the UPM15 and UPM9 time signals respectively, said signals being provided to allow serial data to be provided to the Equalizer and to allow data to be read from the Equalizer for the audit function. An Equalizer count circuit 143 is provided to control the Equalizer clock output EQICLK so that the Equalizer clock operates at 1.544 MHz but only provides 14 cycles each time it is activated.

Figure 16:
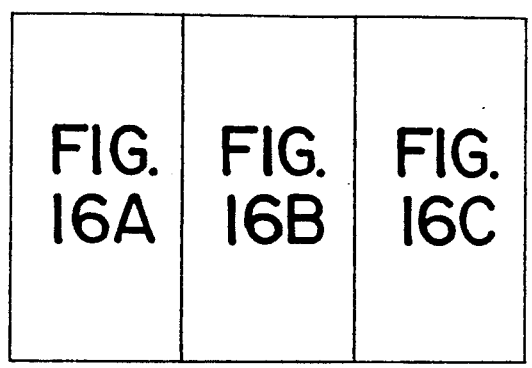
FIG. 16, comprising

FIG. 16 shows a circuit diagram for the Equalizer counter circuit 143, said circuit functioning essentially as a 5-bit counter with selected decodes. The Equalizer counter circuit 143 is designed to totally clear when the desired count of 14 is achieved.

Figure 17:
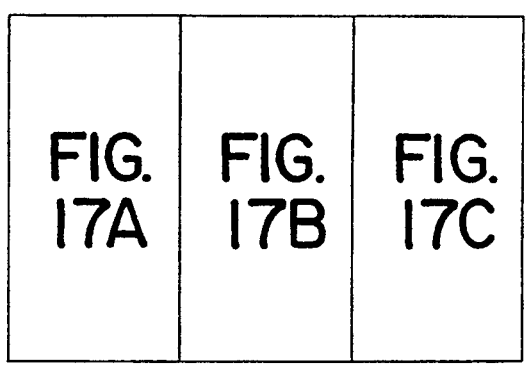
FIG. 17, comprising

Referring to FIG. 17, there is shown the circuit diagram for the CODEC connect logic 137, which also functions as a state machine which changes outputs depending upon the stimulations received. The received signals include the microprocessor memory timing signal UPM11 and the CLK3M and CLK15 clock signals. The CODEC connect logic 137 functions in a manner similar to that of the Equalizer connect logic, particularly in regard to the generation of the CODEC load signal, COLOAD. A CODEC counter circuit 145 is essentially a standard 5-bit counter for counting 16 clock cycles for the CODEC clock COCLK output. It should be noted in regard to the CODEC connect logic that only one microprocessor memory time signal UPM 11 is provided. This is because the CODEC can be provisioned and audited at the same time.

Figure 18:
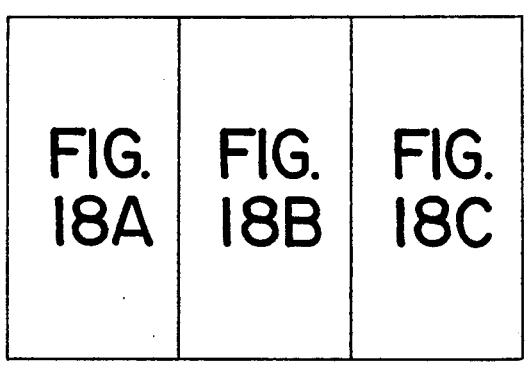
FIG. 18, comprising

Referring to FIG. 18, there is shown a circuit diagram for the CO/EQ data interface circuit 123. The CO/EQ interface circuit 123 provides the actual interface between the microprocessor and the CODEC and Equalizer for both provisioning and auditing purposes. The circuit receives data from the microprocessor on the ADI(7-0) inputs and provides data to the microprocessor on the ADO(7-0) outputs. The CLNKIN output signal provides provisioning data to either the CODEC or the Equalizer, depending upon the state of a multiplexer 147 which is controlled by the chip select CS signal. The inputs LNKOUT and CO receive data from the Equalizer and CODEC respectively during audit functions. Parallel data from the microprocessor received on ADI(7-0) is connected to two 8-bit latches 149 and 151 for sending CODEC data and to a 6-bit latch 153 and an 8-bit latch 155 for sending Equalizer data. Latch 151 is enabled by microprocessor memory time signal UPM10 to send a first byte of CODEC provisioning data, while latch 149 is activated by UPM11 to send a second byte of CODEC provisioning data. The data appearing on the output of latches 149 and 151 is loaded into parallel-to-serial shift registers 157 and 159, respectively, in response to the COLOAD input. A serial output of register 157 is connected to an input of register 159 and, in like manner, a serial output of register 159 is connected to an input of register 157. The output of register 159 is also connected to one of the inputs of multiplexer 147. Upon receipt of the CODEC serial enable signal COSEN both registers 157 and 159 shift data from the serial outputs at a 1.544 MHz rate. Thus, the eight bits of data contained in the first byte stored in register 159 are first provided to the multiplexer 147 and to register 157, after which the eight bits contained in register 157 are provided to the multiplexer by passing through the register 159.

The Equalizer provisioning data is handled in a similar manner, wherein a parallel-to-serial shift register 161 is connected to the output of the 6-bit latch 153, and a parallel-to-serial register 163 is connected to the output of the 8-bit latch 155. The data is loaded to the shift registers 161 and 163 in response to the EQLOAD signal and is shifted out in response to the Equalizer serial data enable signal EQSEN and is shifted out at the 1.544 MHz clock rate to the multiplexer 147.

For auditing purposes, only eight of the 16 bits of CODEC data need be sampled; therefore, only the second byte of CODEC data is stored in a serial-to-parallel shift register 165. The serial data is received from the CODEC on input CO, and the shift register 165 is enabled by the CODEC audit signal COAUD and is clocked in at the 1.544 MHz rate. Sixteen CODEC data bits pass through register 165, but only the most recent eight bits are stored. Eight parallel bits of data from the CODEC are provided at the output of shift register 165 to an 8-bit tri-state buffer 167, which is controlled by a microprocessor memory timing signal UPM 12 to output the data on outputs ADO(7-0) which are provided to the microprocessor.

The Equalizer audit requires the sampling of all 14 bits of data from the Equalizer which are provided on the input LNKOUT, which is connected to the input of a serial-to-parallel shift register 169. Register 169 is enabled by the Equalizer audit signal EQAUD, and the data is clocked in at the 1.544 MHz rate. Eight parallel outputs from register 169 are connected to an 8-bit tri-state buffer 171, which is enabled by the microprocessor memory timing signal UPM 16. The output of the tri-state buffer 171 is provided to outputs ADO(7-0) which are connected to the microprocessor. In order to provide the full 14 bits of data for Equalizer auditing, the most significant bit output of register 169 is connected to an input of a 6-bit register 173, which register is also enabled by the EQAUD signal and effectively receives six overflow bits from register 169. The six output bits from register 173 are connected to an 8-bit tri-state buffer 175, which is enabled by the UPM 14 time signal. The two most significant bits on the input to the 8-bit tri-state buffer 175 are tied to a 0 level. Thus, the two bytes of Equalizer data used for auditing are received by the microprocessor by first enabling the tri-state buffer 175 at UPM14 to provide the six bits of data, and then by enabling the tri-state buffer 171 with UPM16 to provide the eight bits of data.

Figure 19:
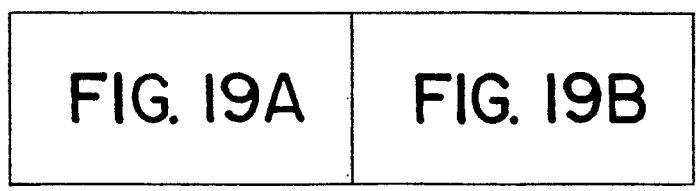
FIG. 19, comprising
Figure 13A:
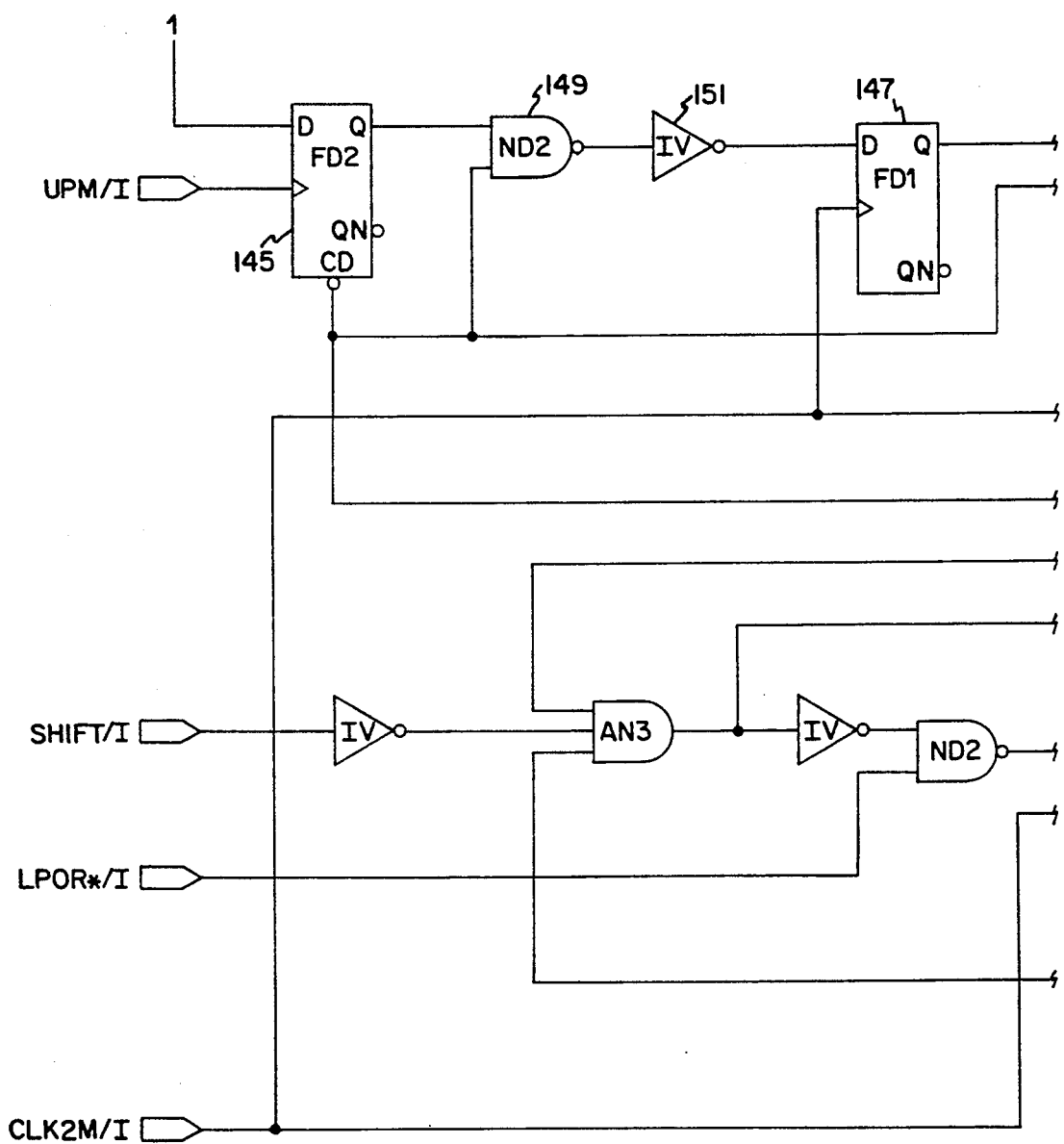
FIGS. 13A and 13B, is a schematic diagram of the microprocessor sync circuit of FIG. 12.
Figure 13B:
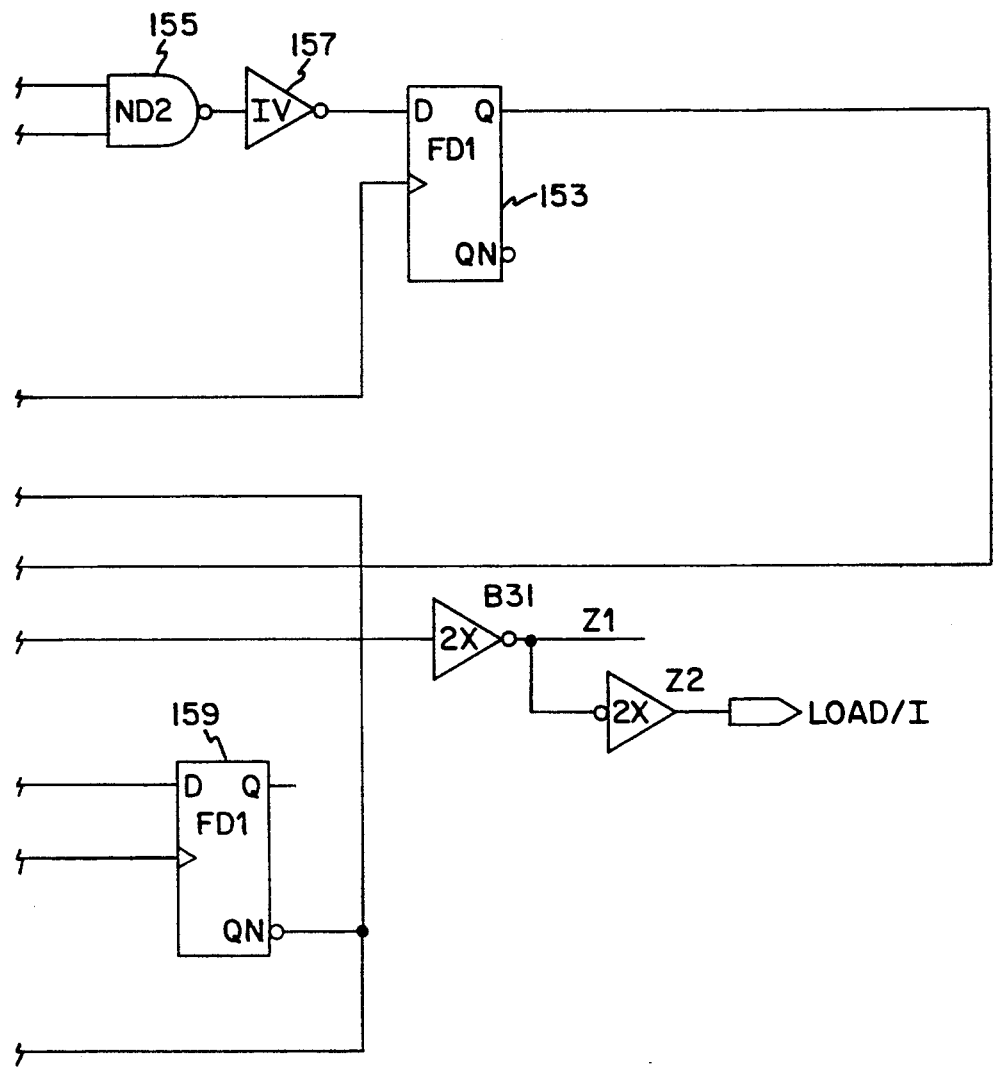
Figure 14A:
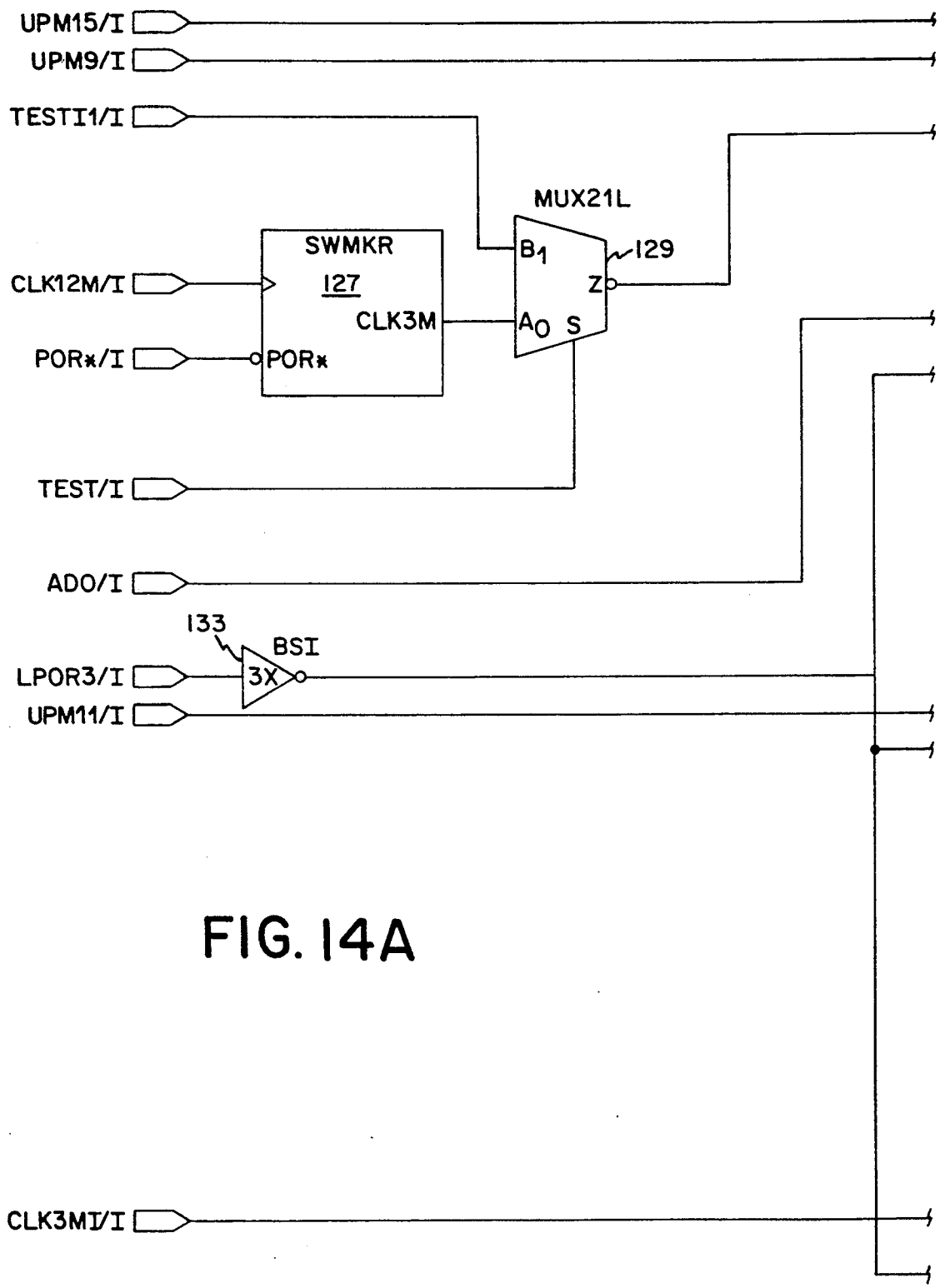
FIGS. 14A and 14B, is a block diagram of the CO/EQ connect logic of FIG. 11.
Figure 14B:
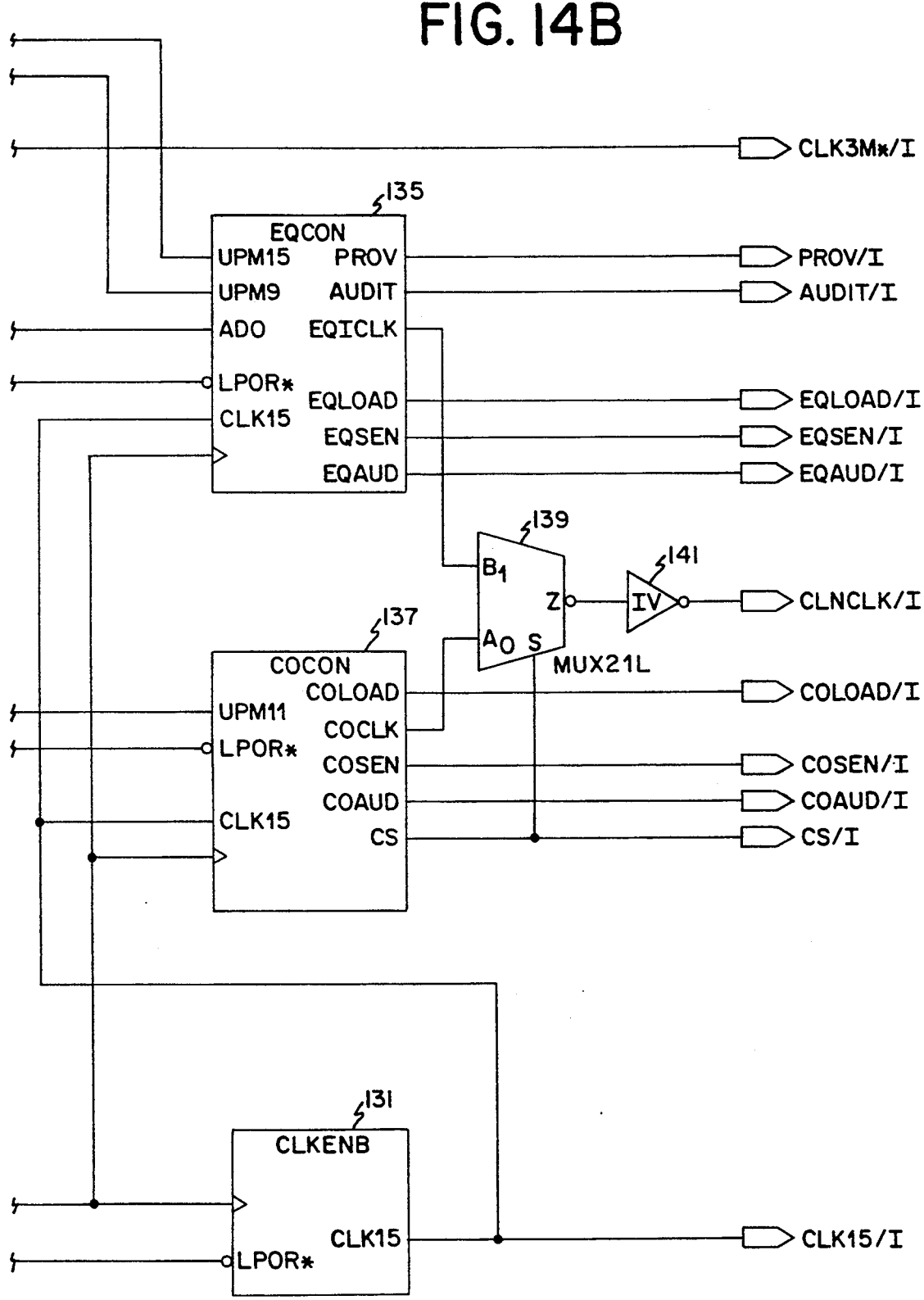
Figure 15A:
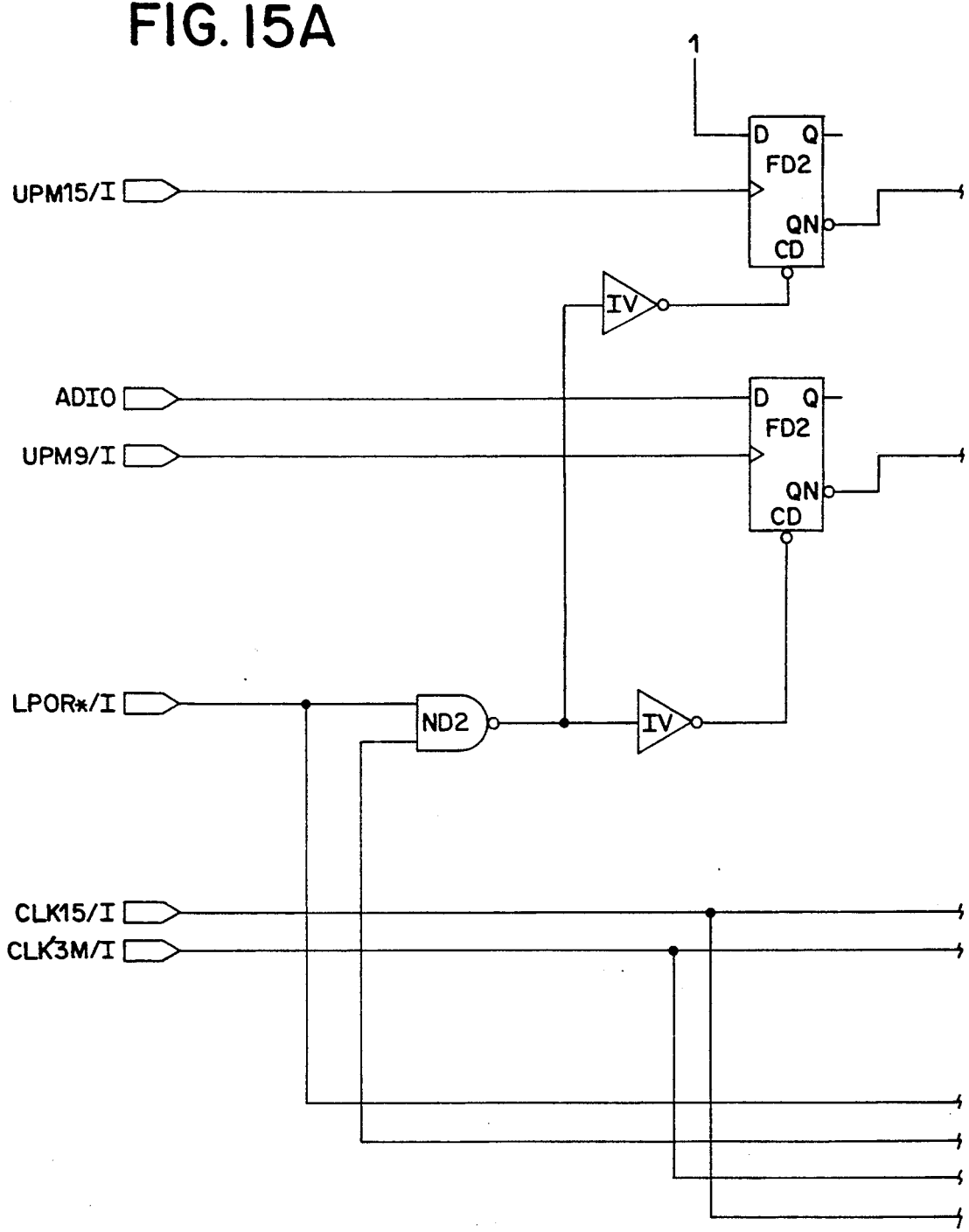
FIGS. 15A, 15B and 15C, is a schematic diagram of the equalizer connect logic of FIG. 14.
Figure 15B:
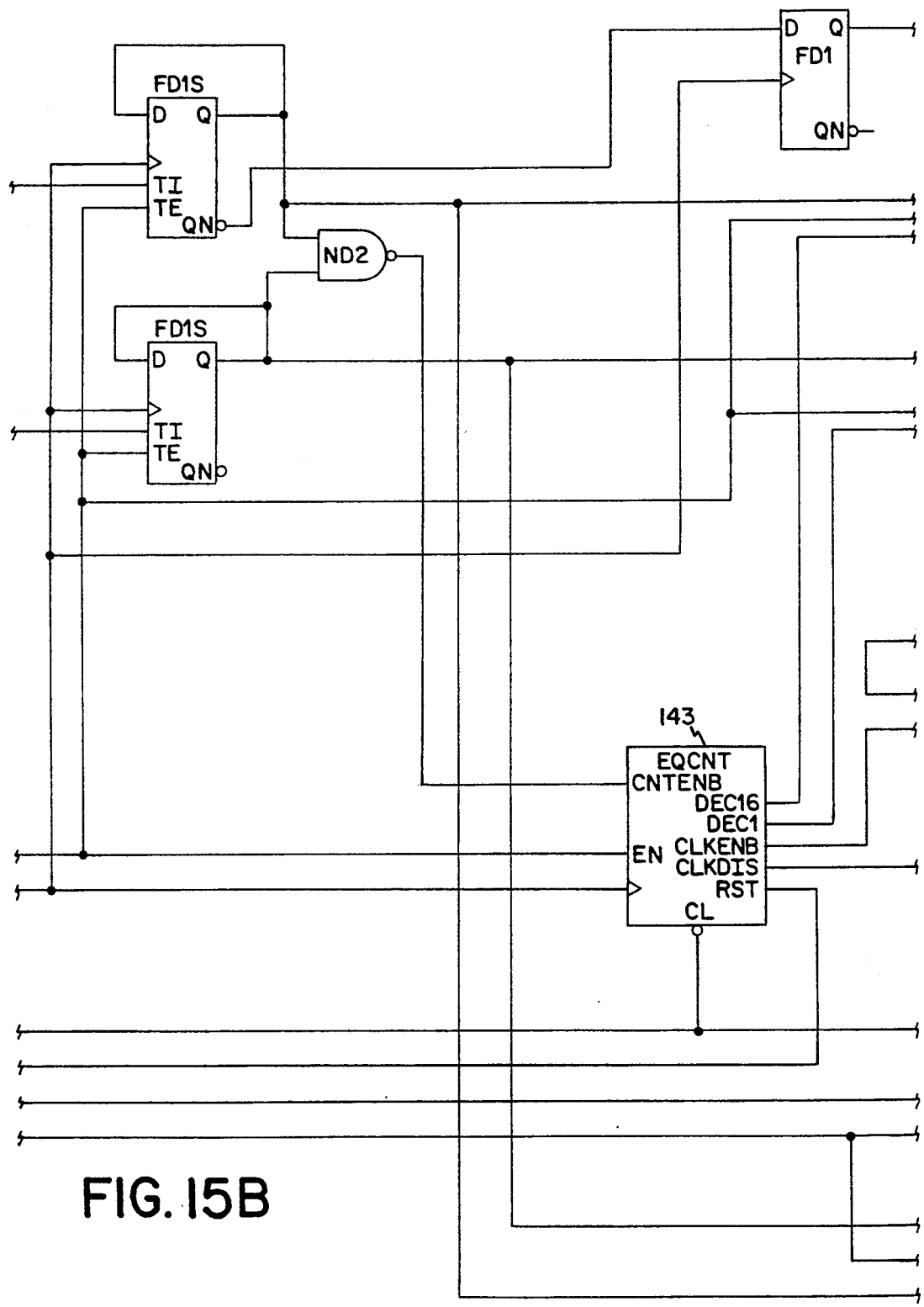
Figure 15C:
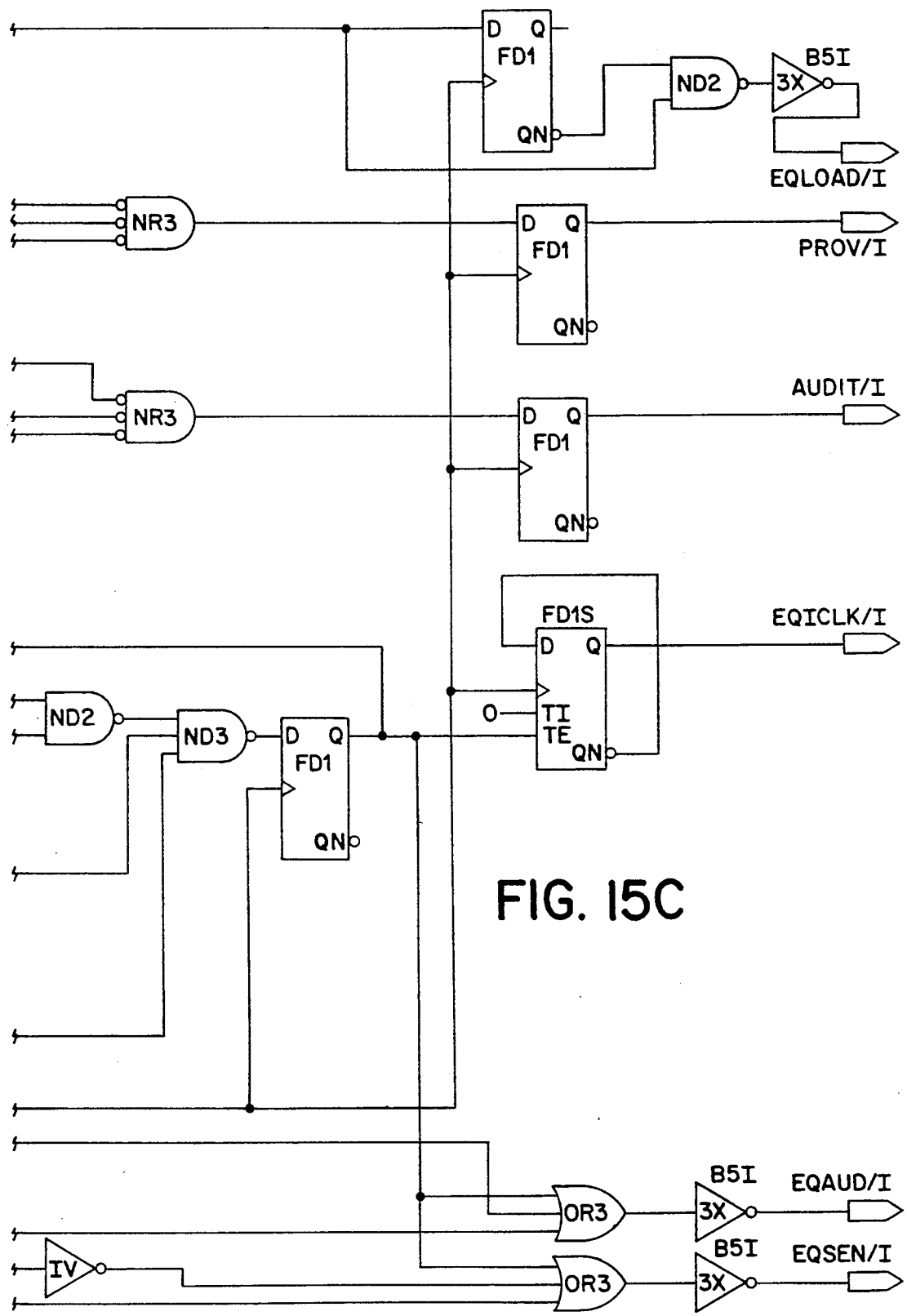
Figure 16A:
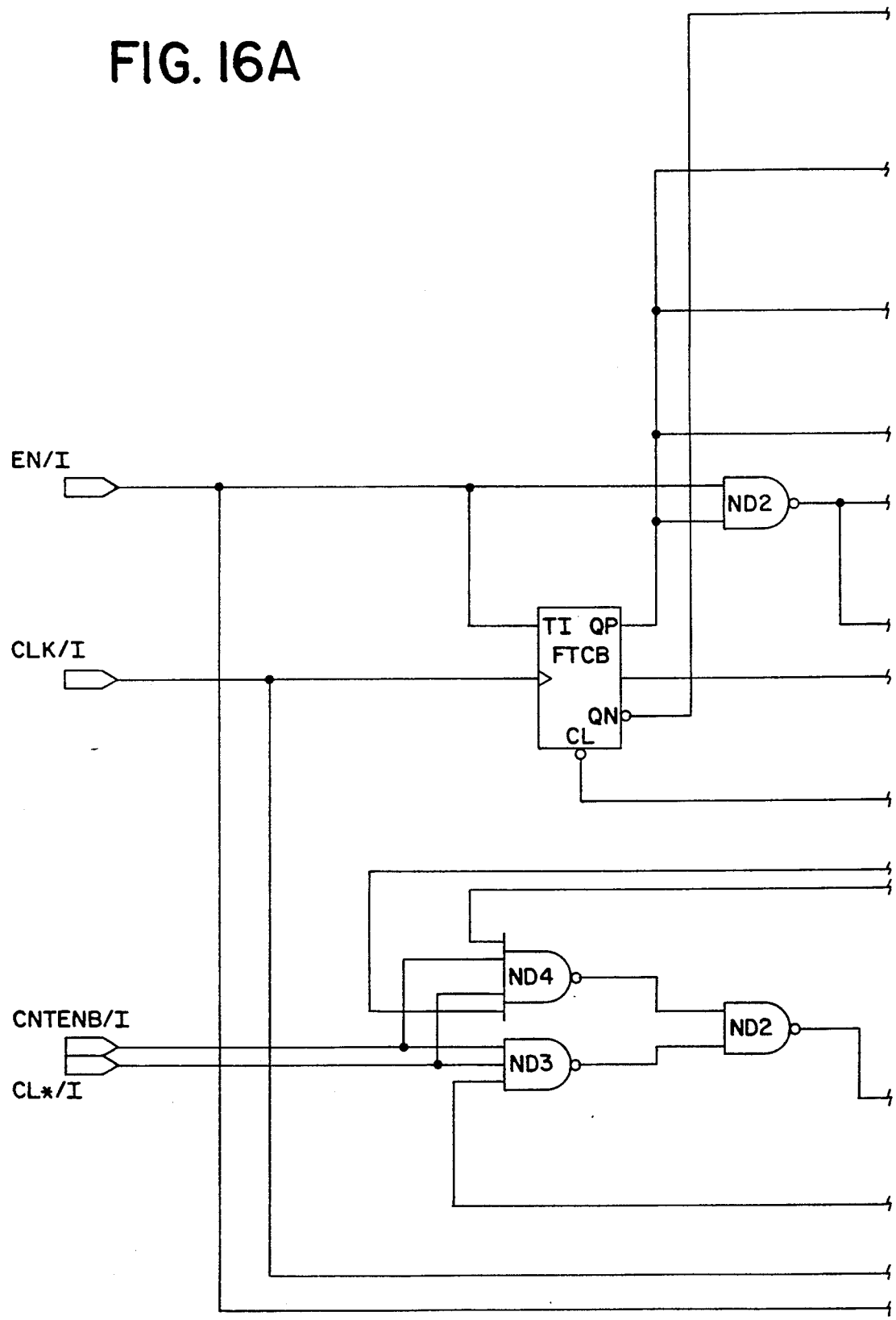
FIGS. 16A, 16B and 16C, is a schematic diagram of the equalizer counter of FIG. 15.
Figure 16B:
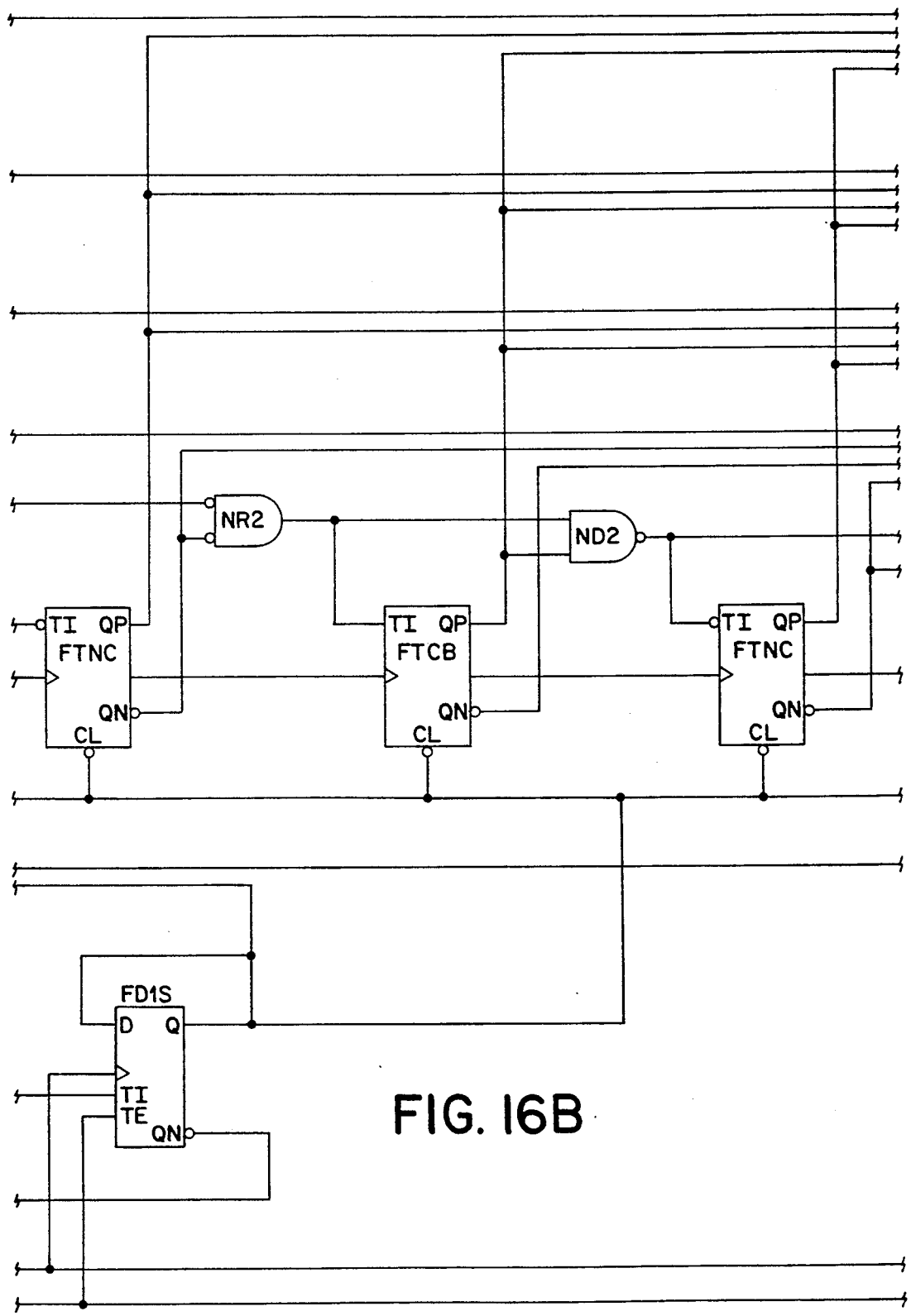
Figure 16C:
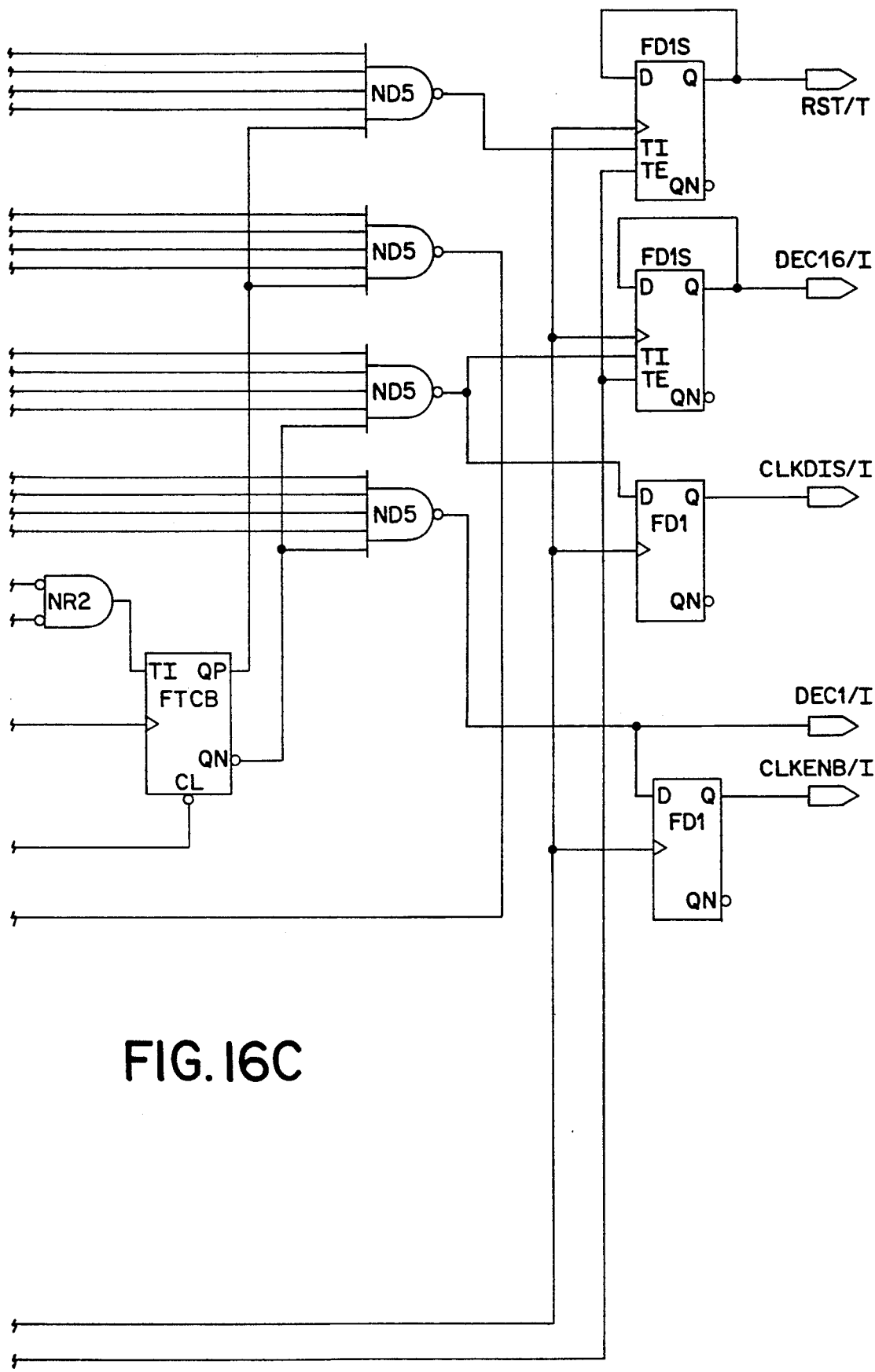
Figure 17A:
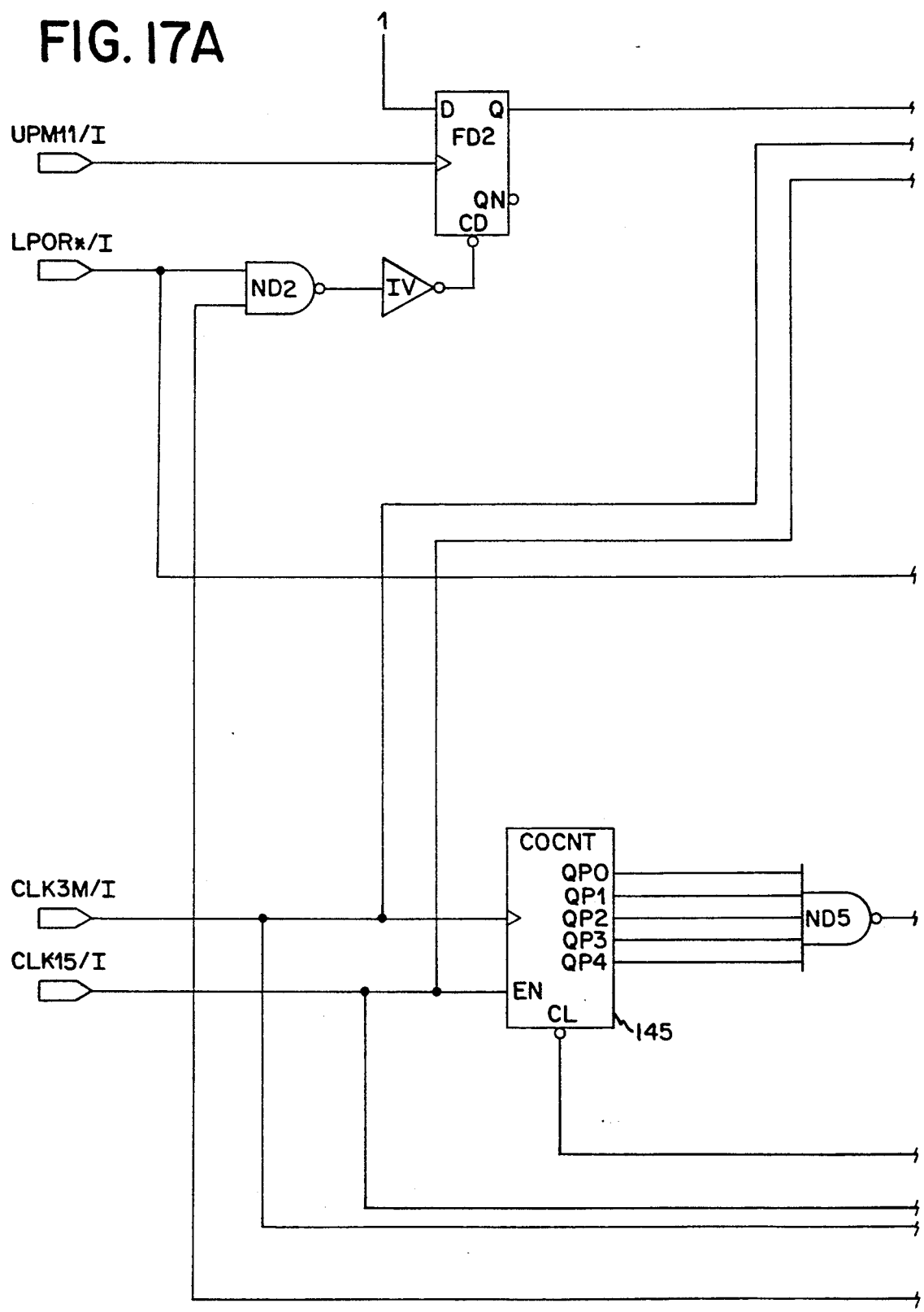
FIGS. 17A, 17B and 17C, is a schematic diagram of the CODEC connect logic of FIG. 14.
Figure 17B:
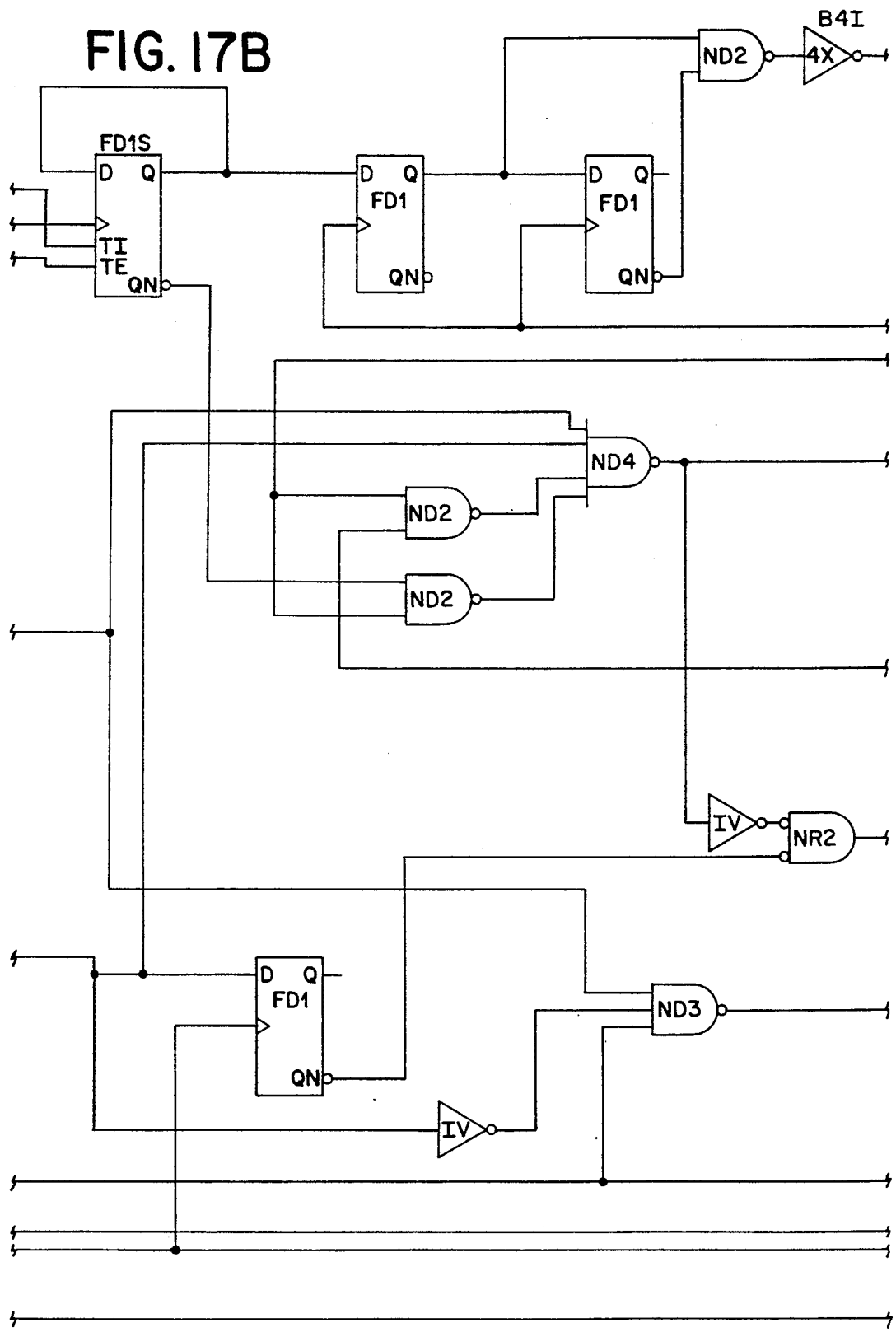
Figure 17C:
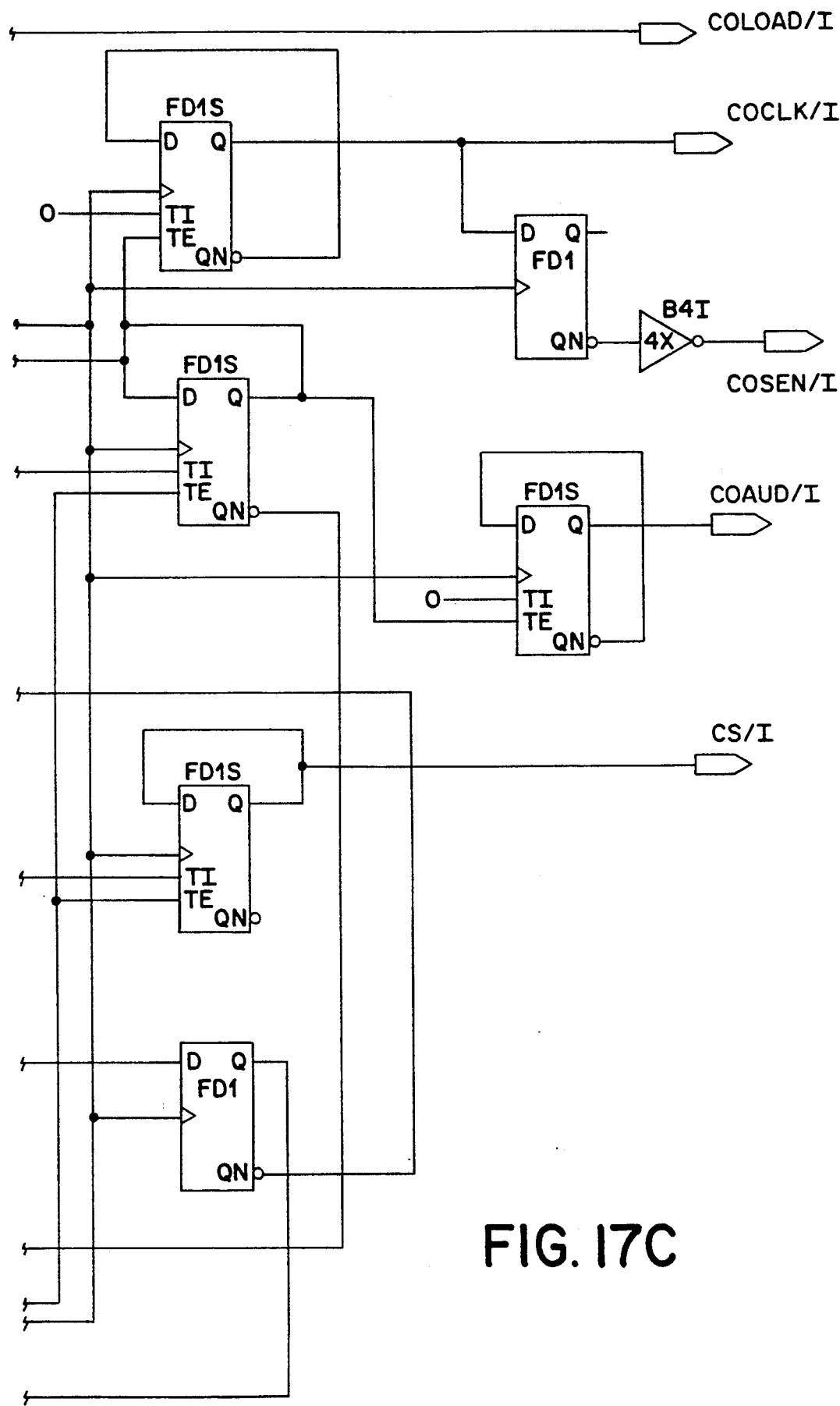
Figure 18A:
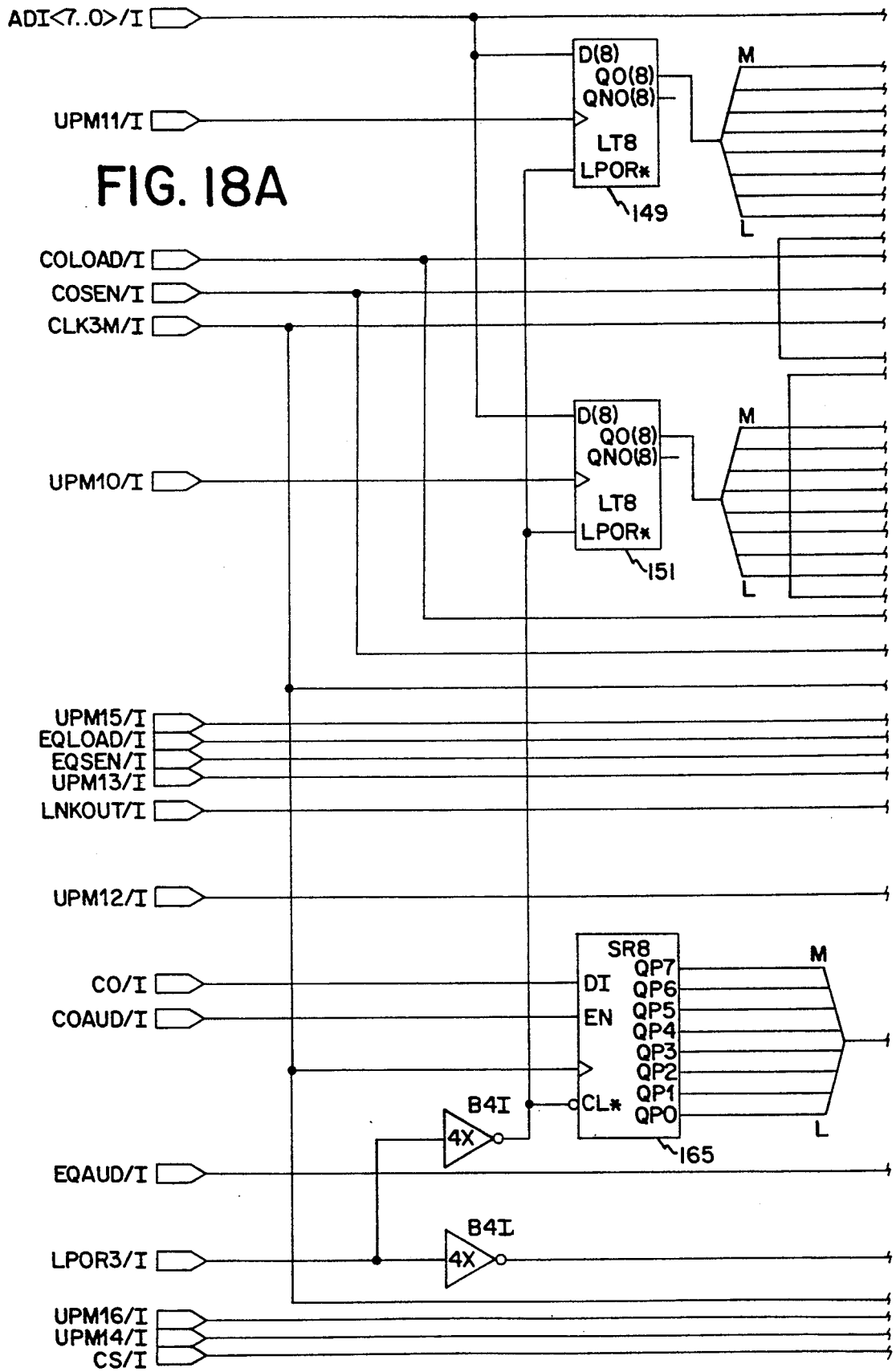
FIGS. 18A, 18B and 18C, is a schematic diagram of the CO/EQ data interface 123 of FIG. 11.
Figure 18B:
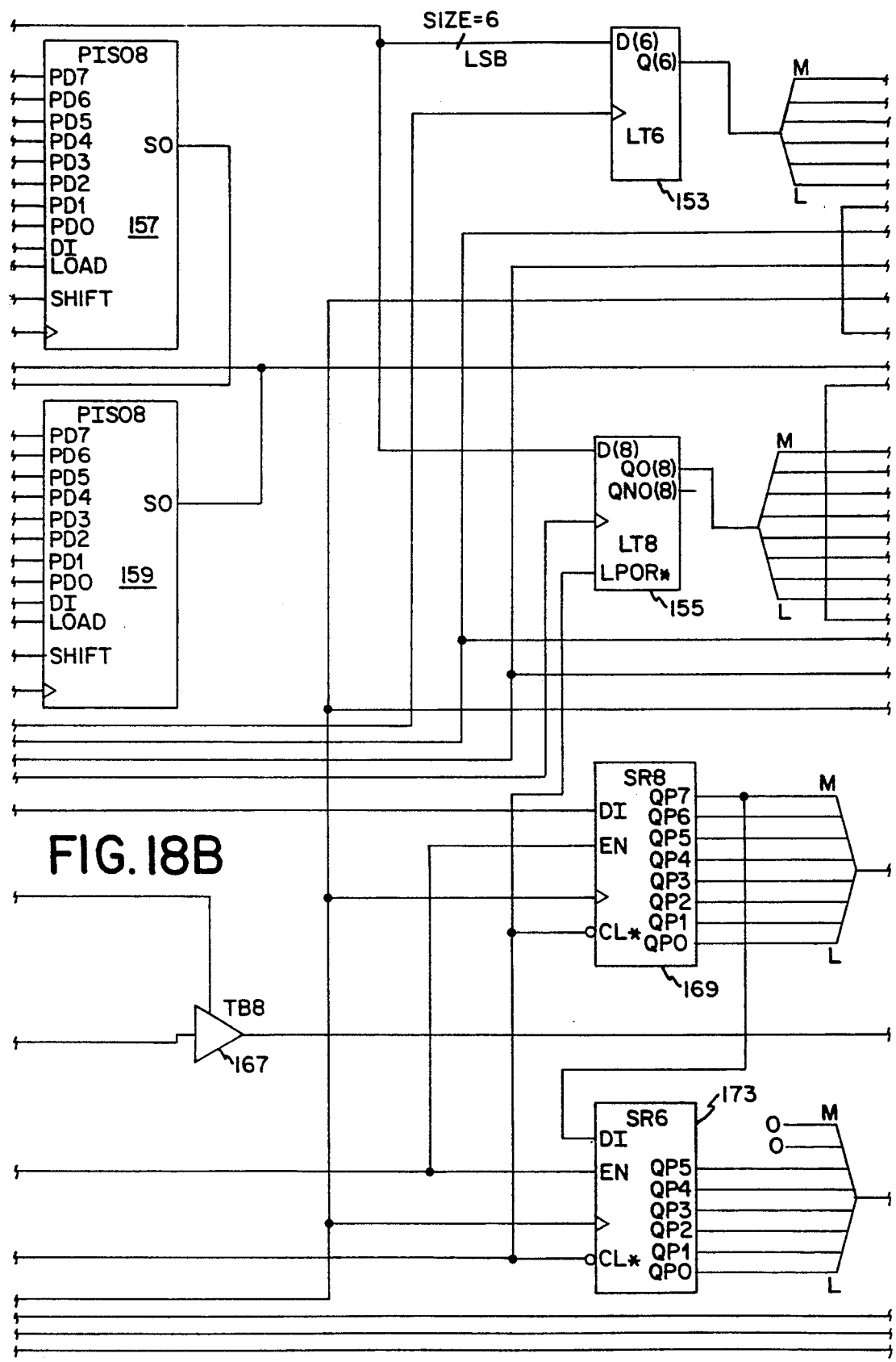
Figure 18C:
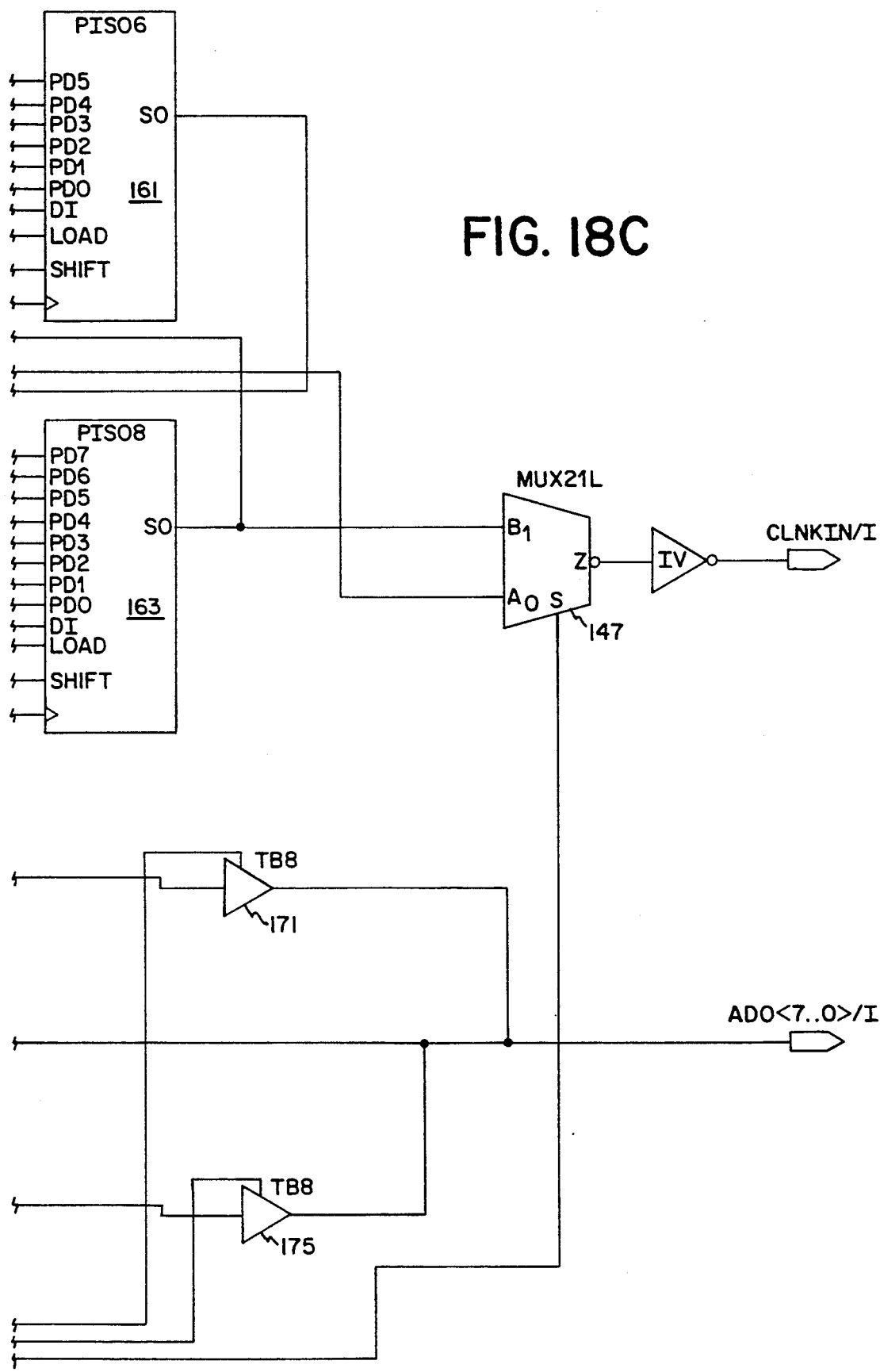
Figure 19A:
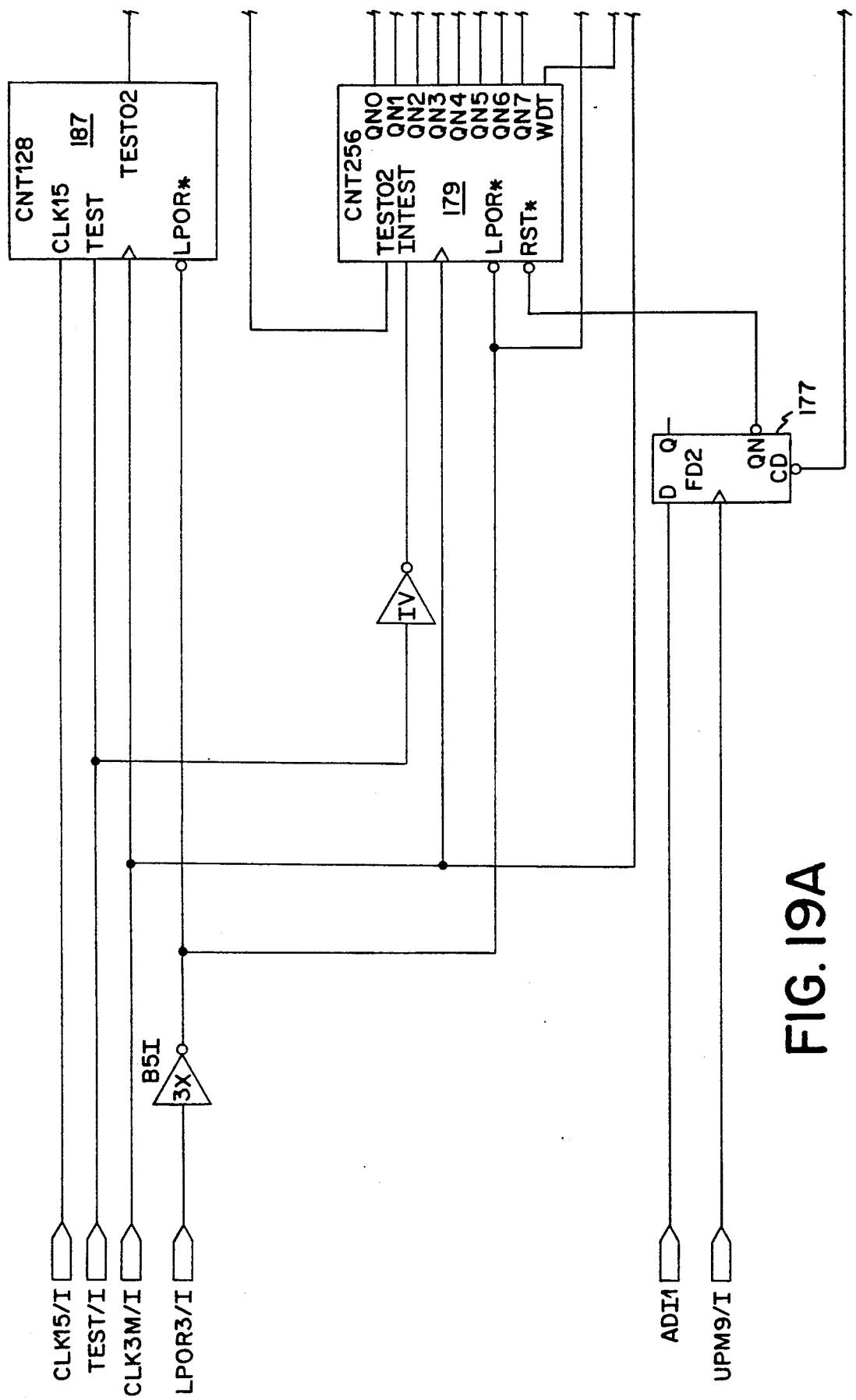
FIGS. 19A and 19B, is a schematic diagram of the watchdog timer 125 of FIG. 11.
Figure 19B:
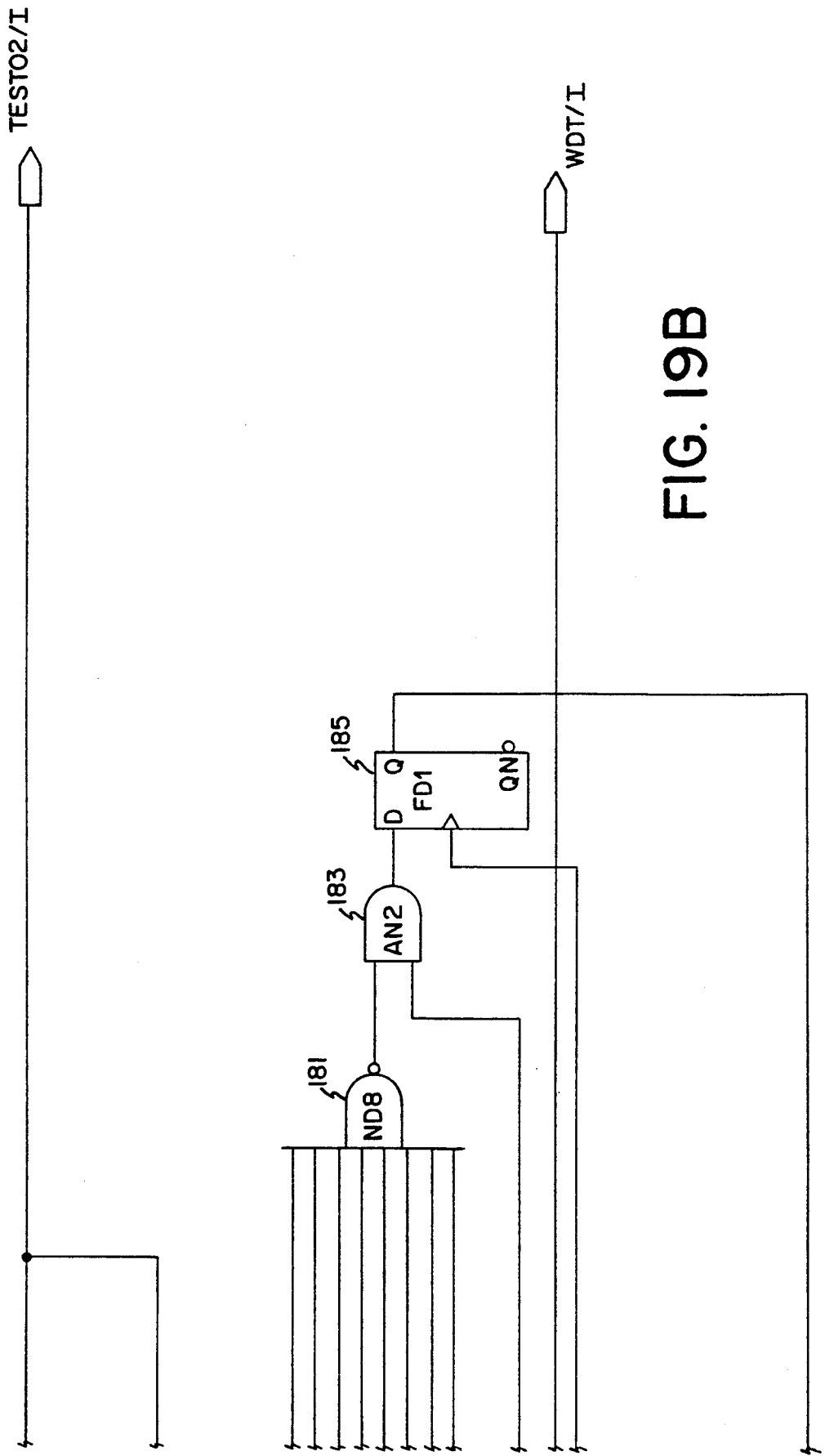

Referring to FIG. 19, there is shown a schematic diagram for the watchdog timer 125 shown in FIGS. 4 and 11. A flip-flop 177 receives an input from the microprocessor on input ADI1 during the microprocessor memory timing signal UPM9. When the microprocessor is operating properly, a 1-level signal will be written into the flip-flop, the output of which is connected to a reset input of a 256-bit counter 179, which counter counts clock pulses 1.544 MHz and provides eight parallel outputs to a NAND gate 181, which has an output provided to an AND gate 183, which is connected to also receive an LPOR* reset signal. The output of AND gate 183 is connected to a flip-flop 185, which has an output connected to a clear input of flip-flop 177. A ninth output of counter 179 provides the watchdog timer signal WDT to the microprocessor to reset the microprocessor in the event that the counter runs out before being reset by the output of flip-flop 177. Thus, if the microprocessor malfunctions and the counter is not reset, the counter will run out, providing the watchdog timer signal to reset the microprocessor. The counter for the circuit of FIG. 19 essentially functions as a divide by 32,768 counter to provide one output for each 32,768 input pulses. The large counter is provided by two smaller counters, a 128-bit counter 187 and the counter 179. The reason for this is for testing purposes, in that the TEST02 output can be used without having to wait for 32,768 pulses to be counted.

Figure 20A:
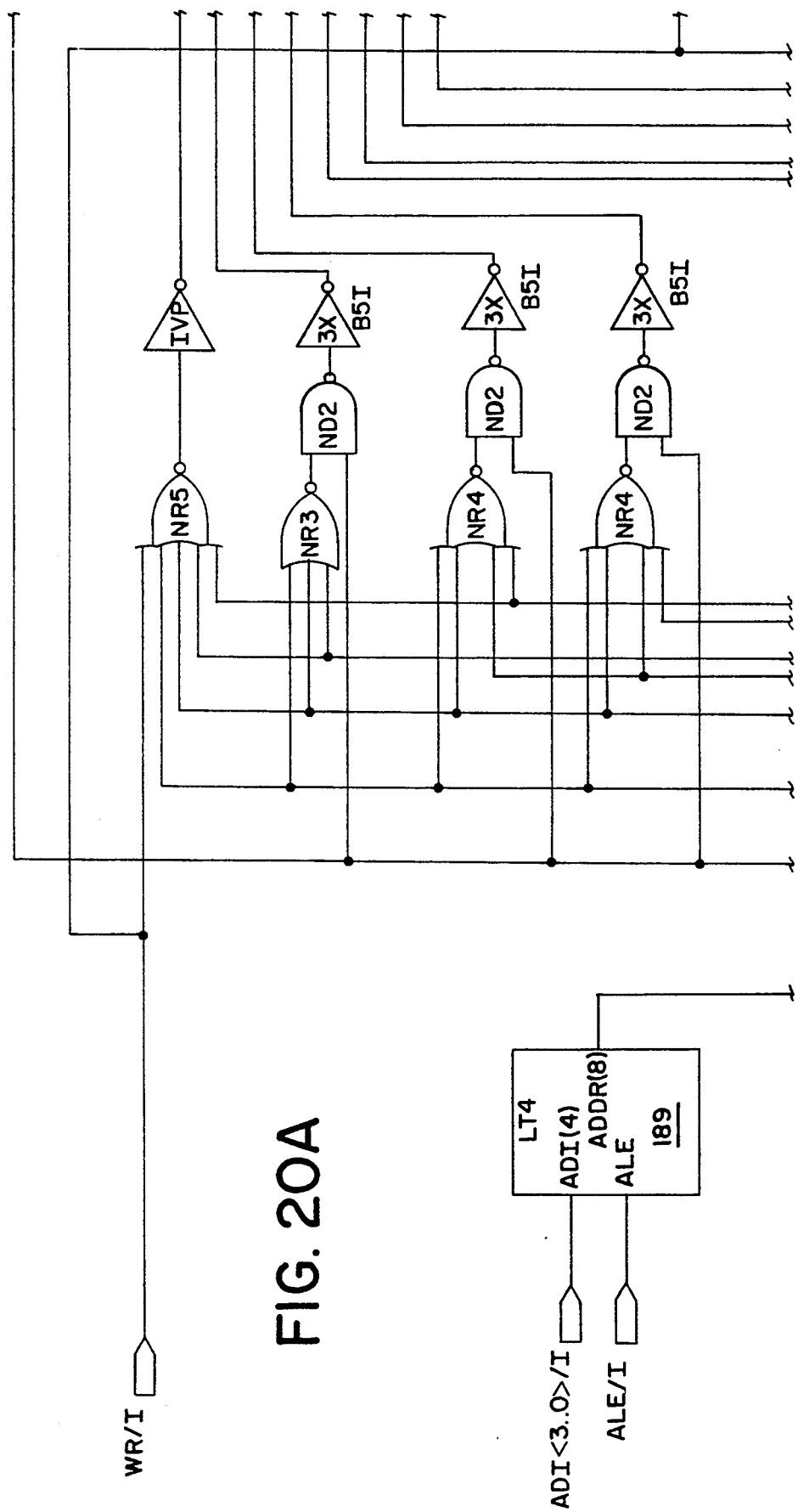
Figure 20B:
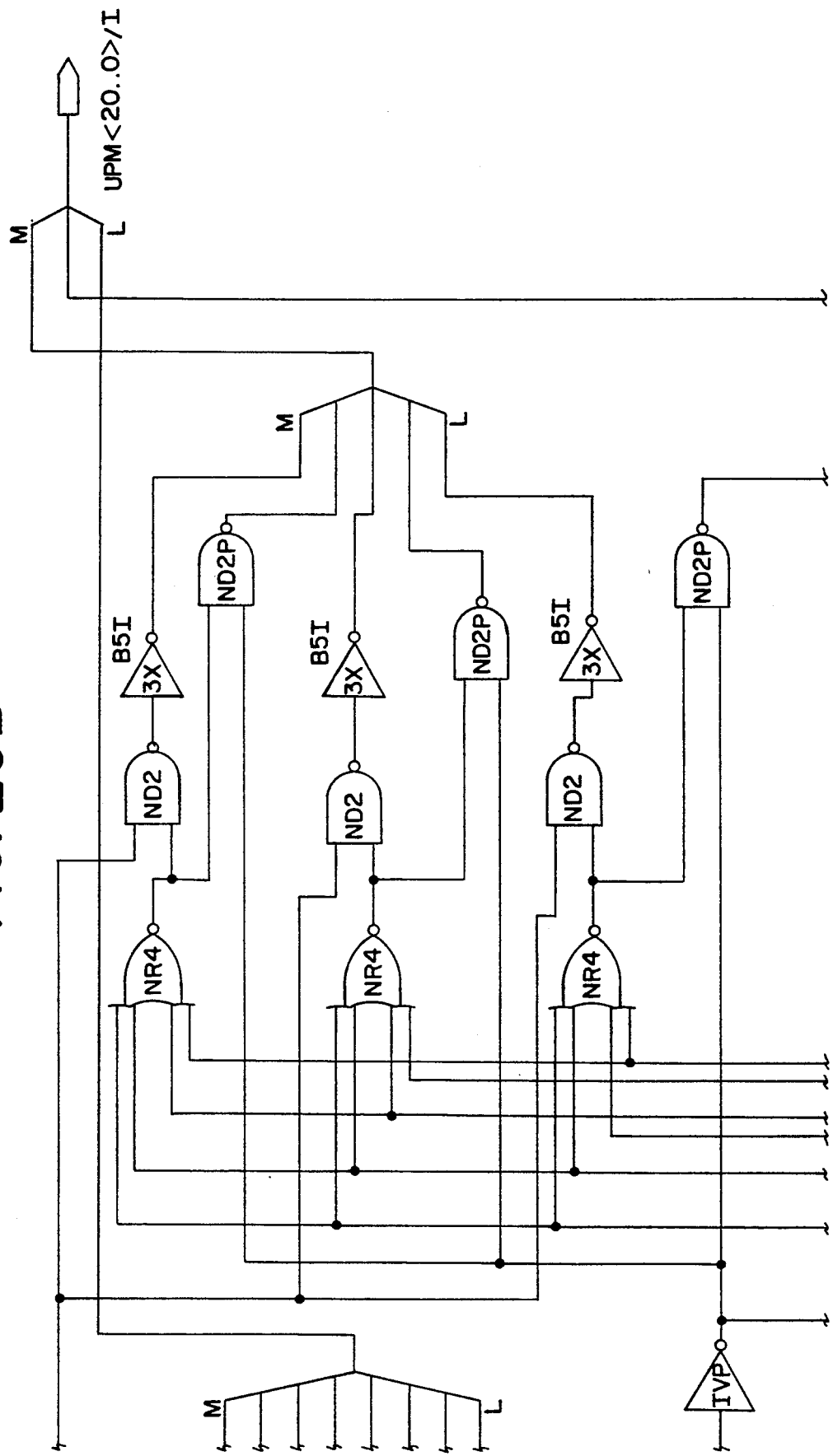
Figure 20C:
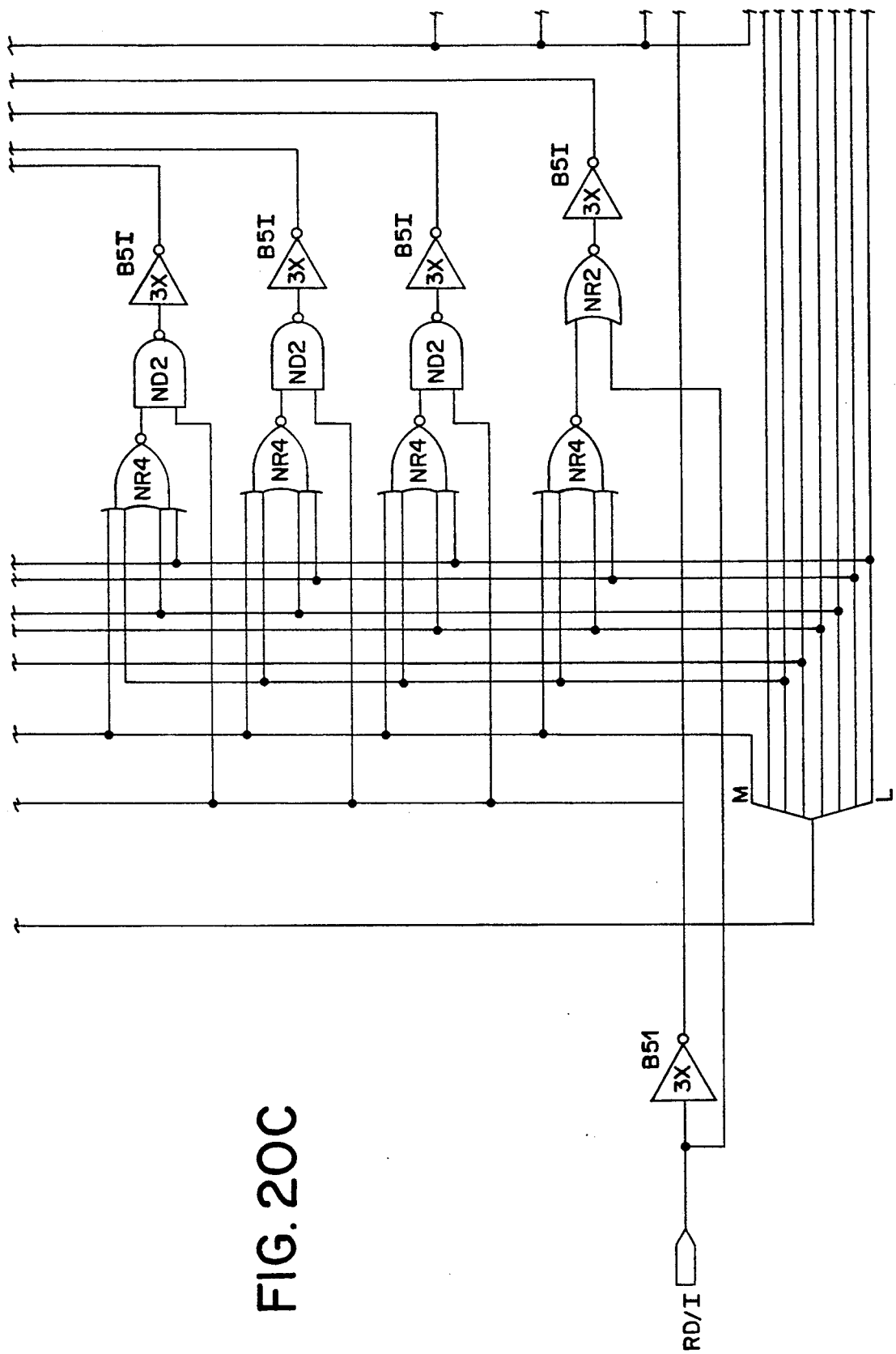

FIG. 20 shows the circuitry for the microprocessor interface 64 shown in FIGS. 4 and 7 and essentially functions as a large decoder for decoding microprocessor memory addresses. The microprocessor provides 4-bit memory addresses which are received on ADI(-3-0) and are provided to a 4-bit latch 189, which also receives an address latch enable signal ALE. The 4-bit latch 189 provides eight outputs corresponding to the four received bits and their complementary signals. Also provided to the circuit are a write signal WR and a read signal RD. These signals are decoded to provide 21 output signals on 21 output lines UPM(20-0). These lines provide pulses which are the microprocessor memory timing signals which are used to write data from the microprocessor to components such as shift registers or to enable tri-state buffers to allow the microprocessor to read data from the outputs of various registers.

Thus, the present invention provides an interface circuit for a four-wire line unit, which circuit performs all of the functions necessary to interface a multi-function four-wire line unit to the common equipment of a line shelf via a line unit interface bus. The invention provides storage for data to and from the microprocessor and interfaces for said data between said data storage and the microprocessor. In addition, the circuit provides for programming of a CODEC and an Equalizer on the line unit and also for initiating an audit function of these devices. The circuit also provides a means to make the asynchronous operation of the line unit microprocessor compatible with the line unit interface bus.

What is claimed is:

1. An interface circuit for use on a four-wire line unit in a line shelf of a digital loop carrier for interfacing with a bus connected to line shelf common equipment, said bus conveying signaling data, configuration data and provisioning data for a plurality of line units, said four-wire line unit including a microprocessor for providing suitable signaling data, provisioning data and configuration data, and other control signals for performing multiple functions depending upon the particular use to which the four-wire line unit is applied, said interface circuit comprising:

means, connected to said bus, for receiving and directing said signaling data to appropriate circuit elements within the line unit;

means, connected to said bus, for receiving provisioning data and shifting the provisioning data to the line unit;

means, connected to said bus, for receiving and decoding said configuration data and for activating the line unit in accordance with the decoded configuration data; and means for interfacing the line unit microprocessor with data received and to be transmitted on said bus.

2. An interface circuit as described in claim 1, wherein the microprocessor interface means includes means for decoding address signals received from the microprocessor and, in response thereto, for providing microprocessor memory address access time signals for reading and writing data to and from a memory of said microprocessor. microprocessor after said plurality of frames of data are stored so that the data may be written to the microprocessor memory as a packet.

3. An interface circuit as described in claim 2, wherein the bus is a TDM bus conveying data in time slots, said time slots being grouped together in frames, said microprocessor operating asynchronously in relation to the bus and providing transmit data for transmission on said bus, said interface circuit additionally comprising means for synchronizing the transmit data from the microprocessor with the time slots of the bus.

4. An interface circuit as described in claim 3, wherein the means for synchronizing the transmit data from the microprocessor with the time slots of the bus comprises:

latch means for receiving and latching said data from the microprocessor in response to a predetermined microprocessor memory address access time signal;

register means for receiving said data from said latching means and for storing said data and outputting it to predetermined time slots of the bus; and means responsive to the predetermined microprocessor memory address access time signal and to a bus transmit enable signal for providing a load signal to the register means for loading the data from the latch means to the register means, when the microprocessor memory address access time signal occurs prior to the transmit enable signal, and for not providing the load signal if the microprocessor memory address access time signal occurs simultaneously with, or subsequent to, the transmit enable signal, said register means, in response to the transmit enable signal, outputs data stored in the register means to the predetermined time slot of the bus.

5. An interface circuit as described in claim 4, wherein the transmit data is data selected from a group of data, including signaling transmit data and provisioning transmit data.

6. An interface circuit as described in claim 1, wherein the bus is a TDM bus providing data in time slots grouped in frames, said time slots being assigned to line units, said interface circuit additionally comprising means for receiving provisioning data from a time slot assigned to the line unit, for storing said data for a predetermined plurality of consecutive frames, and for providing an interrupt signal to the microprocessor after said plurality of frames of data are stored so that data may be written to the microprocessor memory as a packet.

7. An interface circuit as described in claim 1, wherein the line unit includes a plurality of relays, and said microprocessor provides control signals for said relays, said interface circuit additionally comprising latch means for receiving said control signals and for providing outputs to operate said relays.

8. An interface circuit as described in claim 7, wherein said relays are latching relays driven in one of two directions by application of two control signals received from the microprocessor, said interface circuit further comprising means for preventing the application of two control signals of the same amplitude to the relay.

9. An interface circuit as described in claim 1, wherein the line unit includes a. CODEC, and an Equalizer, said interface circuit including means for interfacing said CODEC and Equalizer.

10. An interface circuit as described in claim 9, additionally comprising means for auditing said CODEC and Equalizer by the microprocessor, wherein said CODEC and Equalizer data is provided to the microprocessor for auditing purposes.

11. An interface circuit as described in claim 10, wherein the means for auditing said CODEC and Equalizer comprises:
means for receiving and storing the data from said CODEC and Equalizer;
means connected to the receiving and storing means, for said CODEC and Equalizer, for providing said data to said microprocessor;
means for selectively providing one of said CODEC and Equalizer data to the means for providing said data to said microprocessor; and
means for providing commands to said CODEC and Equalizer for causing said CODEC and Equalizer to write data to said receiving and storage means.

12. An interface circuit as described in claim 9, wherein the means for interfacing said CODEC and Equalizer comprises:
means for receiving and storing both CODEC and Equalizer provisioning data from said microprocessor;
means for outputting said CODEC and Equalizer provisioning data from said receiving and storing means;
means for selectively providing one of said CODEC and Equalizer provisioning data to said CODEC and Equalizer; and
means for selectively enabling one of said CODEC and Equalizer to receive said provisioning data in accordance with the provisioning data provided.

13. An interface circuit for use on a four-wire line unit in a line shelf of a digital loop carrier for interfacing with a bus connected to line shelf common equipment, said bus conveying various forms of data for a plurality of line units, said four-wire line unit including a microprocessor for providing suitable signaling data, provisioning data and configuration data, and other control signals for performing multiple functions depending upon the particular use to which the four-wire line unit is applied, said interface circuit comprising:
means, connected to said bus, for receiving and directing said data to appropriate circuit elements within the line unit; and
means for interfacing the line unit microprocessor with data received and to be transmitted on said bus.

14. An interface circuit as described in claim 13, wherein the microprocessor interface means includes means for decoding address signals received from the microprocessor and, in response thereto, for providing microprocessor memory address access time signals for reading and writing data to and from a memory of said microprocessor.

15. An interface circuit as described in claim 14, wherein the bus is a TDM bus conveying data in time slots, said time slots being grouped together in frames, said microprocessor operating asynchronously in relation to the bus and providing transmit data for transmission on said bus, said interface circuit additionally comprising means for synchronizing the transmit data from the microprocessor with the time slots of the bus.

16. An interface circuit as described in claim 15, wherein the means for synchronizing the transmit data from the microprocessor with the time slots of the bus comprises:
latch means for receiving and latching said data from the microprocessor in response to a predetermined microprocessor memory address access time signal;
register means for receiving said data from said latching means and for storing said data and outputting it to predetermined time slots of the bus; and
means responsive to the predetermined microprocessor memory address access time signal and to a bus transmit enable signal for providing a load signal to the register means for loading the data from the latch means to the register means, when the microprocessor memory address access time signal occurs prior to the transmit enable signal, and for not providing the load signal if the microprocessor memory address access time signal occurs simultaneously with, or subsequent to, the transmit enable signal, said register means, in response to the transmit enable signal, outputs data stored in the register means to the predetermined time slot of the bus.

17. An interface circuit as described in claim 16, wherein the transmit data is data selected from a group of data, including signaling transmit data and provisioning transmit data.

18. An interface circuit as described in claim 17, wherein the line unit includes a plurality of relays, and said microprocessor provides control for said relays, said interface circuit additionally comprising latch means for receiving said control signals and for providing outputs to operate said relays.

19. An interface circuit as described in claim 18, wherein said relays are latching relays driven in one of two directions by application of two control signals received from the microprocessor, said interface circuit further comprising means for preventing the application of two control signals of the same amplitude to the relay.

20. An interface circuit as described in claim 13, wherein the bus is a TDM bus providing data in time slots grouped in frames, said time slots being assigned to line units, said interface circuit additionally comprising means for receiving provisioning data from a time slot assigned to the line unit, for storing said data for a predetermined plurality of consecutive frames, and for providing an interrupt signal to the microprocessor after said plurality of frames of data are stored so that the data may be written to the microprocessor memory as a packet.

* * * * *

UNITED STATES PATENT AND TRADEMARK OFFICE
CERTIFICATE OF CORRECTION

PATENT NO. : 5,237,563
DATED : August 17, 1993
INVENTOR(S) : Timothy J. McNulty It is certified that error appears in the above-identified patent and that said Letters Patent is hereby corrected as shown below:

At column 26, lines 24-26, delete "microprocessor after said plurality of frames of data are stored so that the data may be written to the microprocessor memory as a packet."

At column 27, line 4, insert --the-- prior to "data".

Signed and Sealed this

Twenty-fourth Day of May, 1994

*Attest:*

BRUCE LEHMAN

*Attesting Officer*     *Commissioner of Patents and Trademarks*